(12) United States Patent
Kamat et al.

(10) Patent No.: US 8,999,079 B2
(45) Date of Patent: Apr. 7, 2015

(54) 6XXX ALUMINUM ALLOYS, AND METHODS FOR PRODUCING THE SAME

(75) Inventors: Rajeev G. Kamat, Murrysville, PA (US); John M. Newman, Export, PA (US); Ralph R. Sawtell, Gibsonia, PA (US); Jen C. Lin, Export, PA (US)

(73) Assignee: Alcoa, Inc., Pittsburgh, PA (US)

( * ) Notice: Subject to any disclaimer, the term of this patent is extended or adjusted under 35 U.S.C. 154(b) by 135 days.

(21) Appl. No.: 13/588,806

(22) Filed: Aug. 17, 2012

(65) Prior Publication Data

US 2014/0248177 A1  Sep. 4, 2014

Related U.S. Application Data

(63) Continuation of application No. 13/228,420, filed on Sep. 8, 2011.

(60) Provisional application No. 61/381,040, filed on Sep. 8, 2010, provisional application No. 61/391,461, filed on Oct. 8, 2010, provisional application No. 61/425,024, filed on Dec. 20, 2010, provisional application No. 61/437,515, filed on Jan. 28, 2011.

(51) Int. Cl.
| | |
|---|---|
| C22C 21/08 | (2006.01) |
| C22C 21/10 | (2006.01) |
| C22F 1/053 | (2006.01) |
| F16L 9/02 | (2006.01) |
| C22C 21/02 | (2006.01) |
| F24J 2/10 | (2006.01) |

(52) U.S. Cl.
CPC ............... *C22C 21/08* (2013.01); *C22C 21/10* (2013.01); *C22F 1/053* (2013.01); *F16L 9/02* (2013.01); *F24J 2/1057* (2013.01); *C22C 21/02* (2013.01)

(58) Field of Classification Search
USPC .......................... 148/417, 418; 420/534, 535
IPC ....................................................... C22C 21/08
See application file for complete search history.

(56) References Cited

U.S. PATENT DOCUMENTS

| | | | | |
|---|---|---|---|---|
| 1,510,590 | A | 10/1924 | Fahrenwald | 102/464 |
| 1,695,044 | A | 12/1928 | Hallmann | 148/695 |
| 2,220,652 | A | 11/1940 | Irmann | 148/697 |
| 2,349,970 | A | 5/1944 | Lambeek | 102/464 |

(Continued)

FOREIGN PATENT DOCUMENTS

| | | |
|---|---|---|
| CN | 101509115 | 8/2009 |
| EP | 0097319 | 1/1984 |

(Continued)

OTHER PUBLICATIONS

"Aluminum Properties and Physical Metallurgy," *American Society for Metals*, Metals Park, OH, pp. 188-191, May 1984, John E. Hatch, editor.

(Continued)

*Primary Examiner* — Roy King
*Assistant Examiner* — Janelle Morillo
(74) *Attorney, Agent, or Firm* — Greenberg Traurig, LLP

(57) ABSTRACT

New 6xxx aluminum alloy bodies and methods of producing the same are disclosed. The new 6xxx aluminum alloy bodies may be produced by preparing the aluminum alloy body for post-solutionizing cold work, cold working by at least 25%, and then thermally treating. The new 6xxx aluminum alloy bodies may realize improved strength and other properties.

23 Claims, 55 Drawing Sheets

(56) References Cited

U.S. PATENT DOCUMENTS

| | | | |
|---|---|---|---|
| 2,394,546 A | 2/1946 | Harringont | 148/21.1 |
| 2,790,216 A | 4/1957 | Hunter | 164/480 |
| 2,887,422 A | 5/1959 | Stone et al. | 148/691 |
| 3,032,448 A | 5/1962 | Siebel et al. | 148/537 |
| 3,219,491 A | 11/1965 | Anderson et al. | 148/552 |
| 3,329,537 A | 7/1967 | Loach | 148/693 |
| 3,418,177 A | 12/1968 | Pryor | 148/689 |
| 3,464,866 A | 9/1969 | Pryor | 148/690 |
| 3,498,221 A | 3/1970 | Hilton et al. | 102/464 |
| 3,613,767 A | 10/1971 | Cofer et al. | 164/476 |
| 3,659,528 A | 5/1972 | Santala | 102/468 |
| 3,706,118 A | 12/1972 | Hilton et al. | 29/1.3 |
| 3,706,606 A | 12/1972 | Di Russo et al. | 148/697 |
| 3,761,322 A | 9/1973 | Winter et al. | 148/689 |
| 3,765,297 A | 10/1973 | Skochko et al. | 89/1.1 |
| 3,770,515 A | 11/1973 | Besel | 148/690 |
| 3,787,248 A | 1/1974 | Setzer et al. | 148/502 |
| 3,791,880 A | 2/1974 | Hunsicker et al. | 428/553 |
| 3,847,681 A | 11/1974 | Waldman et al. | 148/692 |
| 3,924,534 A | 12/1975 | Gruner | 102/464 |
| 3,930,895 A | 1/1976 | Moser et al. | 148/550 |
| 3,935,007 A | 1/1976 | Baba et al. | 420/535 |
| 3,945,860 A | 3/1976 | Winter et al. | 148/502 |
| 3,984,259 A | 10/1976 | Rogers, Jr. et al. | 148/690 |
| 4,028,141 A | 6/1977 | Chia et al. | 148/550 |
| 4,065,326 A | 12/1977 | Nicoud | 148/550 |
| 4,092,181 A | 5/1978 | Paton et al. | 148/694 |
| 4,111,721 A | 9/1978 | Hitchler et al. | 148/689 |
| 4,151,013 A | 4/1979 | Thompson et al. | 148/502 |
| 4,151,896 A | 5/1979 | Nicoud et al. | 148/551 |
| 4,174,232 A | 11/1979 | Lenz et al. | 148/552 |
| 4,235,646 A | 11/1980 | Neufeld et al. | 148/551 |
| 4,238,248 A | 12/1980 | Gyongyos et al. | 148/551 |
| 4,260,419 A | 4/1981 | Robertson | 420/534 |
| 4,269,632 A | 5/1981 | Robertson et al. | 148/550 |
| 4,282,044 A | 8/1981 | Robertson et al. | 148/523 |
| 4,318,755 A | 3/1982 | Jeffrey et al. | 148/439 |
| 4,334,935 A | 6/1982 | Morris | 148/551 |
| 4,405,385 A | 9/1983 | Cloostermans-Huwaert | 148/690 |
| 4,511,409 A | 4/1985 | Ferton et al. | 148/550 |
| 4,517,034 A | 5/1985 | Merchant et al. | 148/551 |
| 4,605,448 A | 8/1986 | Baba et al. | 148/537 |
| 4,618,382 A | 10/1986 | Miyagi et al. | 148/415 |
| 4,637,842 A | 1/1987 | Jeffrey et al. | 148/535 |
| 4,648,913 A | 3/1987 | Hunt, Jr. et al. | 148/693 |
| 4,722,754 A | 2/1988 | Ghosh et al. | 75/236 |
| 4,797,164 A | 1/1989 | Hollrigl et al. | 148/552 |
| 4,806,174 A | 2/1989 | Cho et al. | 148/693 |
| 5,098,490 A | 3/1992 | Huu | 148/693 |
| 5,192,378 A | 3/1993 | Doherty et al. | 148/691 |
| 5,342,459 A | 8/1994 | Klemp et al. | 148/690 |
| 5,362,341 A | 11/1994 | Palmer et al. | 148/692 |
| 5,383,986 A | 1/1995 | Cho | 148/697 |
| 5,393,357 A | 2/1995 | Cho | 148/437 |
| 5,413,650 A | 5/1995 | Jarrett et al. | 148/690 |
| 5,518,064 A | 5/1996 | Romanowski et al. | 164/453 |
| 5,888,320 A * | 3/1999 | Dorward | 148/690 |
| 5,938,867 A | 8/1999 | Dorward et al. | 148/693 |
| 5,976,279 A | 11/1999 | Selepack et al. | 148/551 |
| 5,985,058 A | 11/1999 | Selepack et al. | 148/551 |
| 5,993,573 A | 11/1999 | Selepack et al. | 148/551 |
| 6,290,785 B1 | 9/2001 | Selepack et al. | 148/439 |
| 6,325,872 B1 | 12/2001 | Newton et al. | 148/551 |
| 6,350,329 B1 | 2/2002 | Troeger et al. | 148/564 |
| 6,450,583 B2 | 9/2002 | Hale, Jr. et al. | 301/63.101 |
| 6,537,392 B2 | 3/2003 | Magnusen et al. | 148/417 |
| 6,579,387 B1 | 6/2003 | Selepack et al. | 148/552 |
| 6,672,368 B2 | 1/2004 | Unal | 164/480 |
| 7,182,815 B2 | 2/2007 | Katagami et al. | 118/665 |
| 7,503,378 B2 | 3/2009 | Unal | 164/480 |
| 7,780,802 B2 | 8/2010 | Dif et al. | 148/551 |
| 2003/0070734 A1 | 4/2003 | Heinz et al. | 148/552 |
| 2003/0079856 A1 | 5/2003 | Kilmer et al. | 164/461 |
| 2004/0084119 A1* | 5/2004 | Sano et al. | 148/689 |
| 2005/0011630 A1 | 1/2005 | Anderson et al. | 164/461 |
| 2006/0157172 A1 | 7/2006 | Fischer et al. | 148/690 |
| 2008/0182122 A1 | 7/2008 | Chu et al. | 428/615 |
| 2009/0180920 A1 | 7/2009 | Reichlinger et al. | 420/532 |
| 2010/0059151 A1* | 3/2010 | Iwamura et al. | 148/690 |
| 2010/0247954 A1 | 9/2010 | Chu et al. | 428/636 |
| 2010/0279143 A1 | 11/2010 | Kamat et al. | 428/615 |
| 2010/0319820 A1 | 12/2010 | Koma | 148/695 |
| 2011/0017055 A1 | 1/2011 | Mooy et al. | 89/36.02 |
| 2011/0100579 A1 | 5/2011 | Chu et al. | 164/94 |
| 2011/0252956 A1 | 10/2011 | Sawtell et al. | 89/36.02 |
| 2012/0055588 A1 | 3/2012 | Kamat et al. | 148/551 |
| 2012/0055589 A1 | 3/2012 | Kamat et al. | 148/551 |
| 2012/0055590 A1 | 3/2012 | Kamat et al. | 148/551 |
| 2012/0055591 A1 | 3/2012 | Kamat et al. | 148/551 |

FOREIGN PATENT DOCUMENTS

| | | |
|---|---|---|
| EP | 2184375 | 5/2010 |
| GB | 1055687 | 1/1967 |
| GB | 1593899 | 7/1981 |
| JP | 52-94817 | 8/1977 |
| JP | 02-294454 | 12/1990 |
| JP | 03-044452 | 2/1991 |
| JP | 05-132745 | 5/1993 |
| JP | 08-325664 | 12/1996 |
| JP | 09-111426 | 4/1997 |
| JP | 09-248649 | 9/1997 |
| JP | 09-256129 | 9/1997 |
| JP | 10-168536 | 6/1998 |
| JP | 11-209857 | 8/1999 |
| JP | 2002-53924 | 2/2002 |
| JP | 2003-321754 | 11/2003 |
| JP | 2004-176134 | 6/2004 |
| JP | 2005-213529 | 8/2005 |
| JP | 2007-009262 | 1/2007 |
| JP | 2007-031819 | 2/2007 |
| JP | 2009-263720 | 11/2009 |
| KR | 92-0007926 | 9/1992 |
| WO | WO92/03586 | 3/1992 |
| WO | WO98/33947 | 8/1998 |
| WO | WO02/066181 | 8/2002 |
| WO | WO2004/018124 | 3/2004 |
| WO | WO2004/106566 | 12/2004 |
| WO | WO2008/128061 | 10/2008 |
| WO | WO2009/036953 | 3/2009 |
| WO | WO2009/132436 | 11/2009 |

OTHER PUBLICATIONS

"Aluminum: vol. I. Properties, Physical Metallurgy and Phase Diagrams," *American Society for Metals*, Metals Park, OH, pp. 197-198, 1967, Kent R. Van Horn, editor.

"American National Standard Alloy and Temper Designation Systems for Aluminum", The Aluminum Association, Inc., ANSI H35.1(M), pp. 1-11, 2009.

"Chassis Handbook: Fundamentals, Driving Dynamics, Components, Mechatronics, Perspectives" pp. 291-299, Bernd Heibing et al., Eds., Vieweg & Teubner Verlag, 2011.

"Registration Record Teal Sheets: International Alloy Designations and Chemical Composition Limits for Wrought Aluminum and Wrought Aluminum Alloys", The Aluminum Association, Inc. pp. 1-28, Feb. 2009.

"6061-T4 and -T6 Tread Sheet", Alcoa Mills Products brochure, Feb. 2005.

British Standard, "Aluminium and aluminium alloys—wrought products—temper designations," BS EN 515:1993, p. 16.

Benedyk, Joseph, C., "Thermomechanical Treatment of Precipitation Hardening Aluminum Alloys", *Light Metal Age*, vol. 26, Nos. 3, 4, Apr. 1968, pp. 10, 12.

Di Russo, E., et al., "Thermomechanical Treatments on High Strength Al—Zn—Mg(—Cu) Alloys", *Metallurgical Transactions* 4:1133-1144, Apr. 1973.

Esmaeili, S., "A novel thermotnechanical processing method to achieve fine-grained heat treatable aluminum sheet", University of Waterloo, Dept. of Mechanical & Mechatronics Engineering, Sep. 2010.

(56) References Cited

OTHER PUBLICATIONS

Giarda, A., et al., "Investigations on Al—Mg—Si Alloys Containing 0.8 Percent Mg2Si with Different Amounts of Excess Si, Treated by T-HA (T8) Cycles," *Alluminio*, Jul.-Aug. 1976, 45 (7-8):387-399 (with English translation).

Harrington, R. H., "The Modern Metallurgy of Alloys," John Wiley & Sons, Inc. New York, 1948, pp. 71-118.

Harrington, R. H., "Precipitation-hardening and Double Aging", American Institute of Mining and Metallurgical Engineers, Technical Publication No. 759, pp. 1-15, Dec. 1936.

Hyatt, M. V., "Program to Improve the Fracture Toughness and Fatigue Resistance of Aluminum Sheet and Plate for Airframe Applications", pp. 1-188, prepared by The Boeing Commercial Airplane Company for air Force Materials Laboratory, Air Force Systems Command, U.S. Air Force, Sep. 1973.

Leymarie, F., "Aluminium Alloys and the Can Industry", The Effective and Economic Use of the Special Characteristics of Aluminum and its Alloys, Institute of Metals Conference, 1972, pp. 229-232.

McEvily, Jr., A. J., et al., "Effect of Thermal-Mechanical Processing on the Fatigue and Stress-Corrosion Properties of an Al—Zn—Mg Alloy", Transaction of American Society for Metals 60(4):661-671, Dec. 1967.

Mercier, J., et al., "Treatment of the Quenching—Strain Hardening—Recovery Type on Heat Treated Aluminum Alloys", *Memoires Scientifiques Rev. Metallurg.*, LX, No. 1, pp. 60-71, 1963 (with translation).

Ostermann, F. G., et al., "Thermomechanical Processing and Fatigue of Aluminum Alloys", American Society for Testing and Materials, Symposium on Achievement of High Fatigue Resistance in Metals and Alloys, Jun. 1969, pp. 169-186.

Ostermann, F., "Improved Fatigue Resistance of Al—Zn—Mg—Cu (7075) Alloys Through Thermomechanical Processing", *Metallurgical Transactions* 2(10):2897-2902, Oct. 1971, pp. 2897- 2902.

Poorganji, B., et al., "Effect of cold work and non-isothermal annealing on the recrystallization behavior and texture evolution of a precipitation-hardenable aluminum alloy", Scripta Materialia 63(12):1157-1160, Dec. 2010.

Rack, H. J., et al., "Thermomechanical Treatment of 6000 Aluminum Alloys", *Proceedings TMS/AIME Heat Treatment Committee*, Oct. 18, 1978, pp. 86-104.

Rack, H. J., et al., "Thermomechanical Treatment of High Purity 6061 Aluminum" *Metallurgical Transactions A* 8A:335-346, Feb. 1977.

Reimann, W. H., "Improved Fracture Resistance of 7075 Through Thermomechanical Processing", *Engineering Fracture Mechanics*, 5:67-78, 1973.

Sawtell, R. R., "Effects of FTMT Versus Alloying Fatigue and Fracture of 7XXX Alloy Sheet", Thermomechanical Processing of Aluminum Alloys, Proceedings of Heat Treatment Committee, TMS Fall Meeting, Oct. 18, 1978.

Sepehrband, P., et al., "Interactions between Precipitation and Annealing Phenomena during Non-isothermal Processing of an AA6xxx Alloy", Proceeding of the 12$^{th}$ International Conference on Aluminum Alloys, Yokohama, Japan, The Japan Institute of Light Metals, pp. 308-313, Sep. 2010.

Shteyunberg, M.M., et al., "Low Temperature Thermomechanical Treatment of an Aluminum Magnesium Silicon Alloy," *Light Metal Age*, pp. 13-15, Aug. 1974.

Thompson, D. S., et al., "Thermomechanical Aging of Aluminum Alloys," Proceedings 3$^{rd}$ International Conference on the Strength of Metals and Alloys, Cambridge England, vol. 1, pp. 119-123, Aug. 1973.

Thompson, D. S., et al., "Thermomechanical Aging of Aluminum Alloys (II)", *Aluminum*, 50(11):719-725, Nov. 1974.

Vruggink, J. E., "Study of Improved Aluminum Materials for Vehicular Armor", 1977, Doc. No. FA-TR-76073, U.S. Army Armament Command, Frankford Arsenal, PhiladelphiA, PA,19137, pp. 1-172.

Various 6xxx alloy properties from the document "The Selection, Processing and Application of 6000 Series Aluminium Extrusion Alloys" by Comalco, pp. 1-11 (2001).

Various 6xxx alloy properties from the document "Military Standardization Handbook—Aluminum and Aluminum Alloys" by the Dept. of Defense (MIL-HDBK-694A), pp. 34, 35, 41-43, 45, 47, 49-51, 53, 54, 57-60, 65, and 84-87 (1966).

Various 6xxx alloy properties from the document "Metallic Materials and Elements for Aerospace Vehicle Structures" by the Dept. of Defense (MIL-HDBK-5J), pp. 3-258 to 3-292 (2003).

Alloy 6005/6005A properties from the document "Aluminum Alloy 6005~6005A—T5" by aalco, pp. 1-2 (Feb. 8, 2013).

Alloy 6005/6105 properties from the document "Alloy 6005/6105" by Alcoa, pp. 1-2 (2002).

Alloy 6009 properties from the document "eFunda: Properties of Aluminum Alloy AA 6009", pp. 1-2, obtained from the internet on Apr. 18, 2013.

Alloy 6010 properties from the document "Aluminum Alloy-6010" by The University of Michigan-Dearborn, Center for Lightweight Automotive Materials and Processing, pp. 1-3, obtained from the internet on Apr. 18, 2013.

Alloy 6016 properties from the document "Automotive Trends in Aluminum—The European Perspective" article, by J. Hirsch, pp. 15-23, obtained from "Materials Forum vol. 28" (2004).

Alloy 6020 properties from the document "Understandng Cold Finished Aluminum Alloys" from UltrAlloy 6020 by Alcoa, pp. 1-2 (2004).

Alloy 6022 properties from the document "Higher Strength with Improved Formability" from the Alloy 6022 Sheet, by Alcoa, pp. 1-5 (2007).

Alloy 6023 properties from the document "Free Machining Aluminum Alloys at Elevated Temperatures", METAL 2009, 19.-21.5. 2009, Hradec nad Moravici, by Jiri Faltus, Petr Homola, Peter Slama, pp. 1-9 (2009).

Alloy 6026 properties from the document "Aluminum Alloy 6026-T9" by aalco, pp. 1-2 (Feb. 8, 2013).

Alloy 6033 properties from the document "Alloy 6033", by Kaiser Aluminum, pp. 1-4, obtained from the internet on Apr. 18, 2013.

Alloy 6040 properties from the document "Rod & Bar Alloy 6040" Technical Data sheet, by Kaiser Aluminum, pp. 1-2, obtained from the internet on Apr. 18, 2013.

Alloy 6041 properties from the document "Rod & Bar Alloy 6041" Technical Data sheet, by Kaiser Aluminum, pp. 1-2 (2007), obtained from the internet on Apr. 18, 2013.

Alloy 6042 properties from the document "Extruded Aluminum Alloy 6042" Technical Data sheet, by Sapa Industrial Extrusions, pp. 1-2, obtained from the internet on Apr. 18, 2013.

Alloy 6056 properties from the document "Strength and machinability for a low total cost solution" Technical Data sheet, by Alcan, pp. 1-2, obtained from the internet on Apr. 18, 2013.

Alloy 6060 properties from the document "Technical Data Sheet of Alloy 6060 and Aluminium Profile", by Pro-Lam Alluminio, pp. 1-3, obtained from the internet on Apr. 18, 2013.

Alloy 6064 properties from the document "Rod & Bar Alloy 6064" Technical Data sheet, by Kaiser Aluminum, pp. 1-2 (2007).

Alloy 6069 properties from the document "Aerospace Structural Metals Handbook", by W. F. Brown, Jr., pp. 1-16 (Feb. 2000).

Alloy 6070 properties from the document "Wrought aluminum—magnesium—silicon alloy 6070" by "SubsTech", pp. 1-2 (2012).

Alloy 6101 properties from the document "Alloy 6101", by Alcoa, pp. 1-2 (2002).

Alloy 6106 properties from the document "Extrusion Alloy 6106", by Rio Tinto Aluminum Limited, pp. 1-2 (2013).

Alloy 6111 properties from the document "Aluminum Alloy-6111", by The University of Michigan-Dearborn, Center for Lightweight Automotive Materials and Processing, pp. 1-3, obtained from the internet on Apr. 18, 2013.

Alloy 6156 properties from the document "6156 aluminum alloy performance impact of heat treatment and trace elements", by Li, Lin, China Central South University, pp. 1-4 (abstract only) (2011).

Alloy 6182 properties from the document "ENAW-6182: alloy equivalent, mechanical propertie . . . ", by steelnumber.com, pp. 1-2, (2013).

(56) References Cited

OTHER PUBLICATIONS

Alloy 6201 properties from the document "6201 Alloy", by Southwire OEM Division, obtained from the internet on Apr. 18, 2013.
Alloy 6205 properties from the document "eFunda: Aluminum Alloy AA 6205", pp. 1-2, obtained from the internet on Apr. 18, 2013.
Alloy 6351 properties from the document "eFunda: Aluminum Alloy AA 6351", pp. 1-2, obtained from the internet on Apr. 18, 2013.
Alloy 6463 properties from the document "eFunda: Aluminum Alloy AA 6463", pp. 1-2, obtained from the internet on Apr. 18, 2011.
Alloy 6951 properties from the document "Wrought aluminum—magnesium—silicon alloy 6951" by "SubsTech", pp. 1-2 (2012).

* cited by examiner

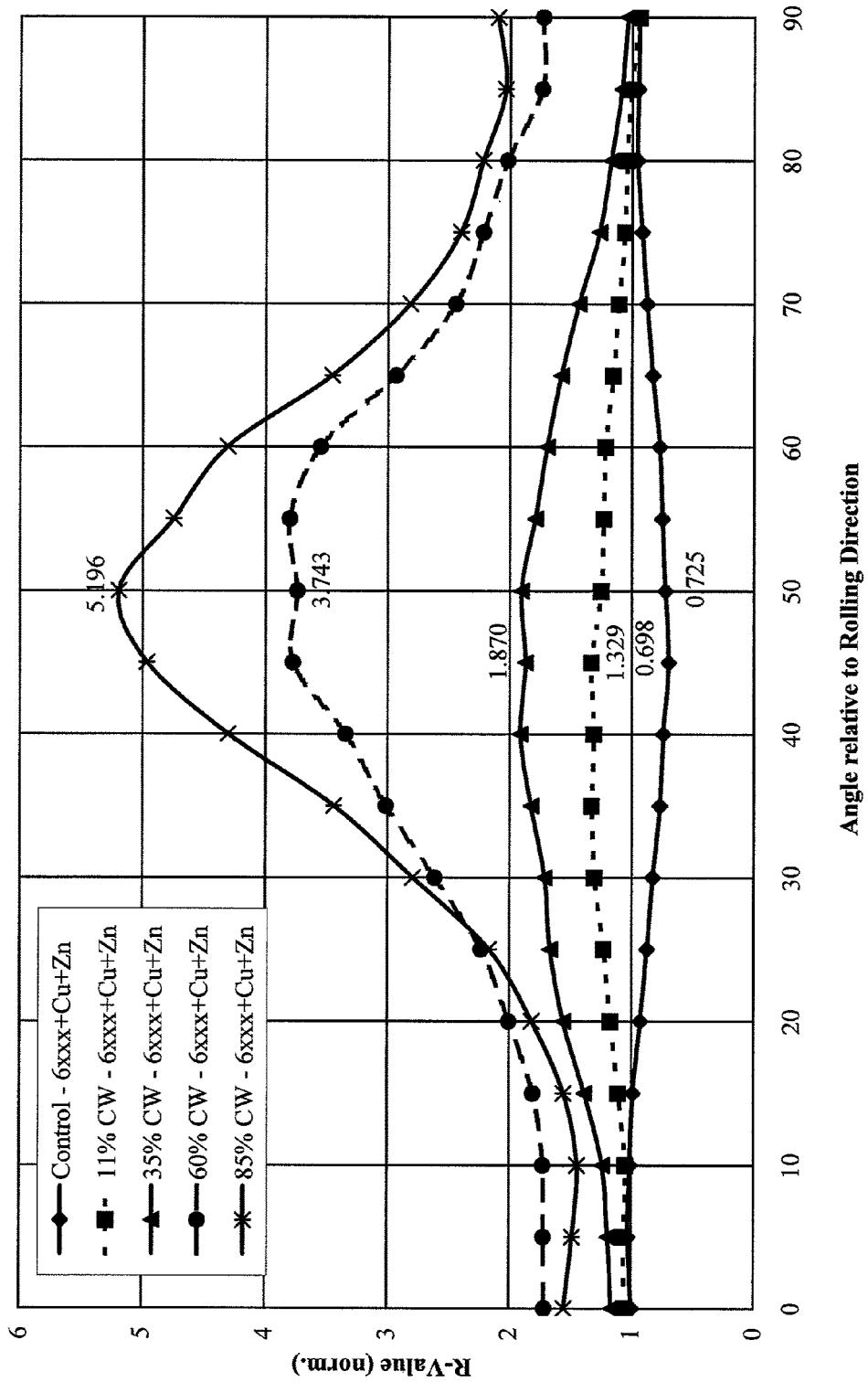

6xxx+Cu+Zn Aluminum Alloy – Control

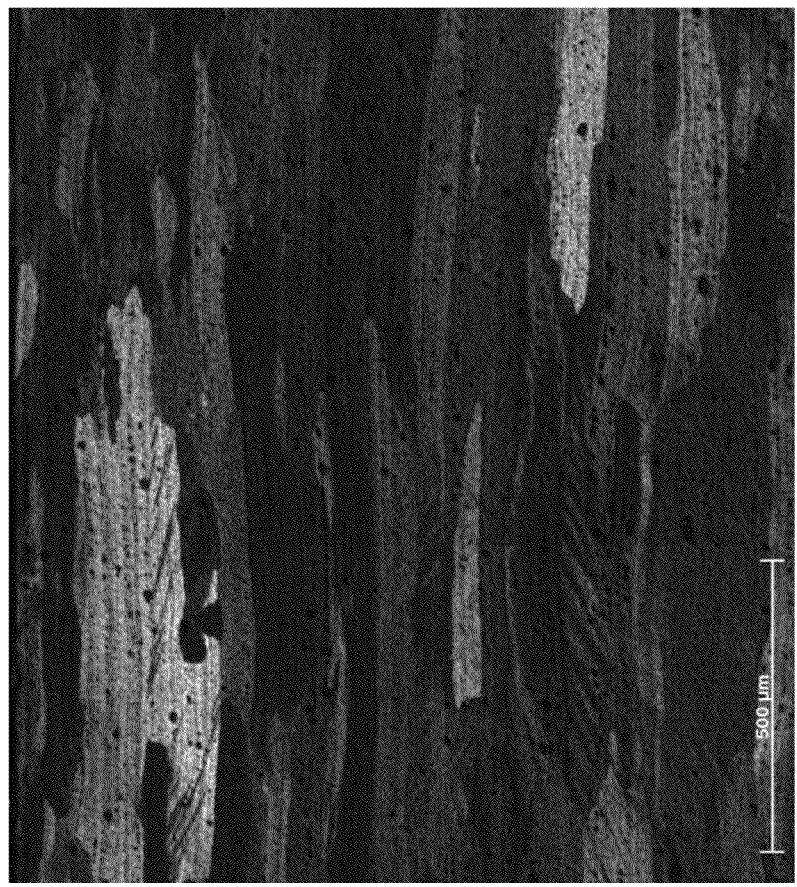
FIG. 11c  6xxx+Cu+Zn Aluminum Alloy – 35% CW

6xxx+Cu+Zn Aluminum Alloy – 60% CW

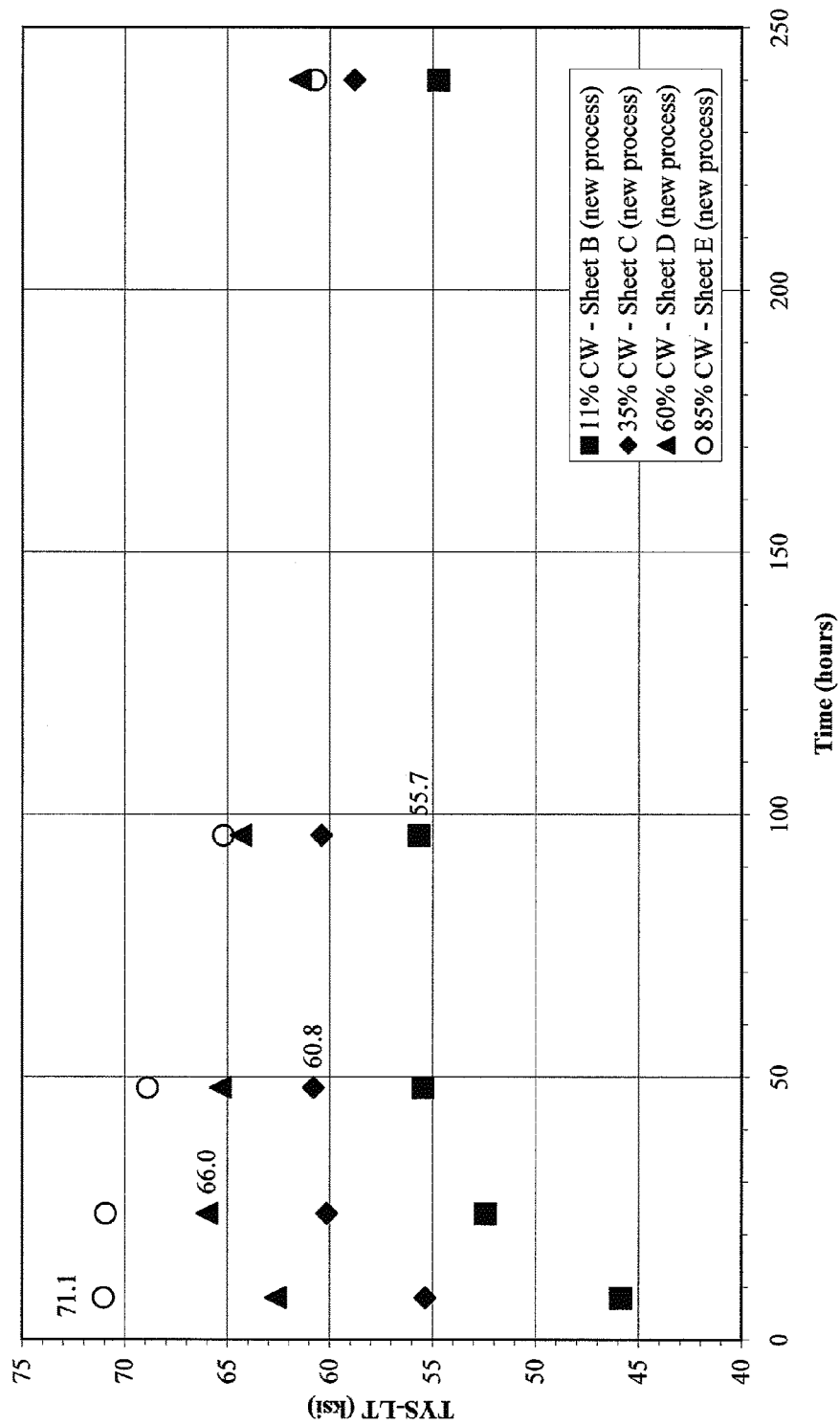

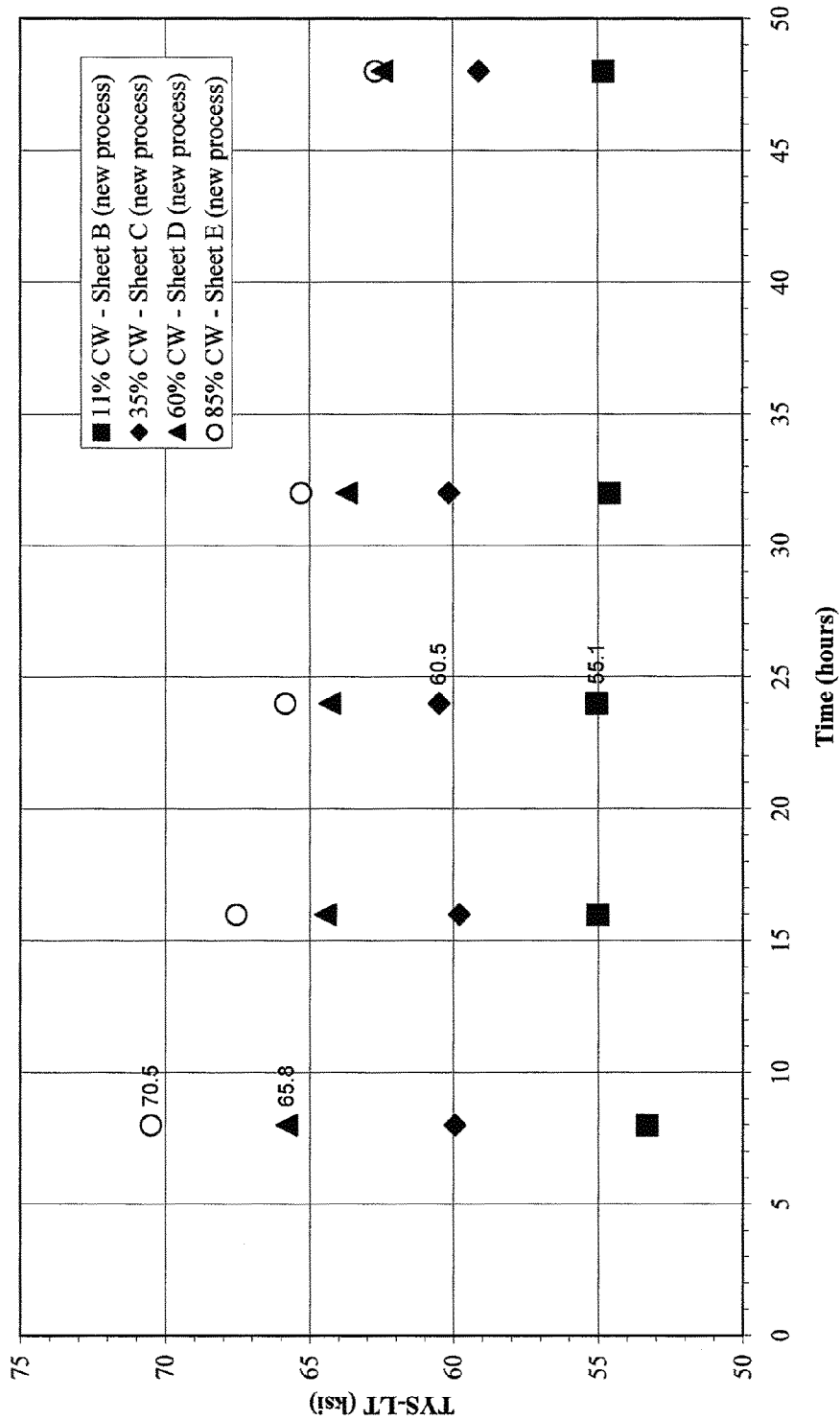
FIG. 15 - TYS v. Time at 325F

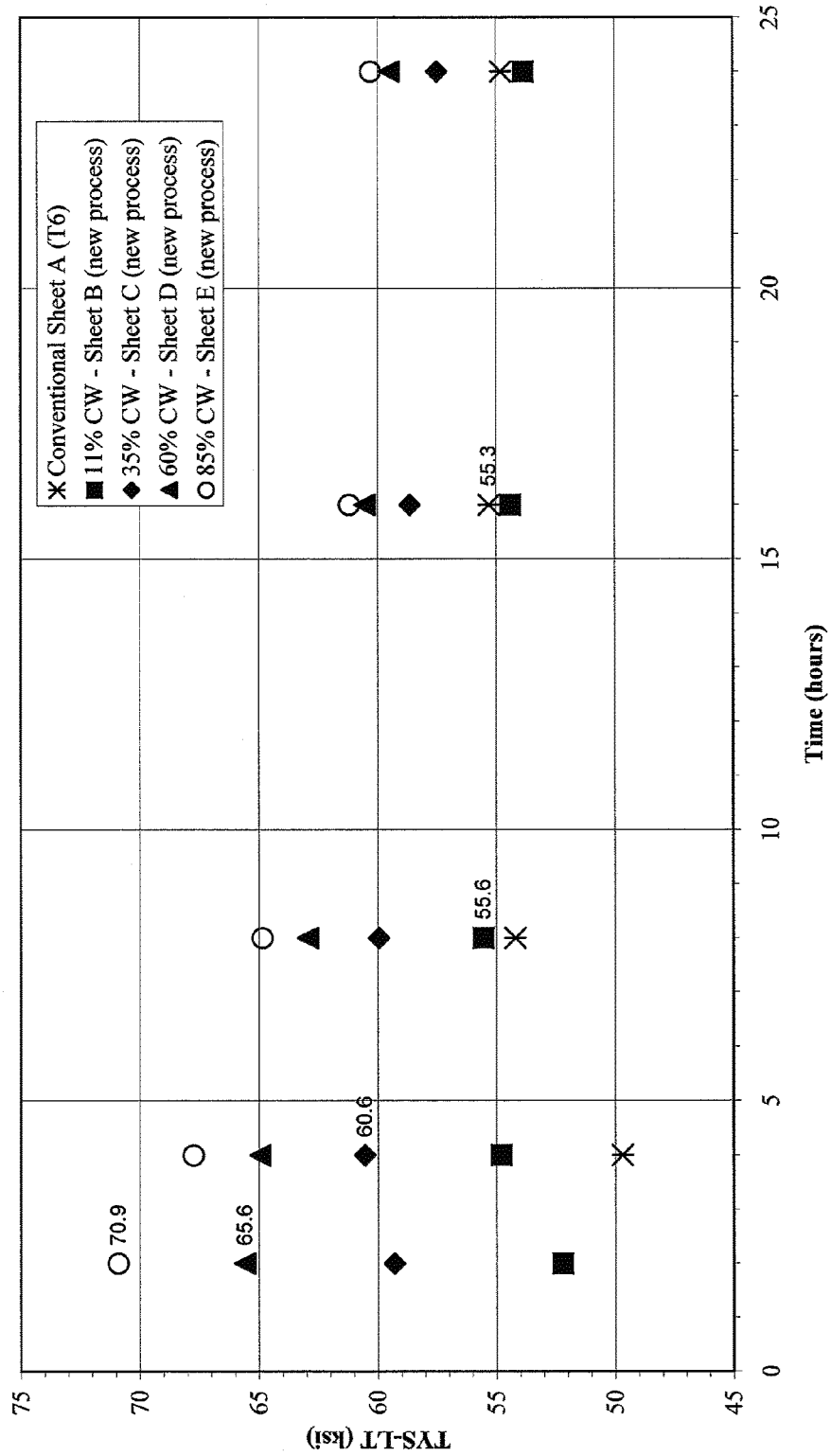

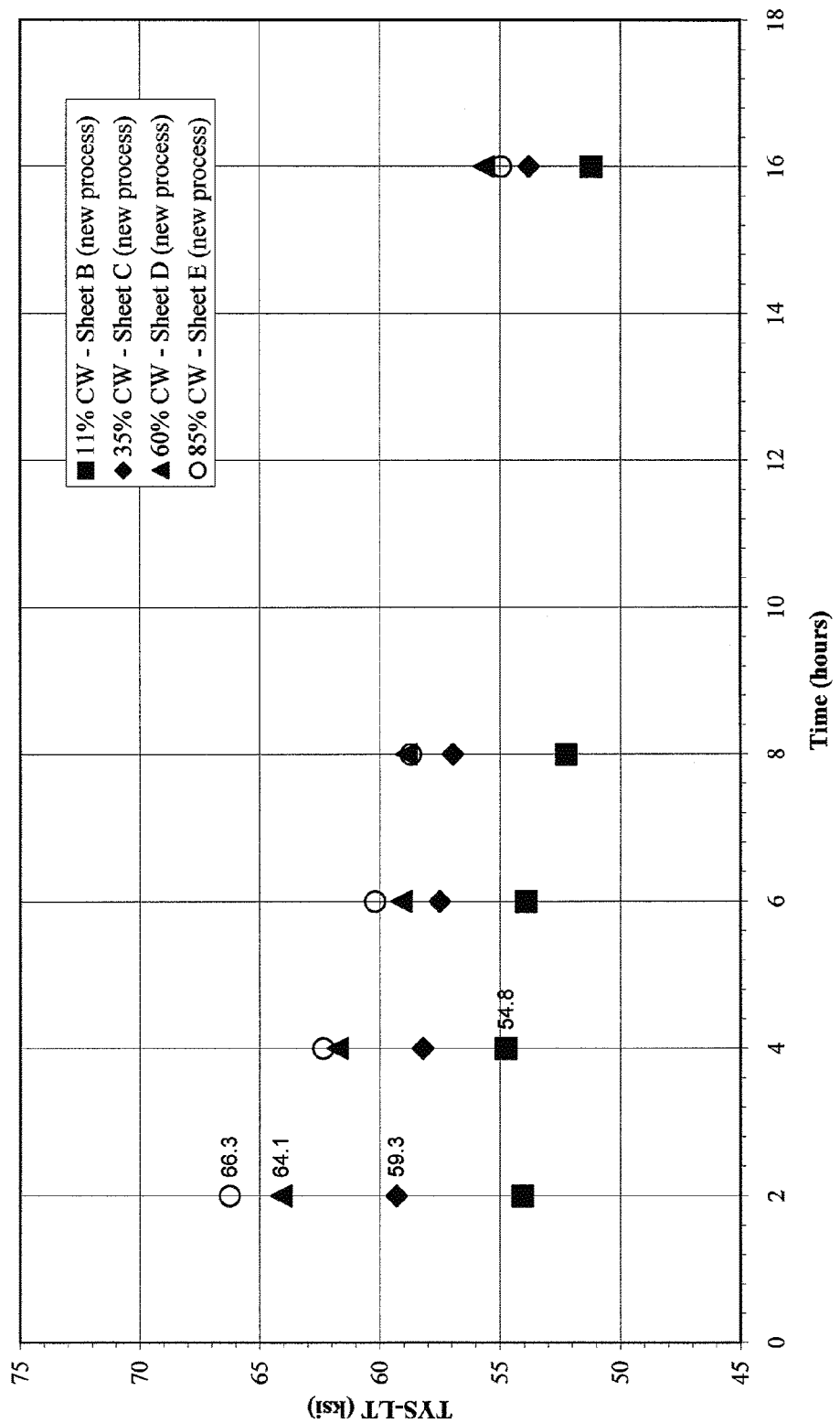
FIG. 17 - TYS v. Time at 375F

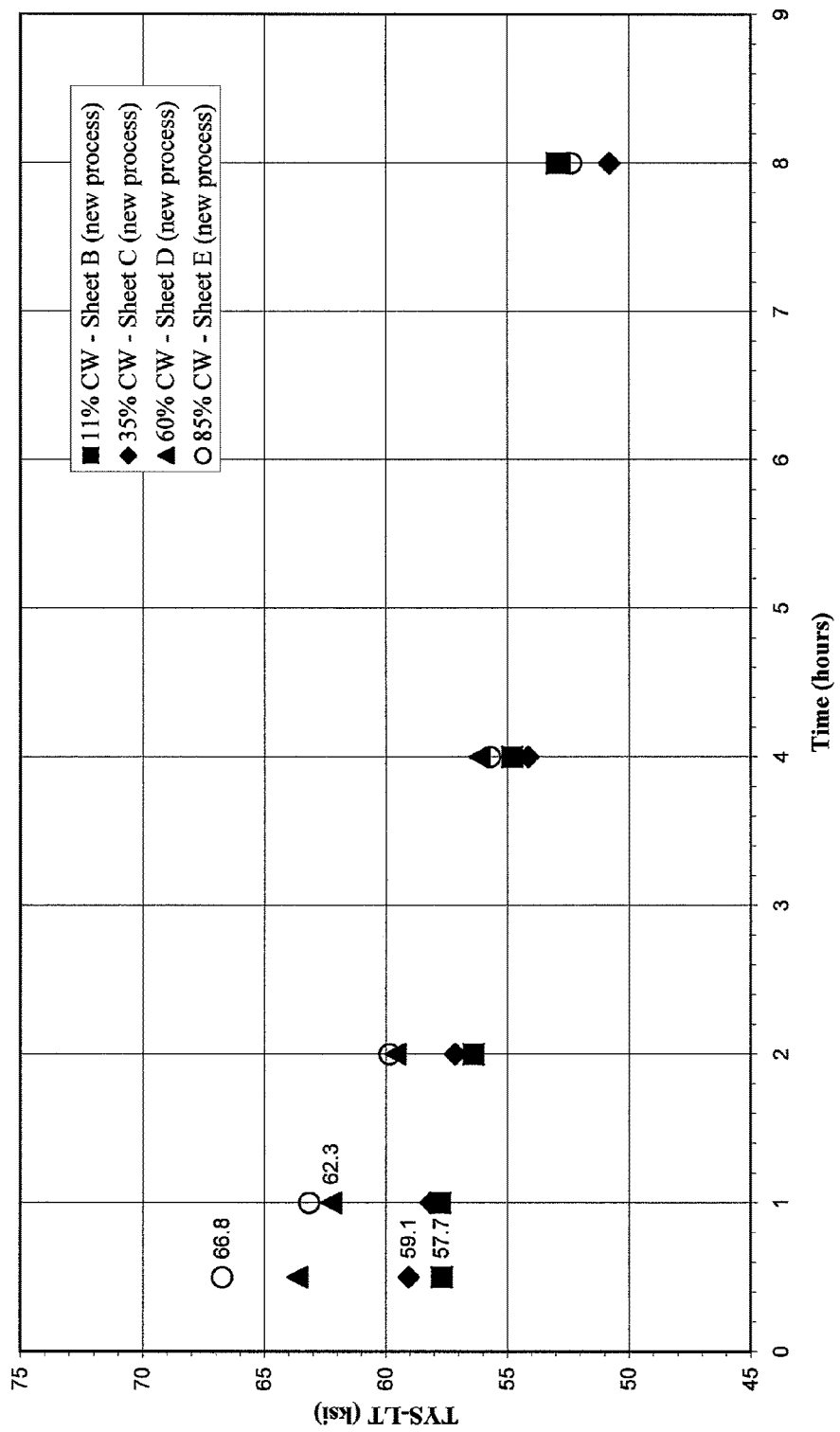
FIG. 18 - TYS v. Time at 400F

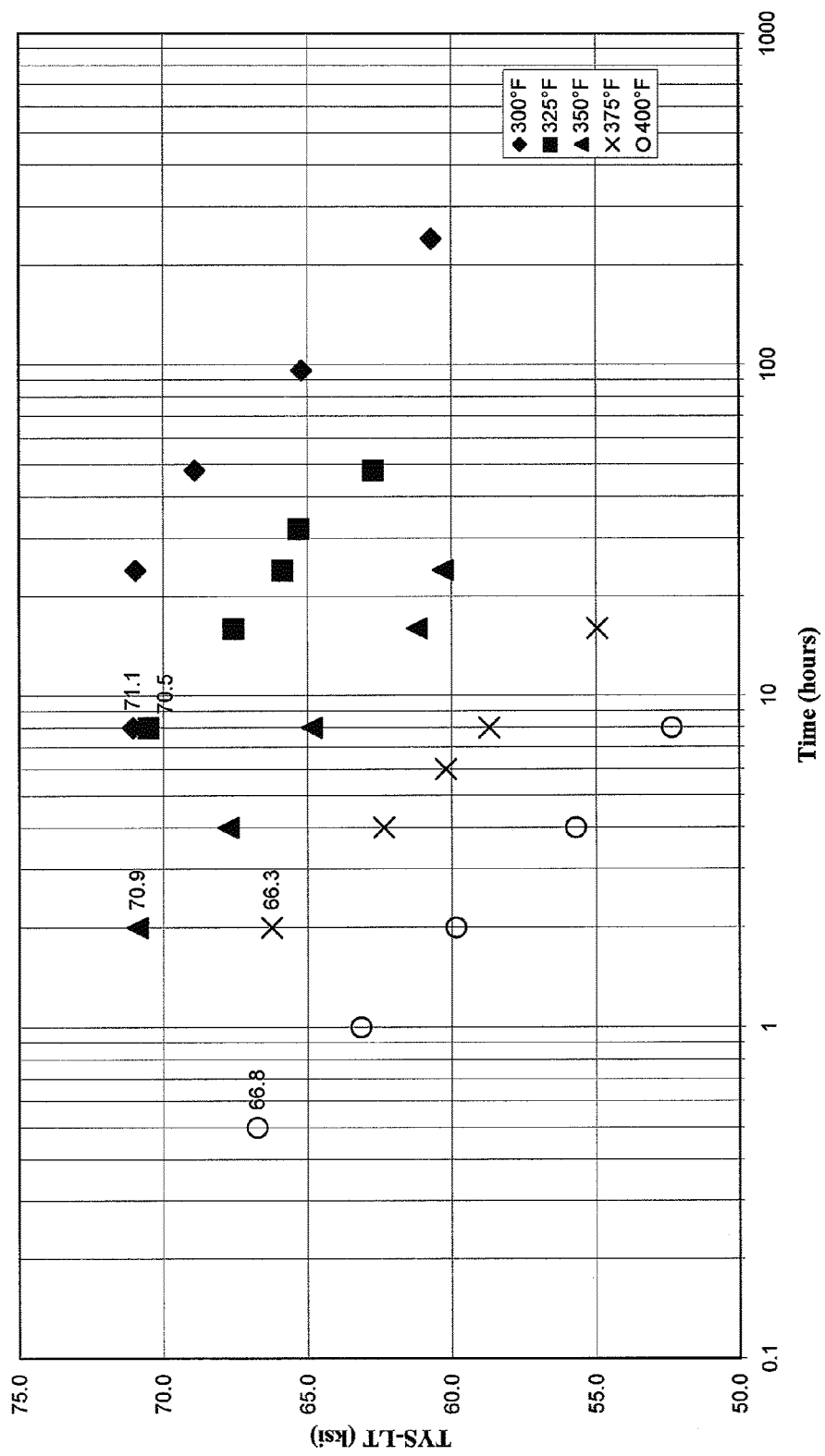

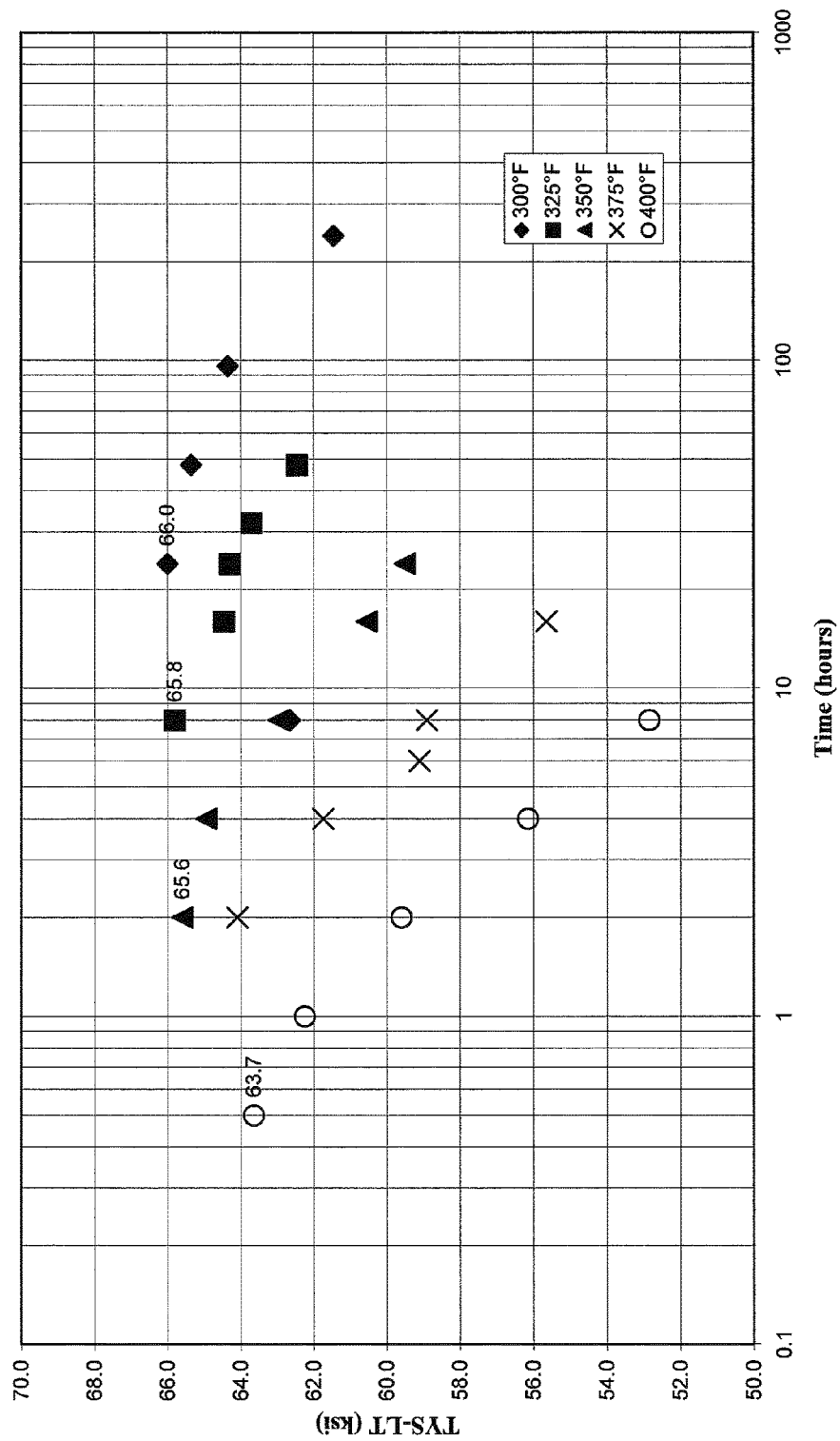

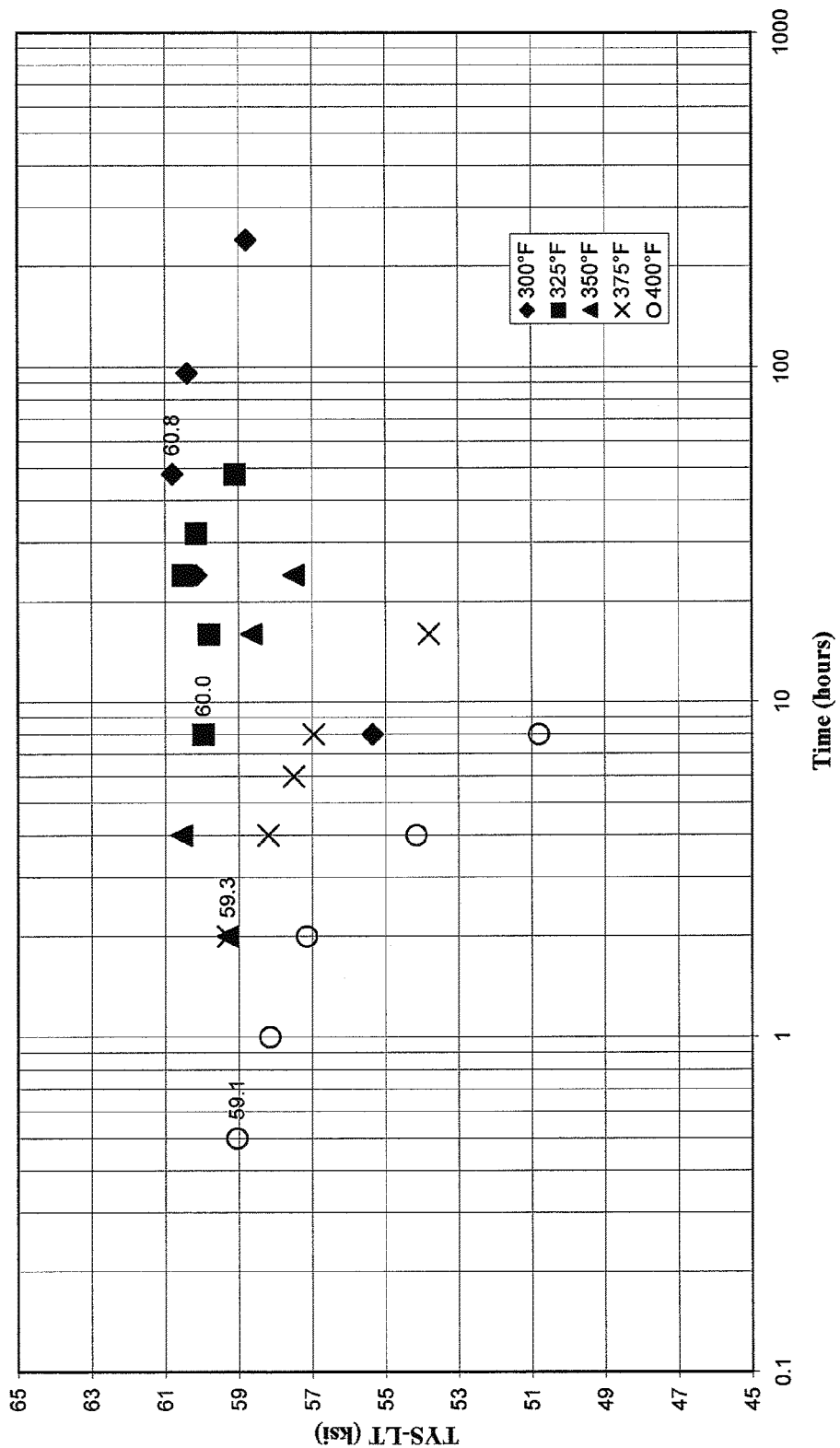

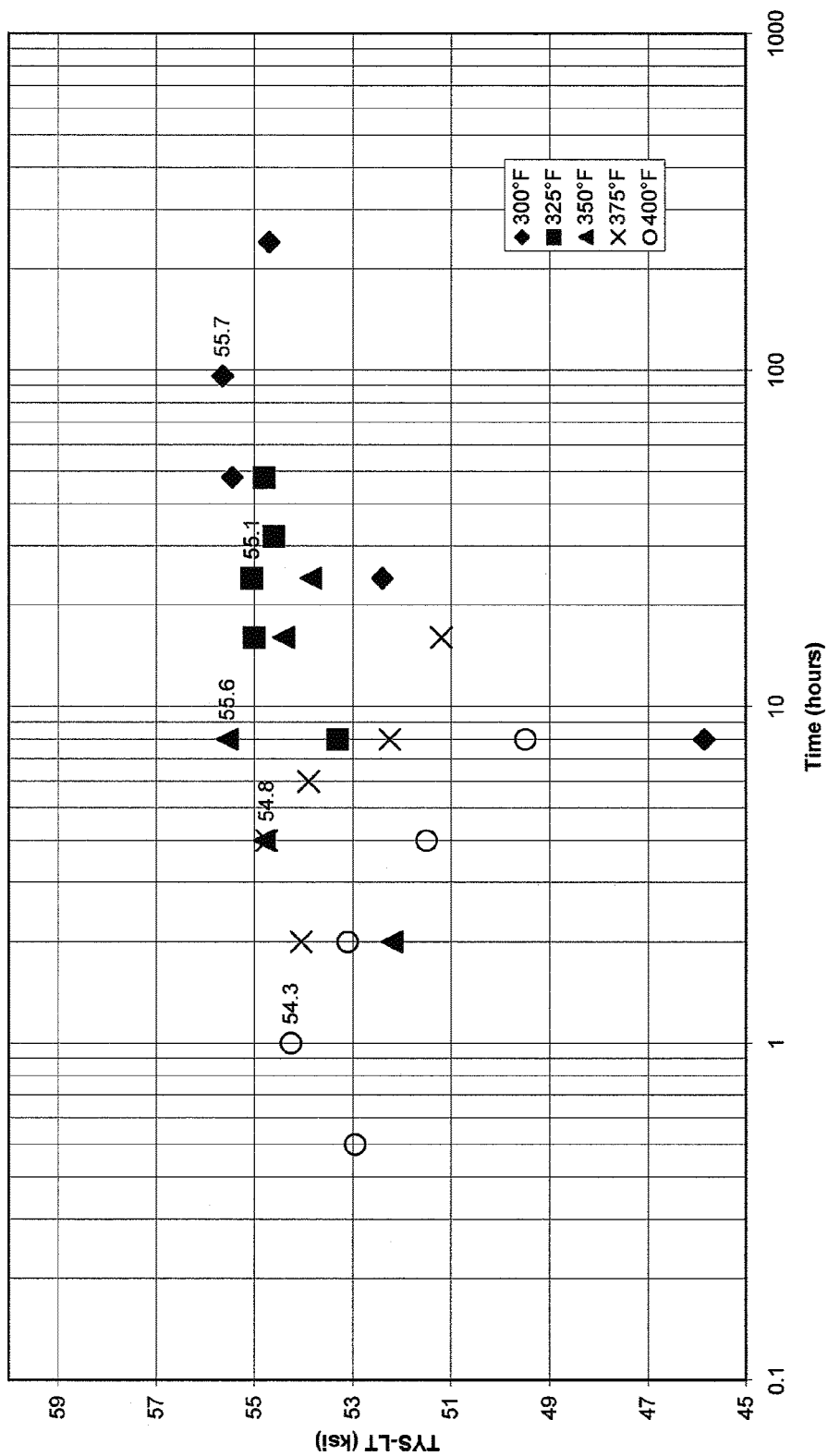

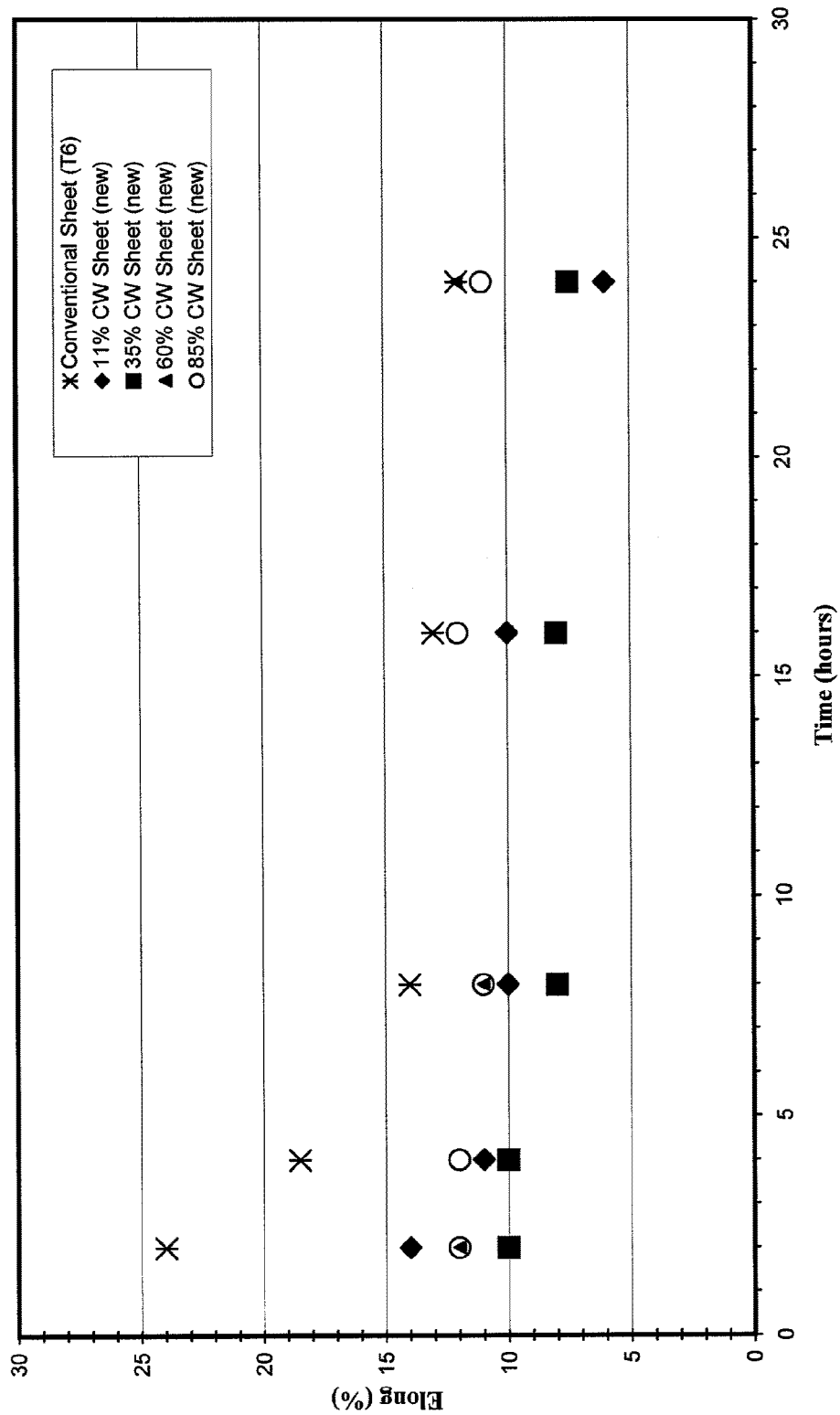
FIG. 23 - Elongation v. Time at 350F

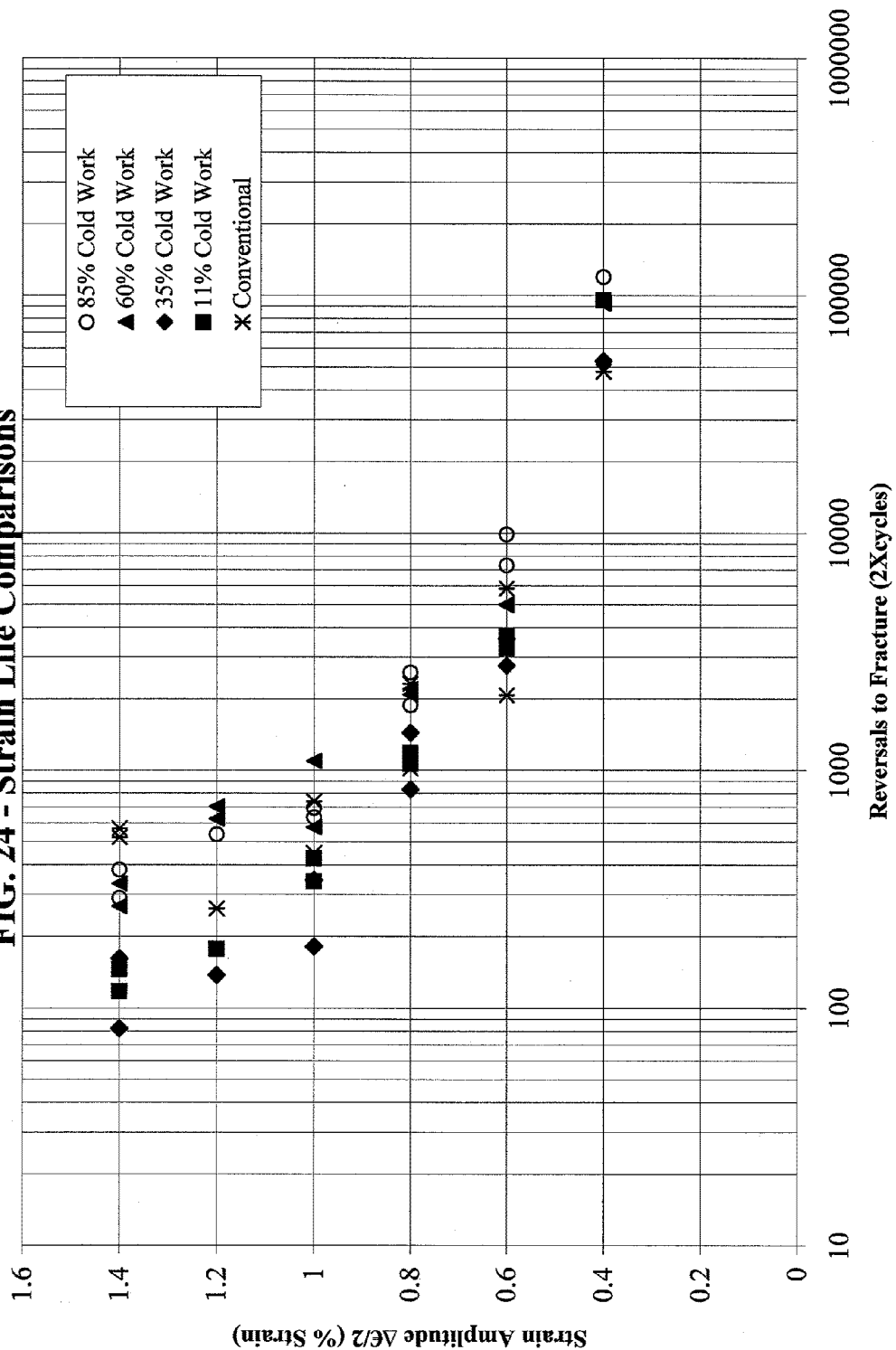

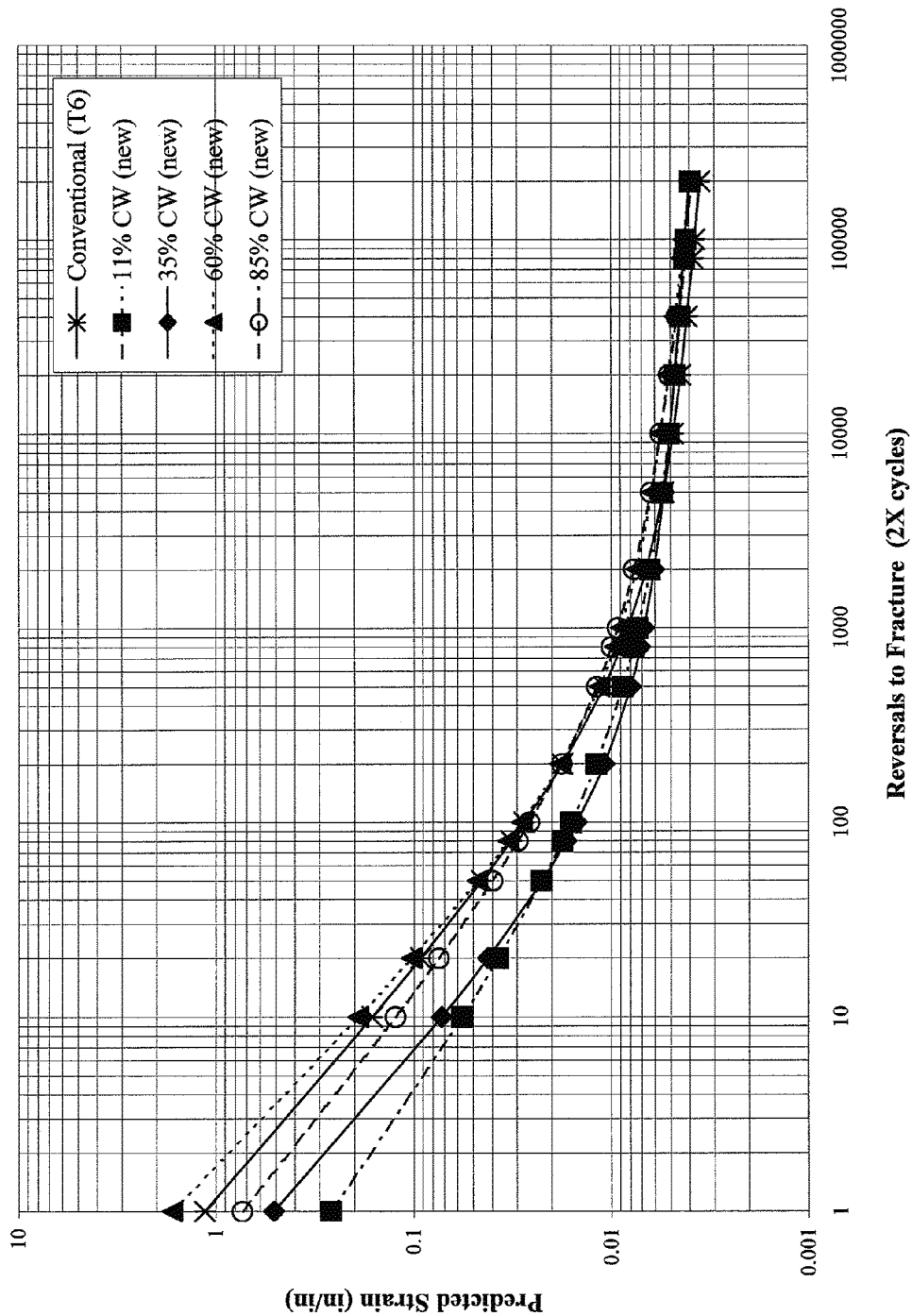

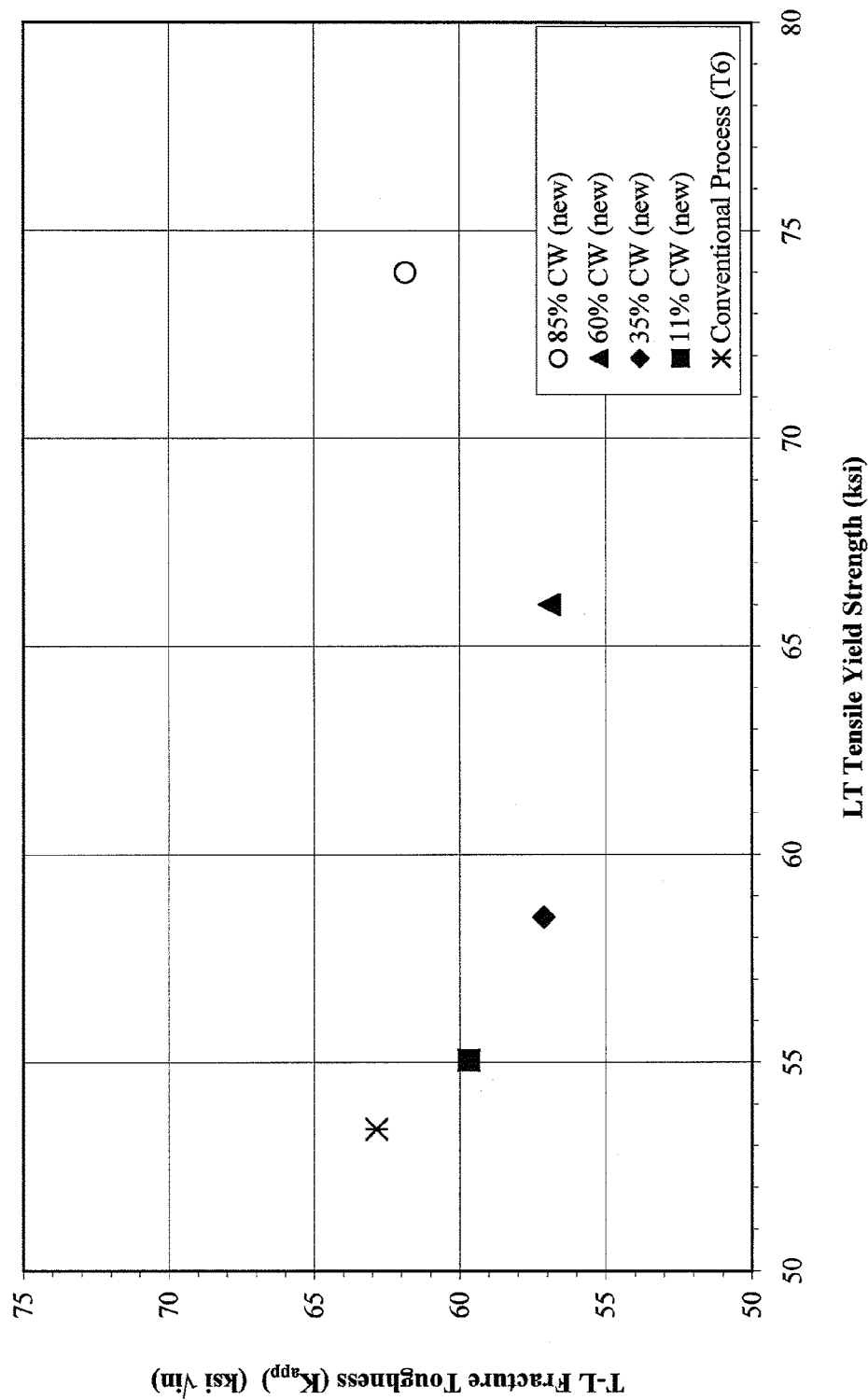

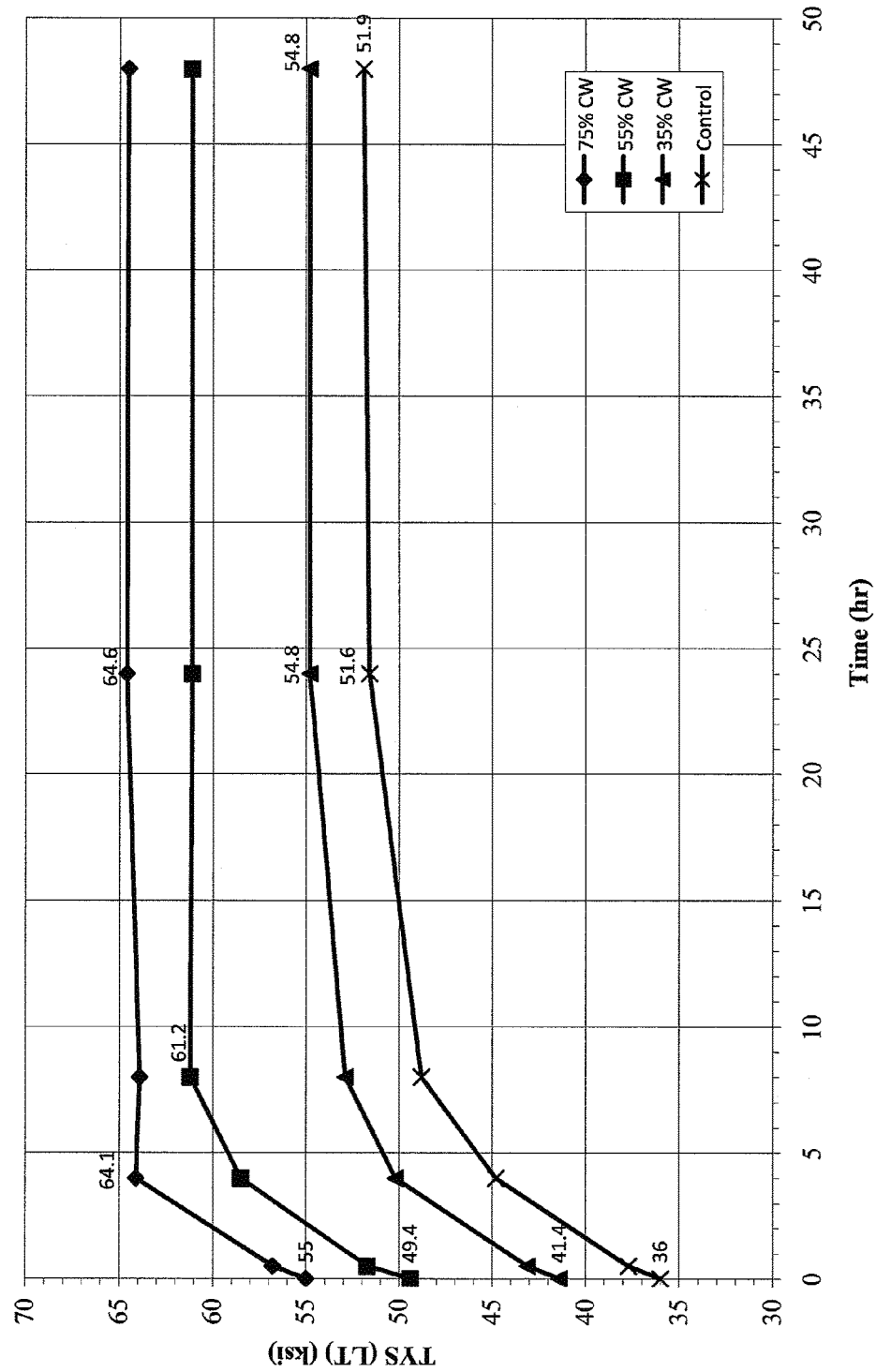

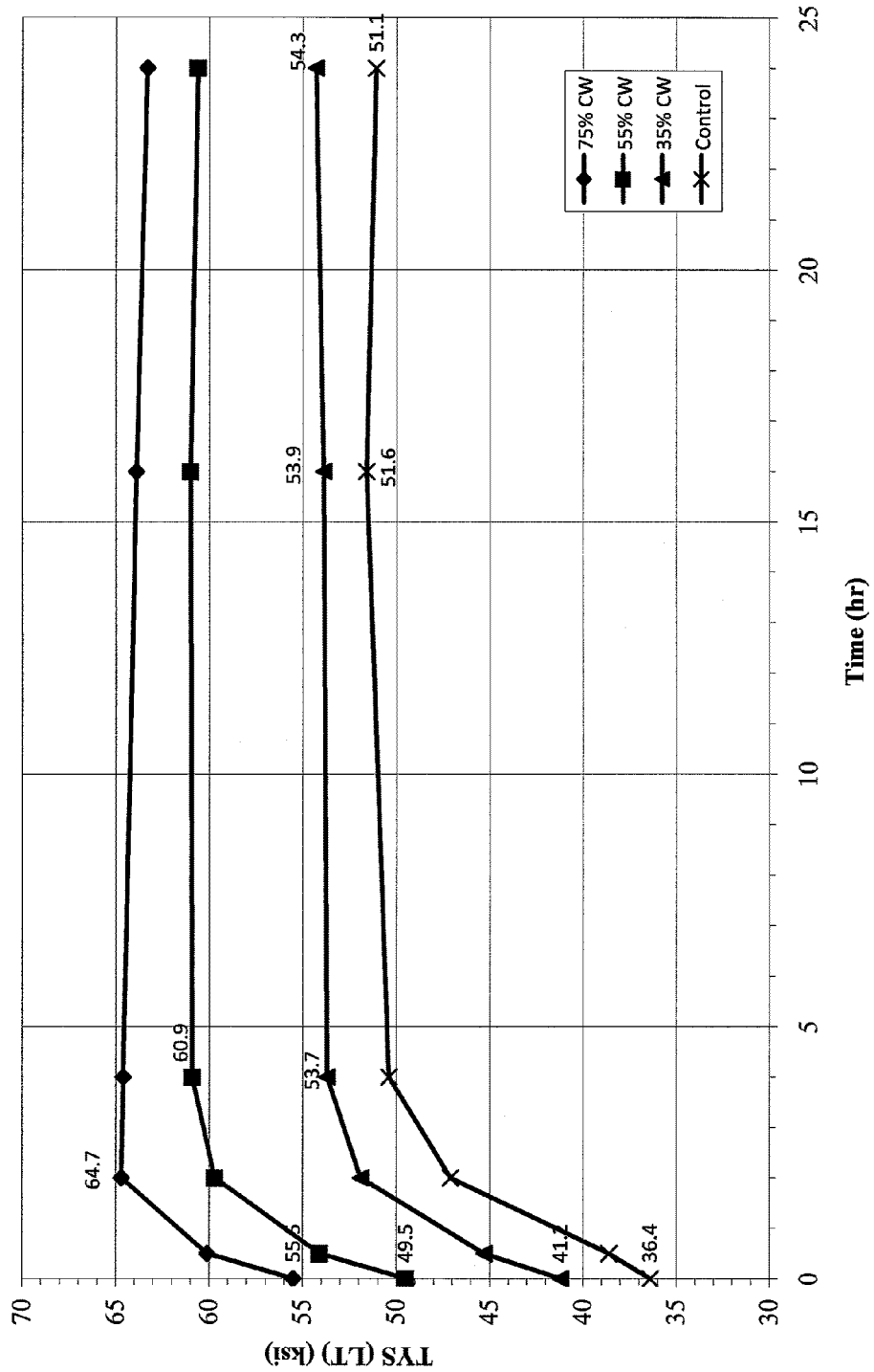
FIG. 28 - TYS of Alloy 6013 treated at 350F

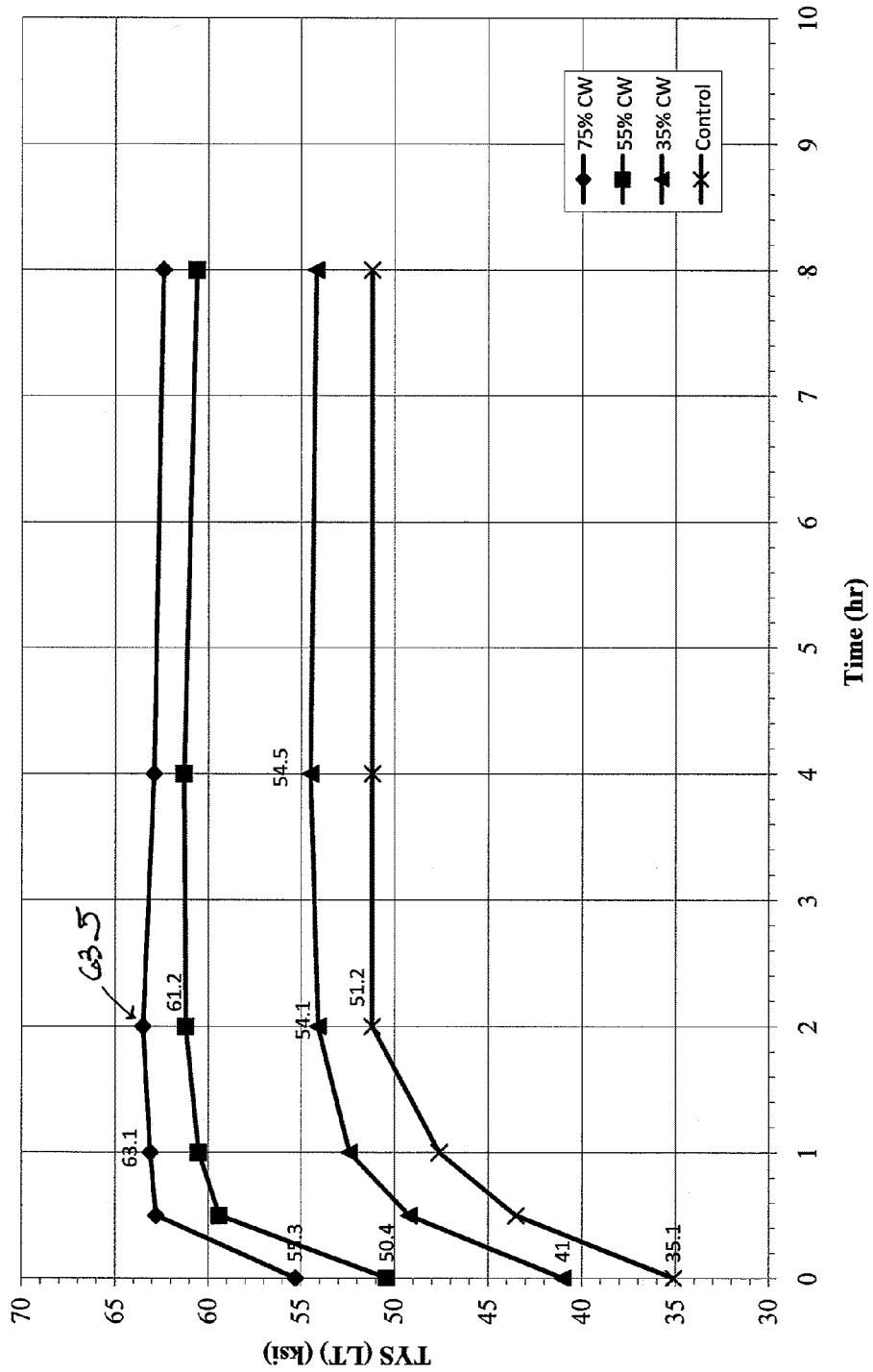
FIG. 29 - TYS of Alloy 6013 treated at 375F

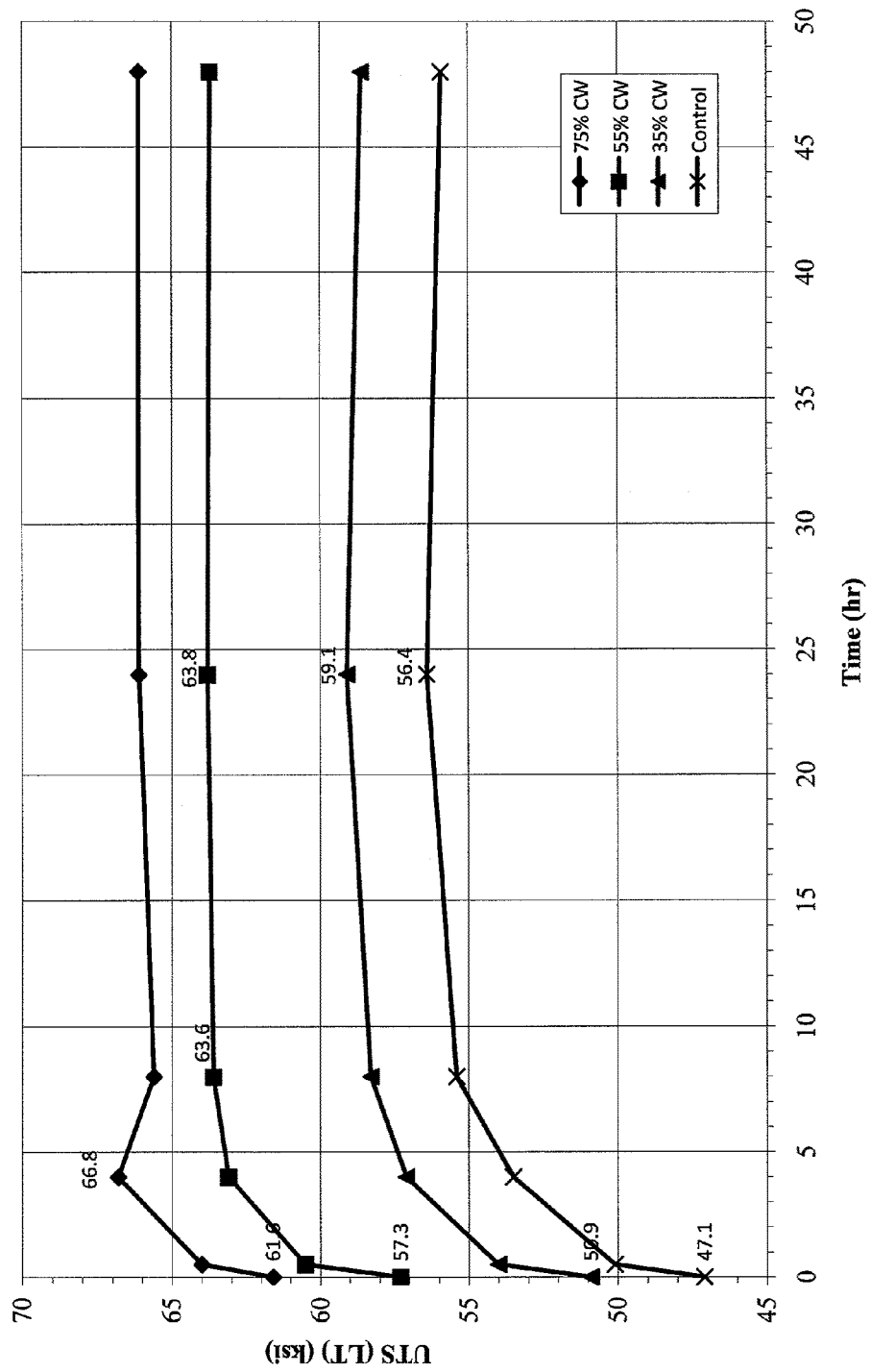

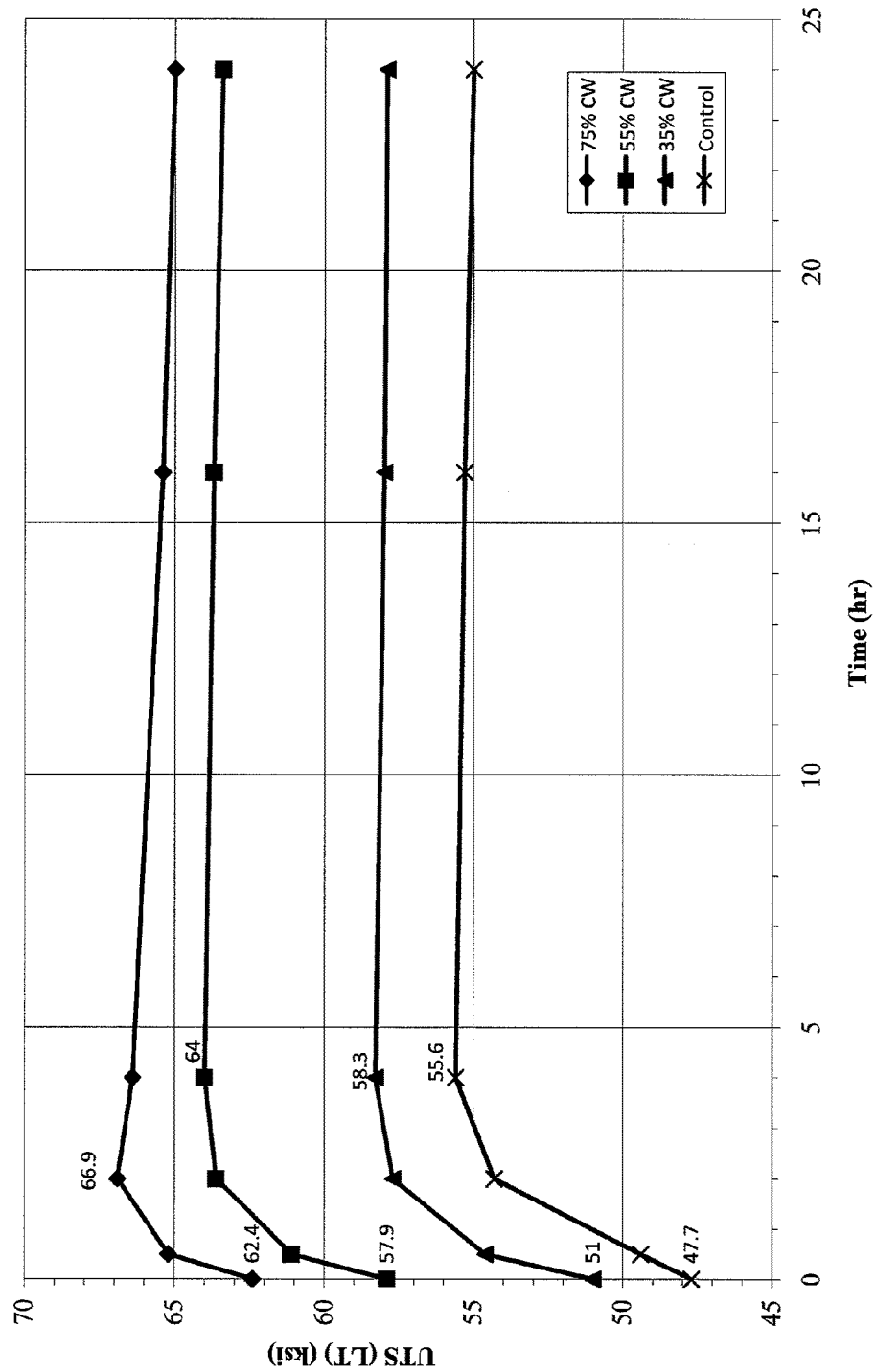
FIG. 31 - UTS of Alloy 6013 treated at 350F

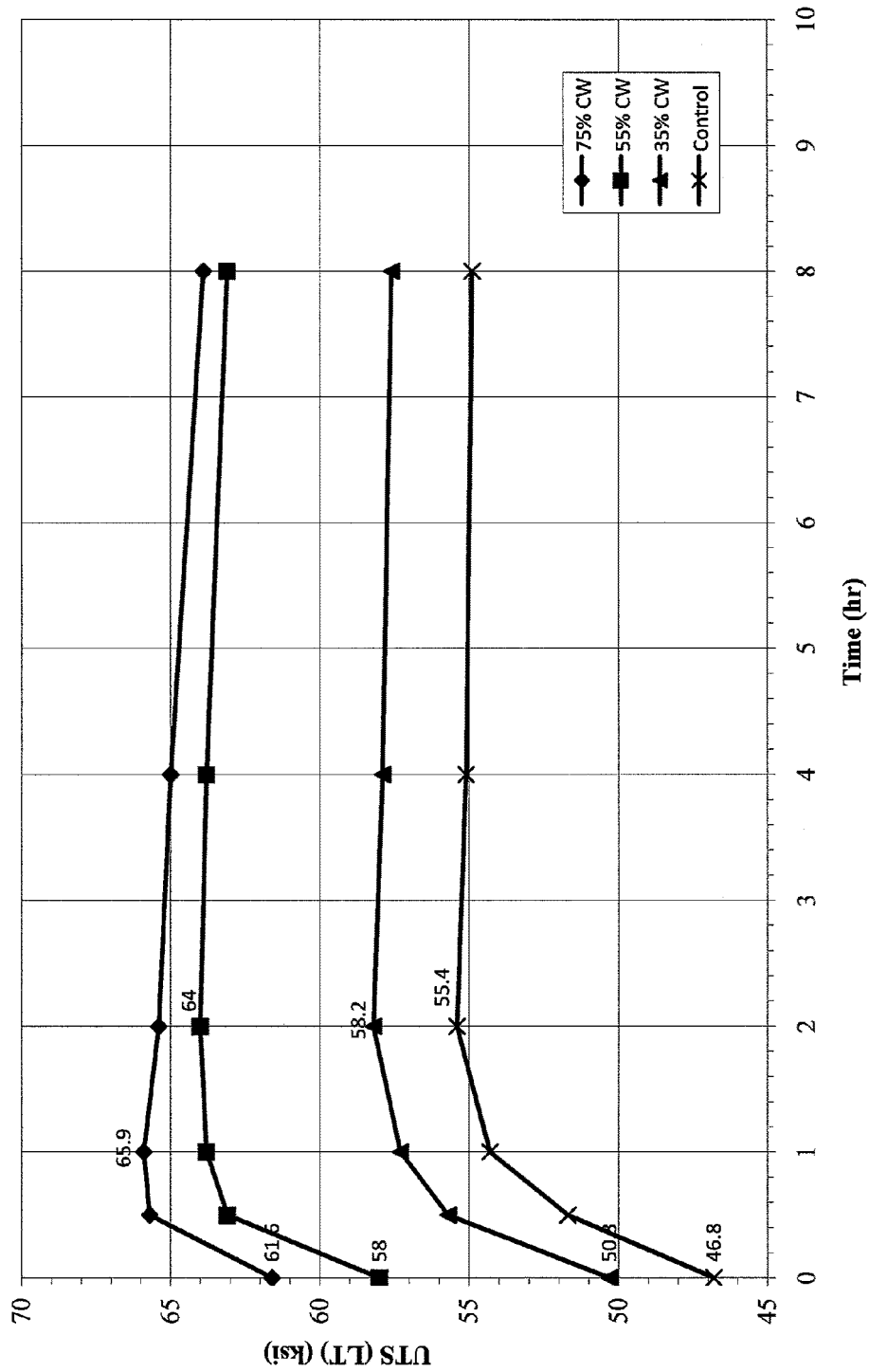
FIG. 32 – UTS of Alloy 6013 treated at 375F

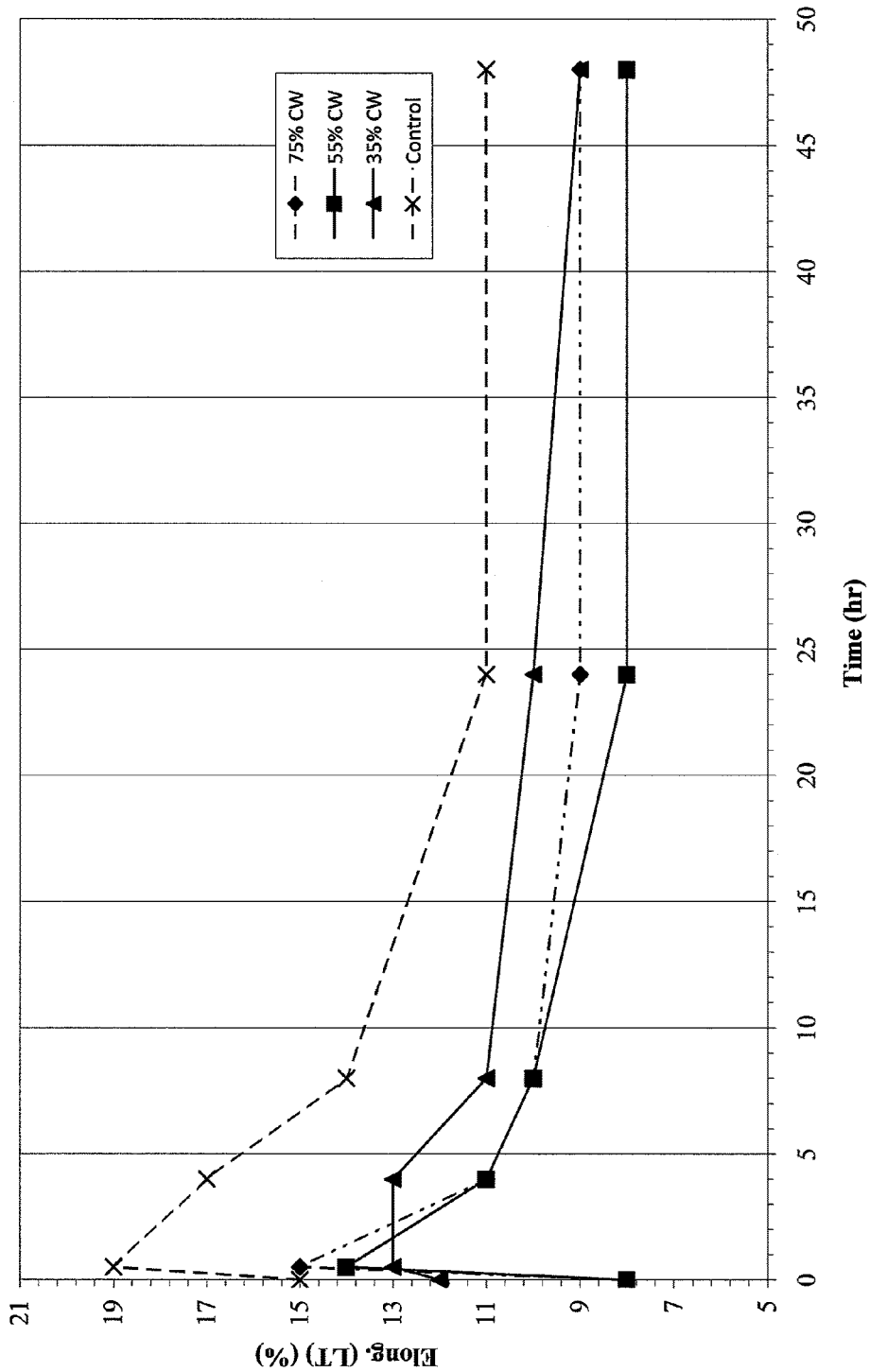
FIG. 33 - Elong. of Alloy 6013 treated at 325F

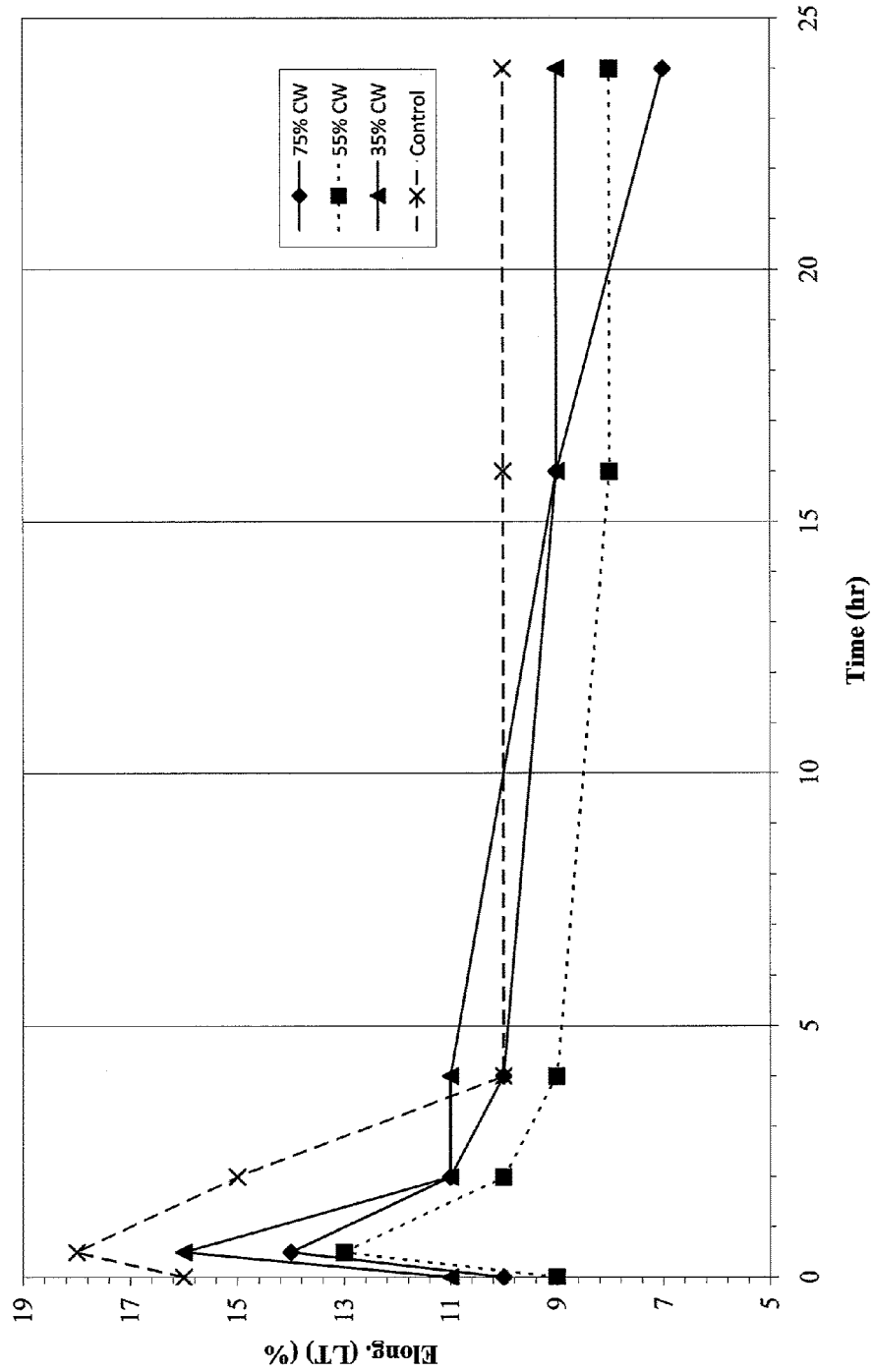
FIG. 34 - Elong. of Alloy 6013 treated at 350F

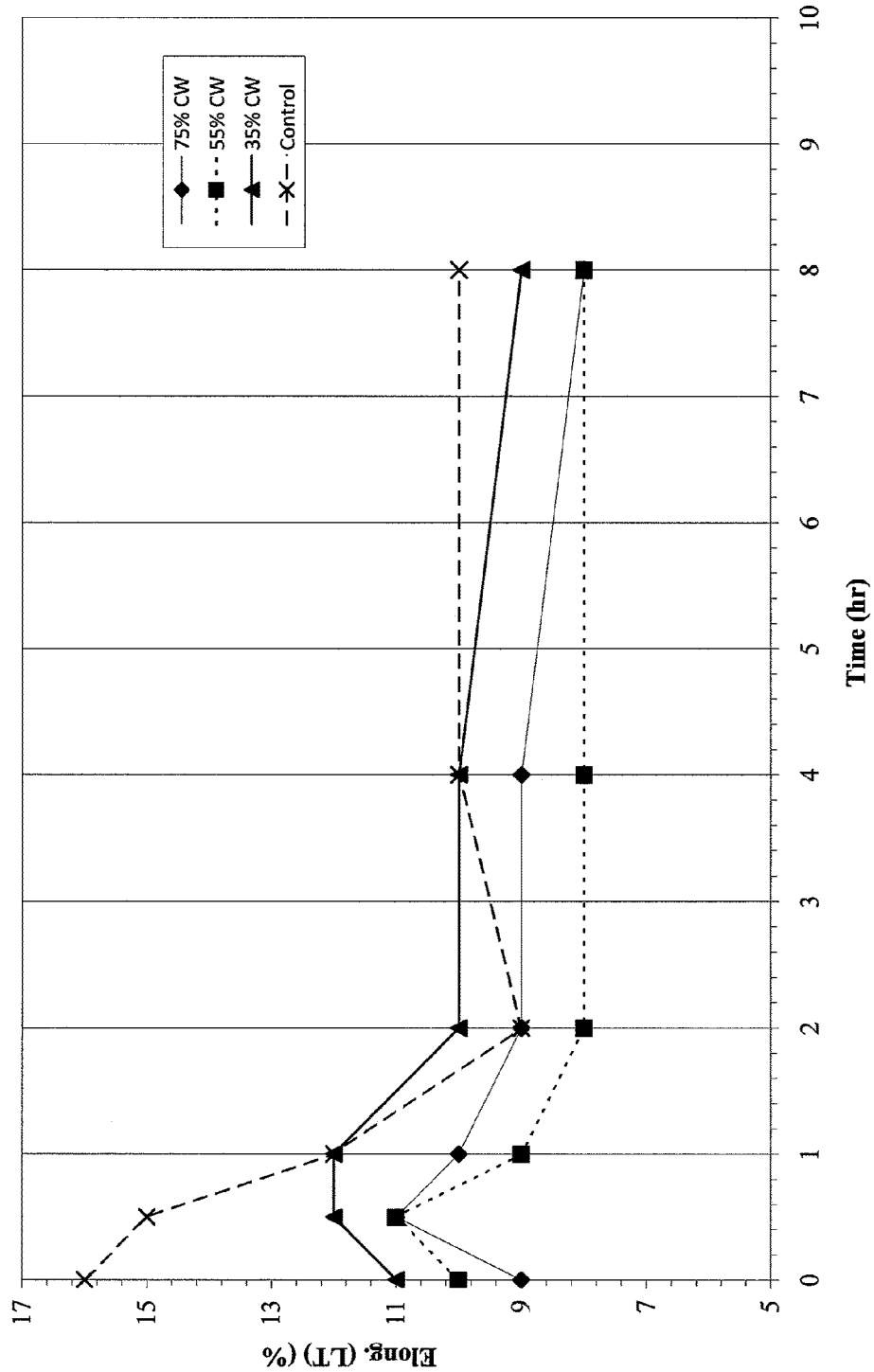
FIG. 35 - Elong. of Alloy 6013 treated at 375F

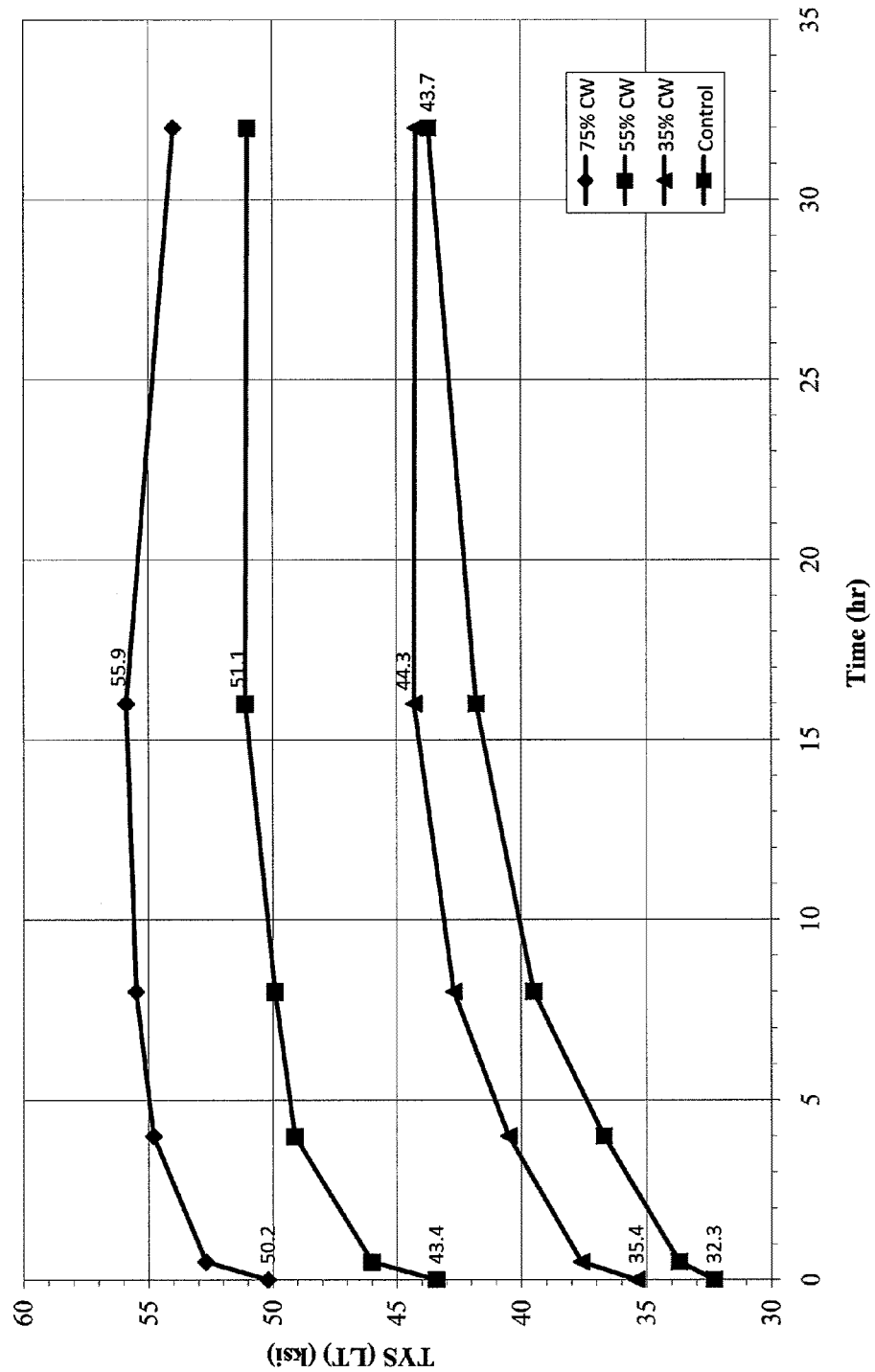
FIG. 36 - 6061 thermally treated at 325F

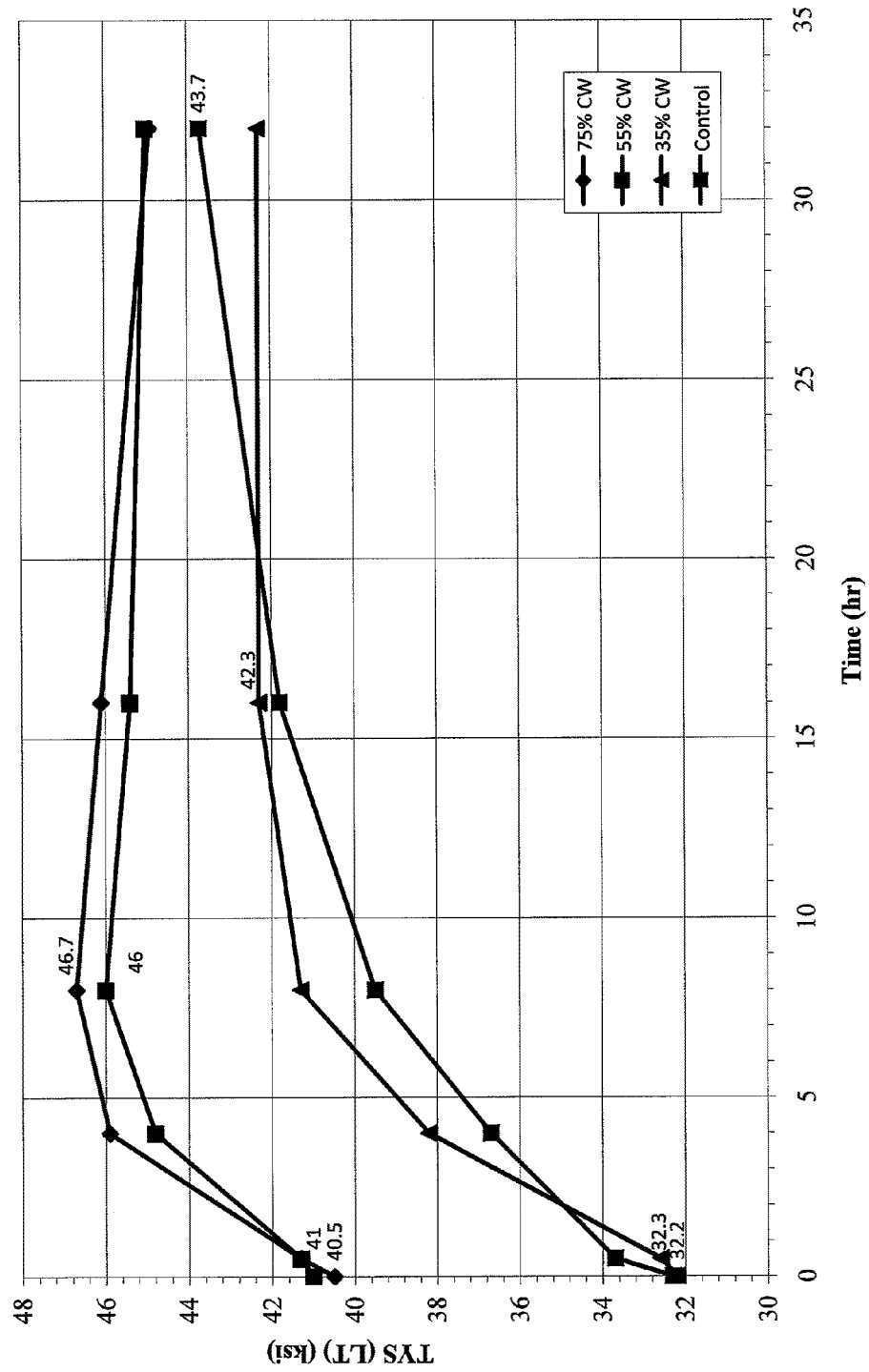
FIG. 37 - 6022 thermally treated at 325F

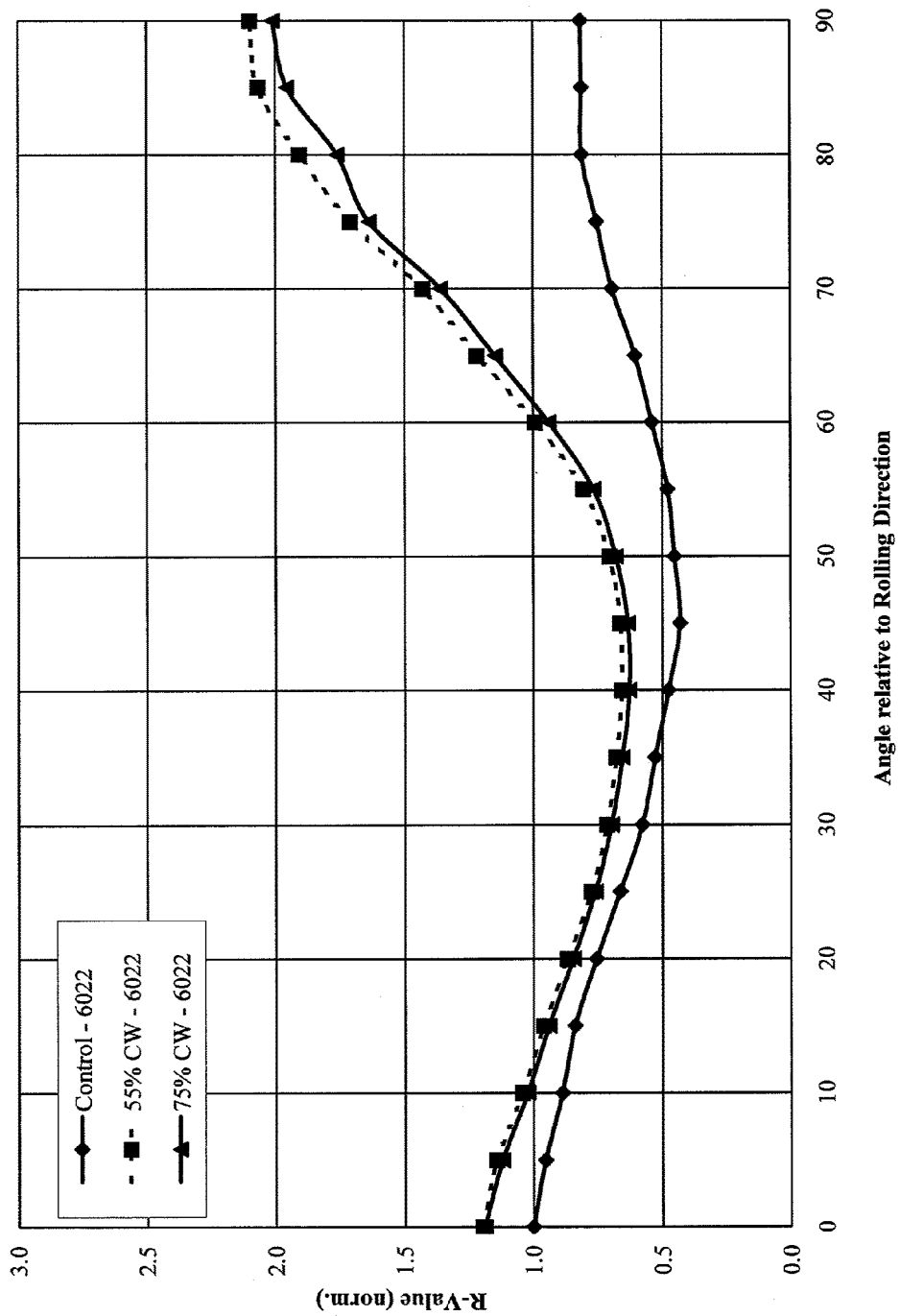
FIG. 38 - 6022 - R-Values (normalized)

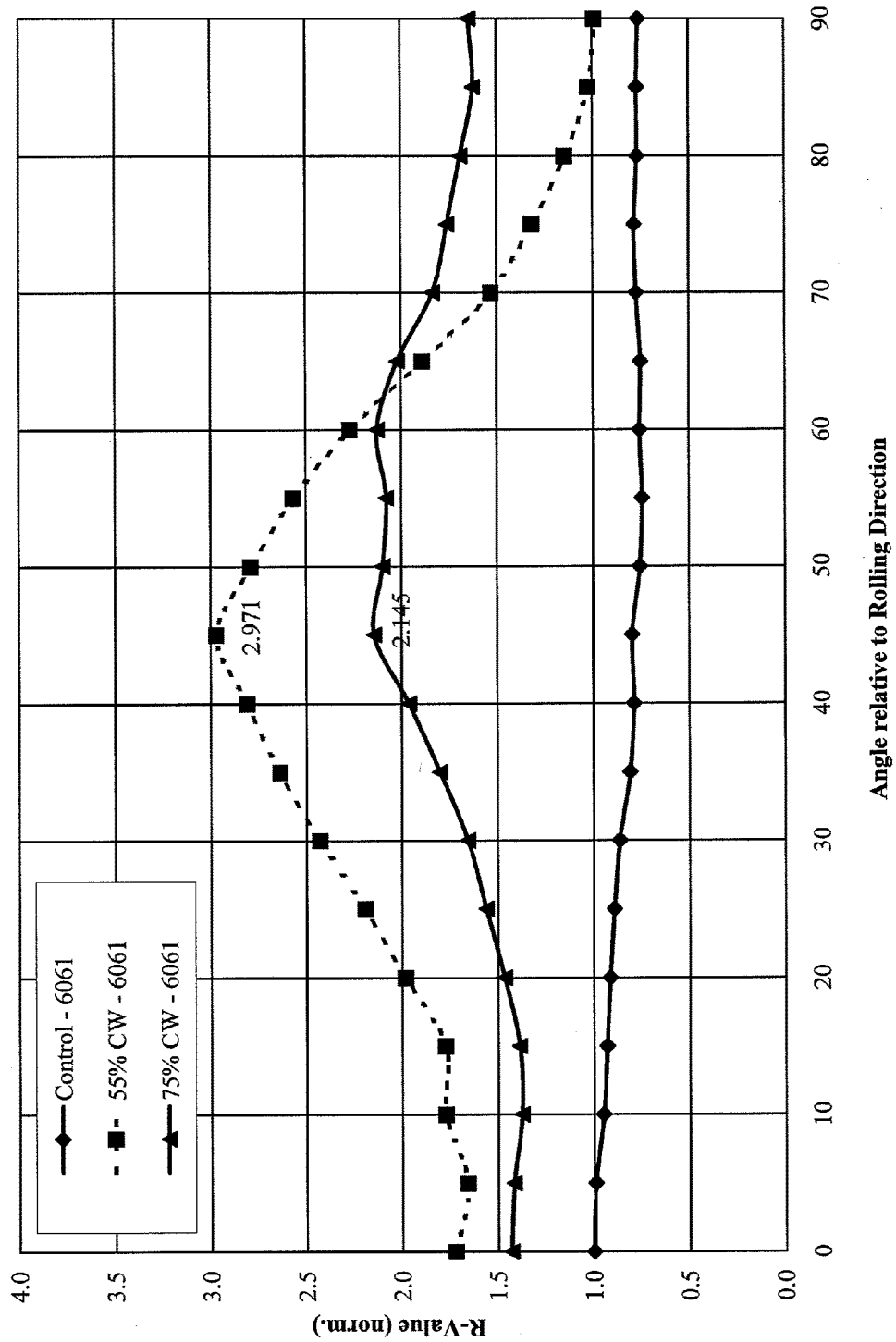

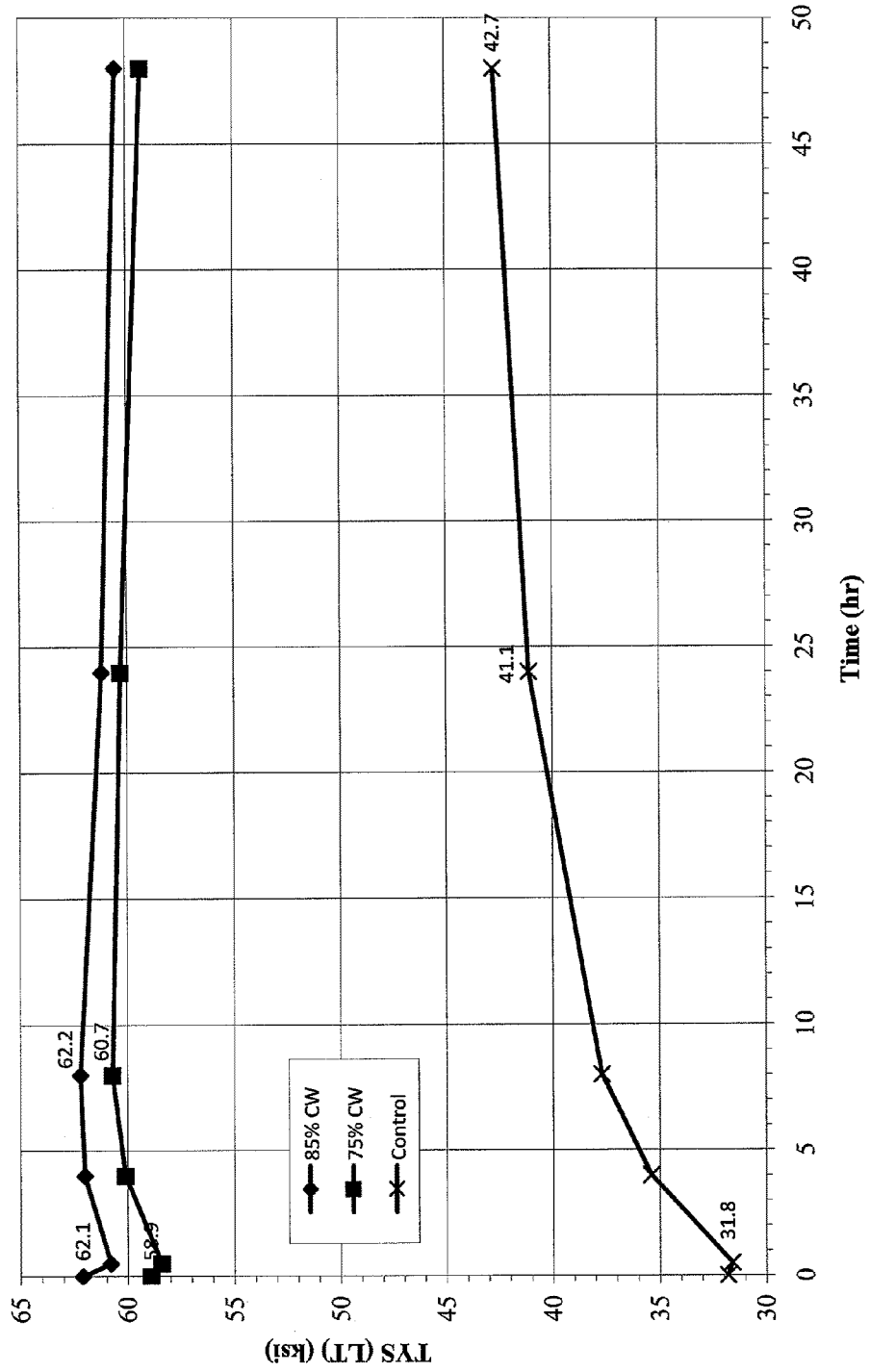

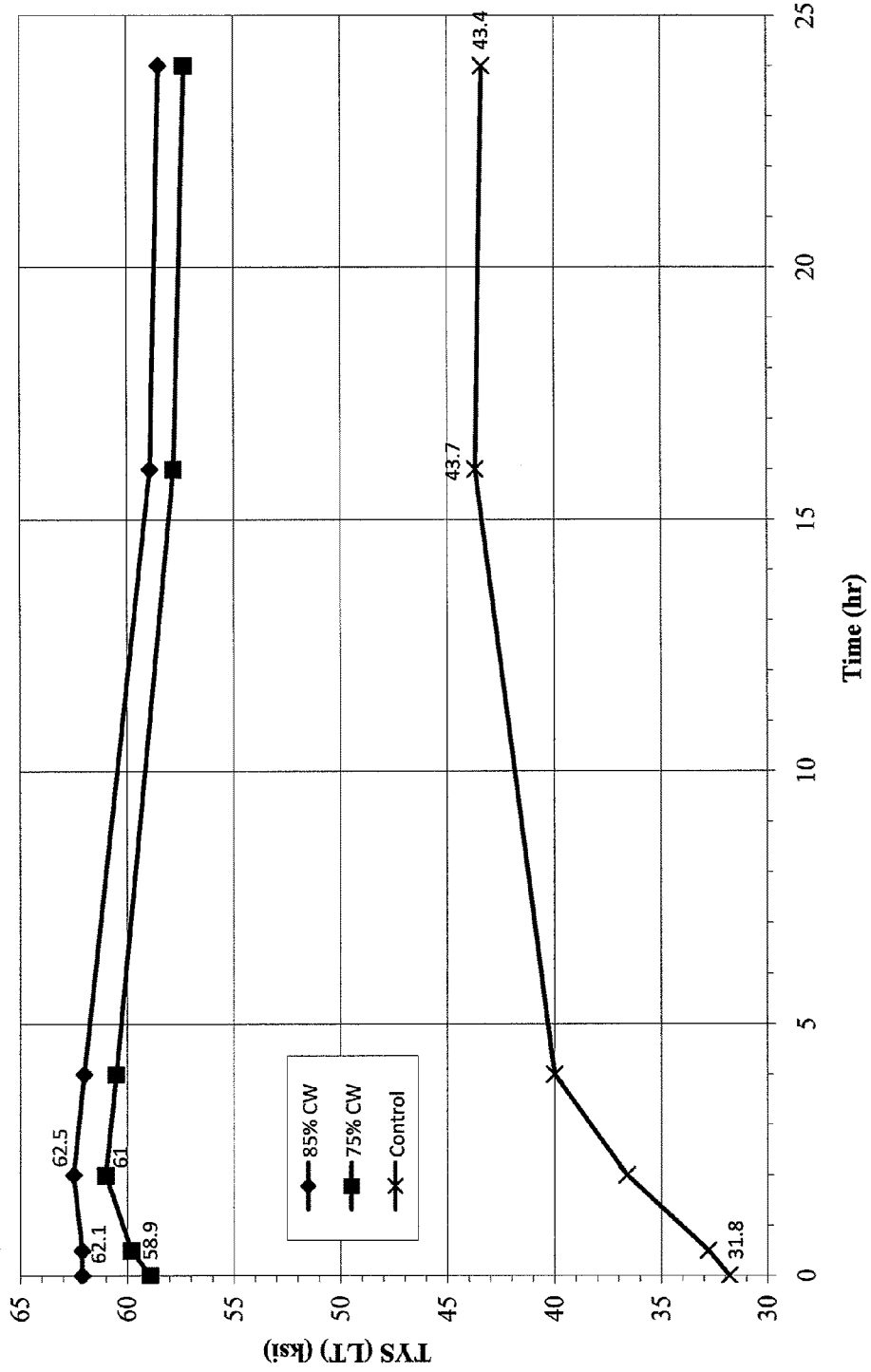
FIG. 41 - TYS of 6xxx-High-Mg alloy treated at 350F (0.08 inch sheet)

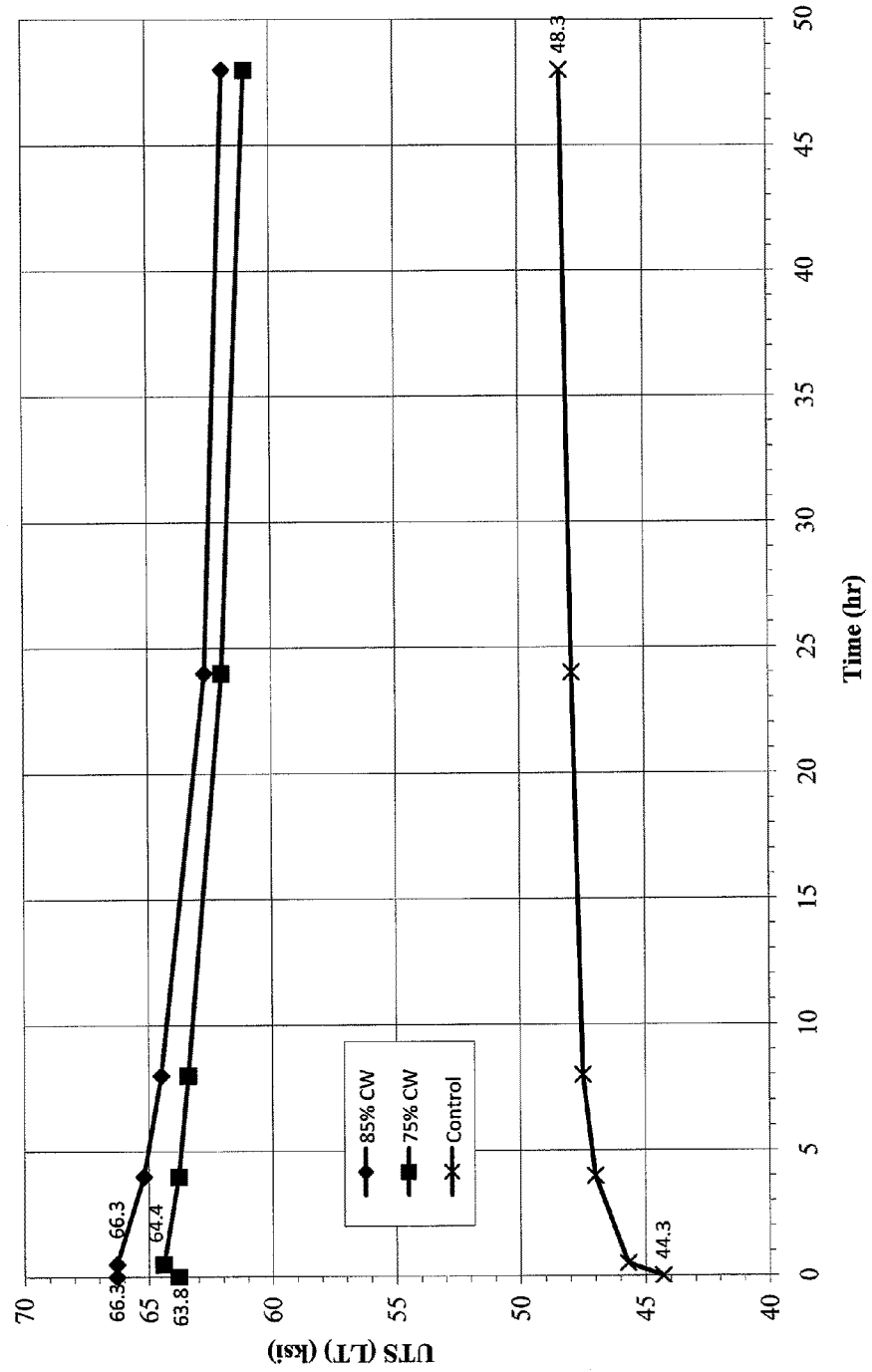

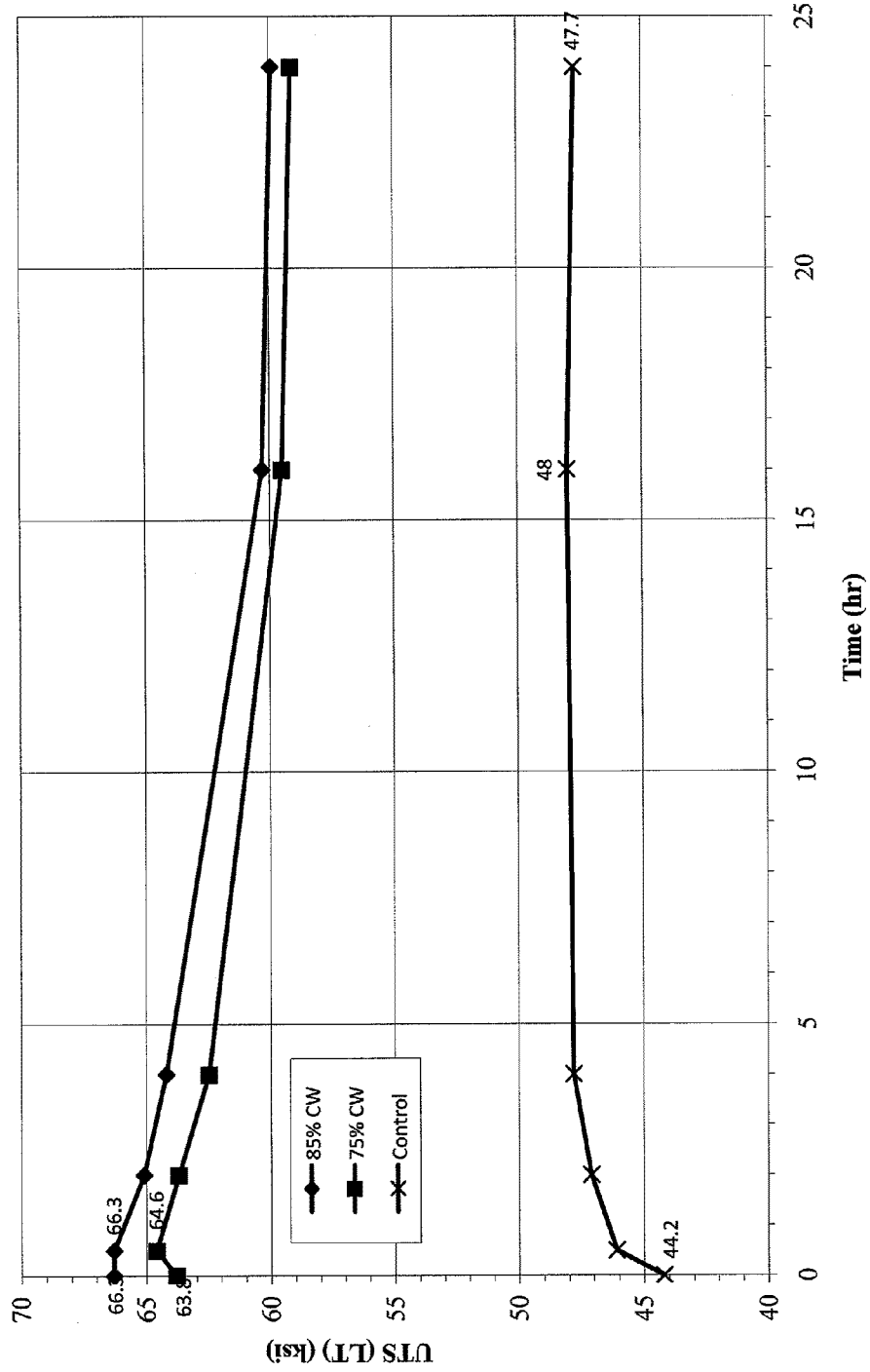
FIG. 43 - UTS of 6xxx-High-Mg alloy treated at 350F (0.08 inch sheet)

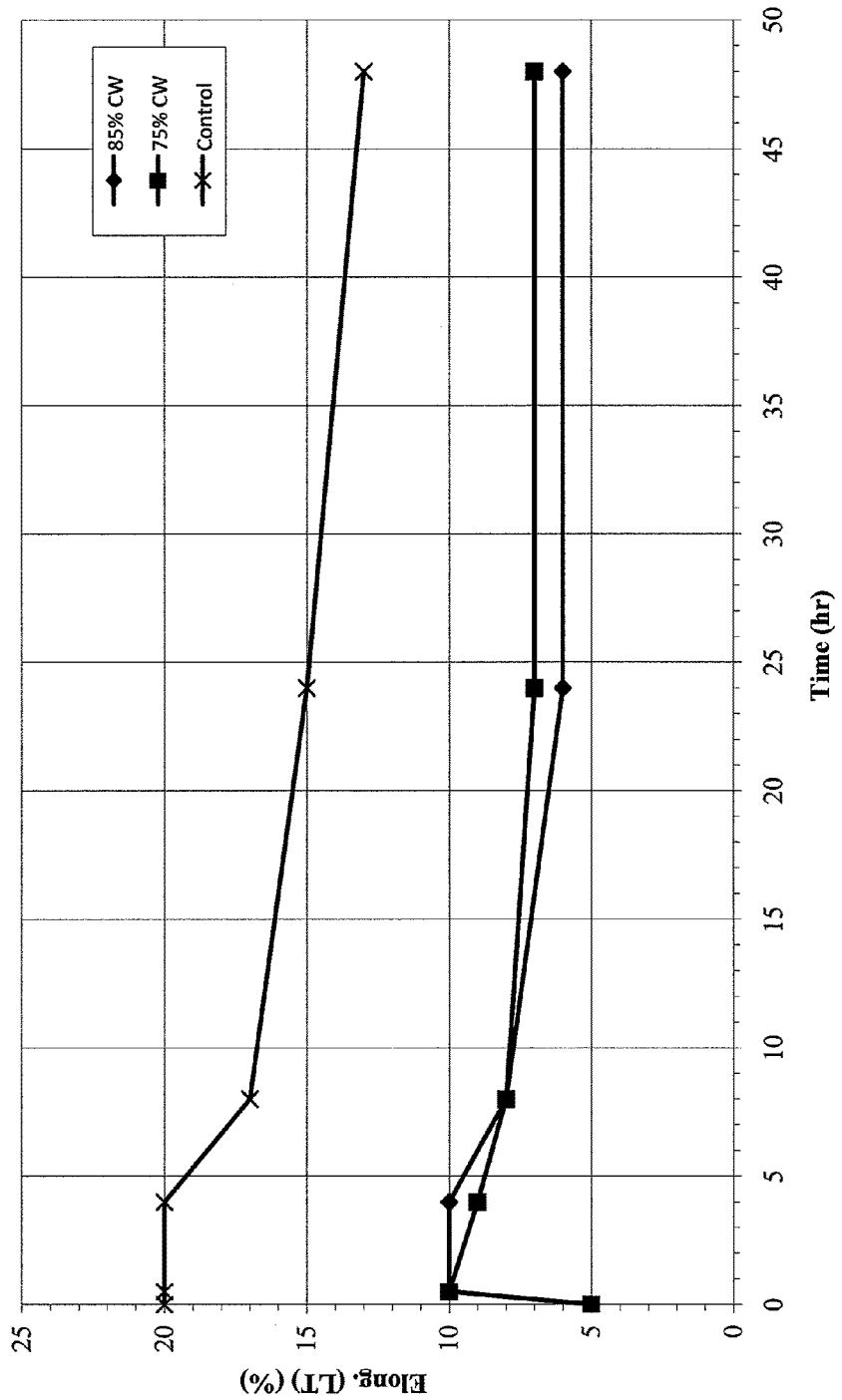
FIG. 44 - Elong. of 6xxx-High-Mg alloy treated at 325F (0.08 inch sheet)

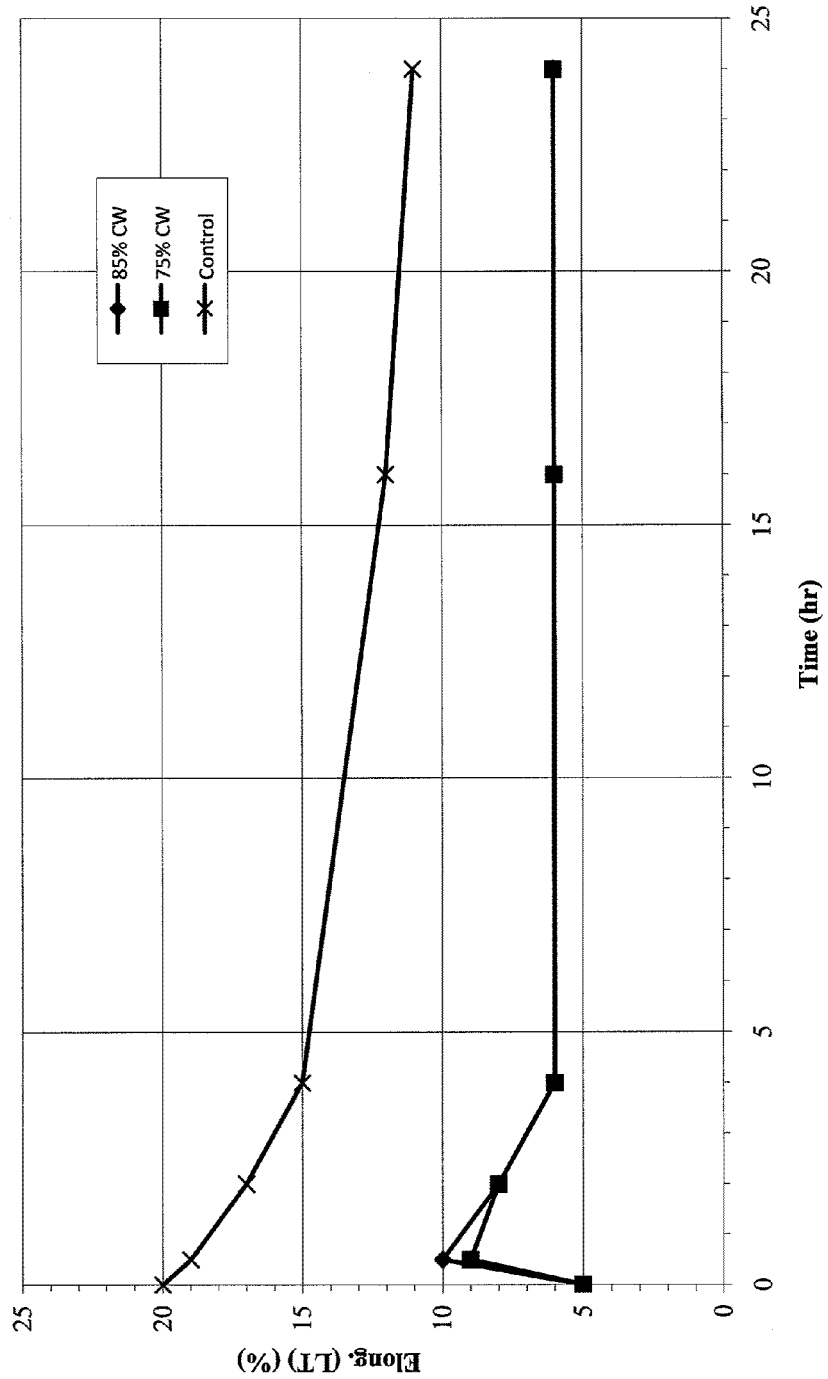
FIG. 45 - Elong. of 6xxx-High-Mg alloy treated at 350F (0.08 inch sheet)

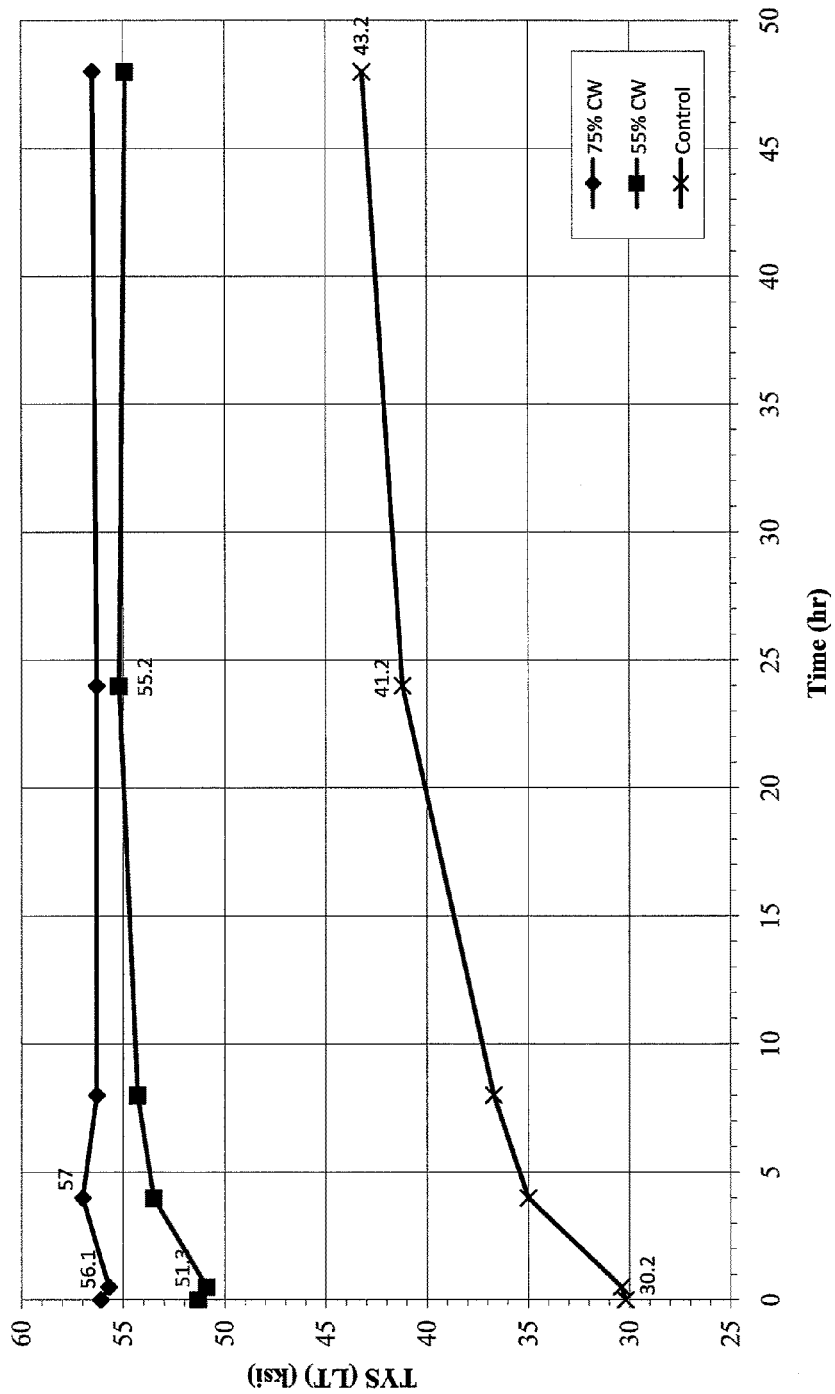

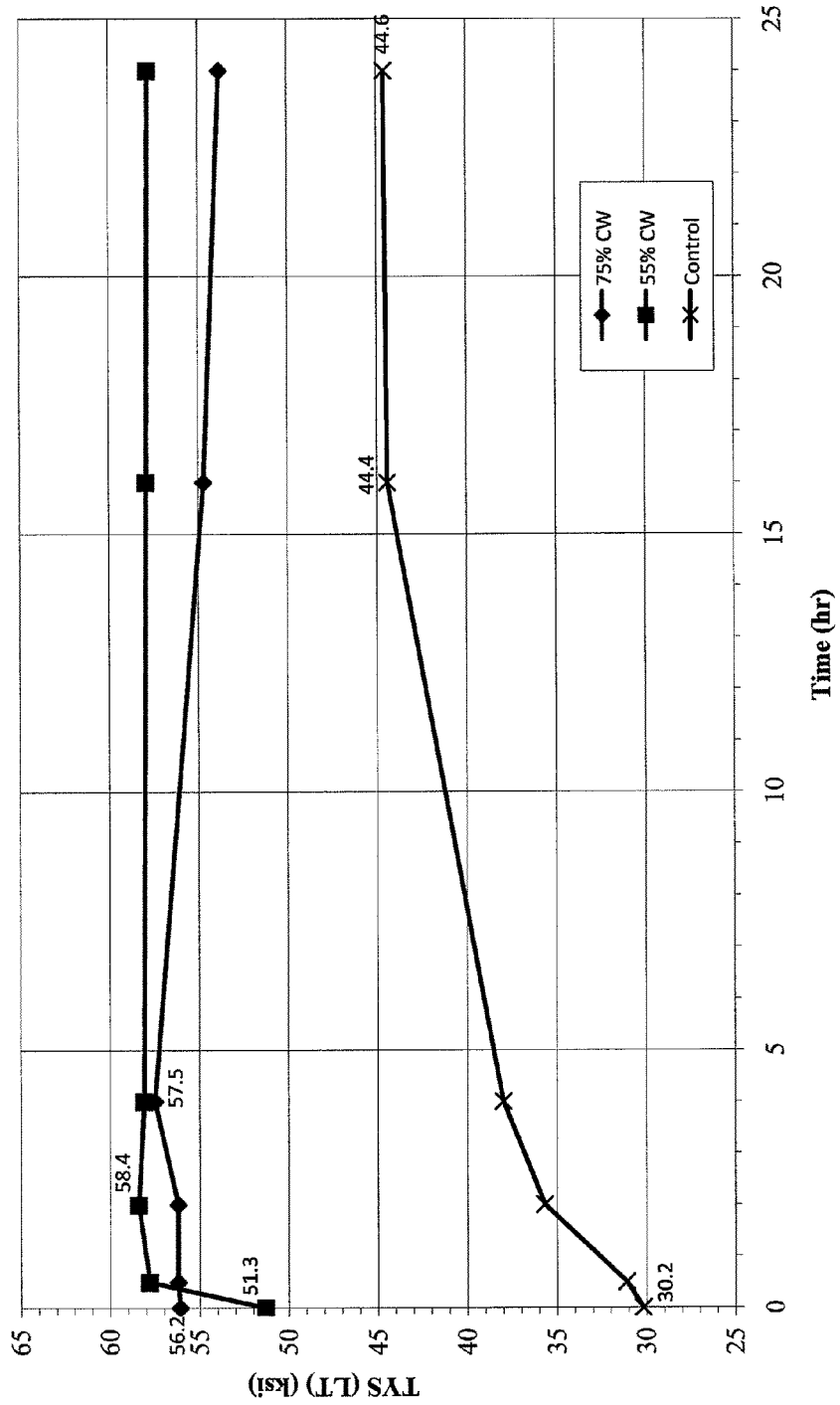
FIG. 47 - TYS of 6xxx-High-Mg alloy treated at 350F (0.375 inch plate)

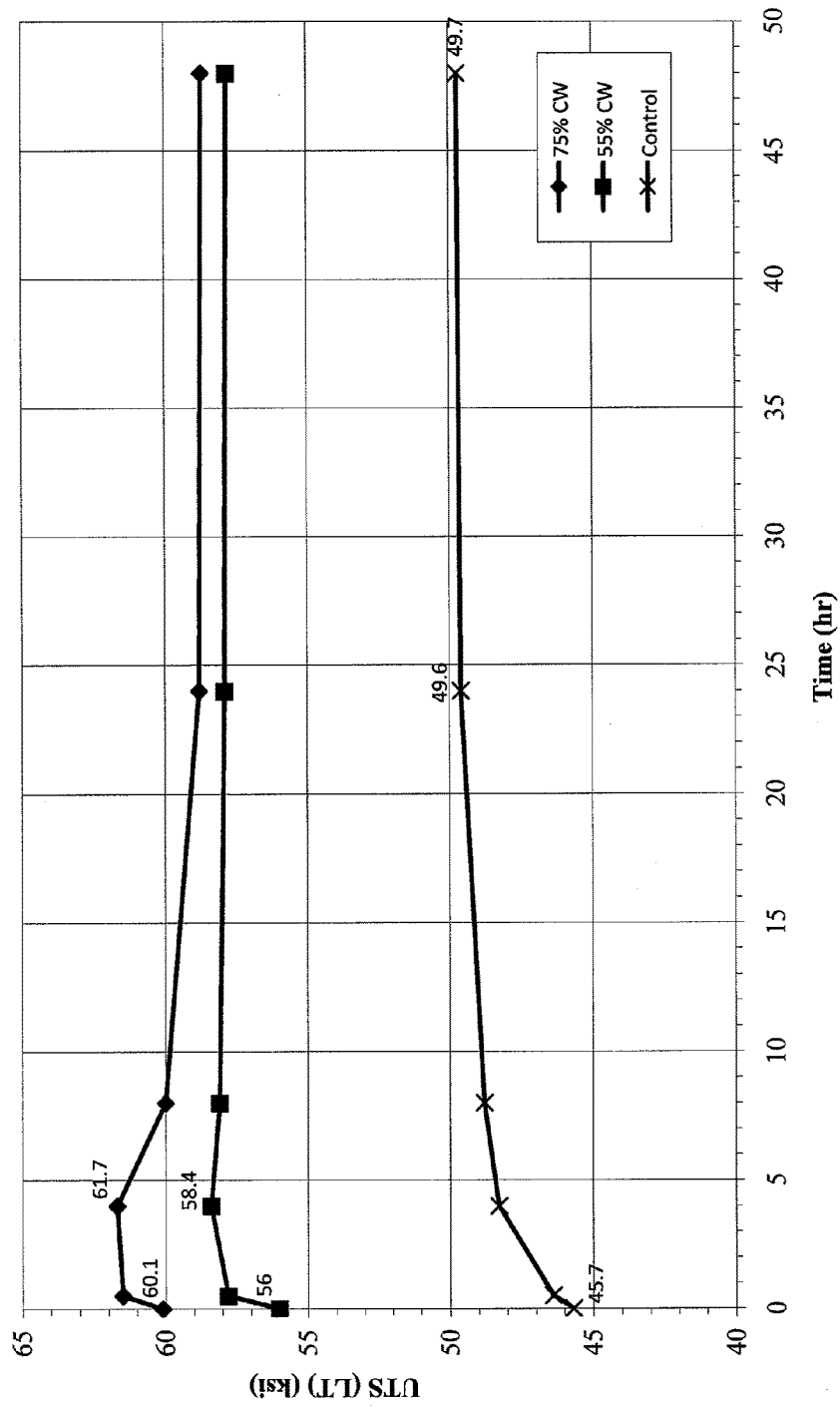
FIG. 48 - UTS of 6xxx-High-Mg alloy treated at 325F (0.375 inch plate)

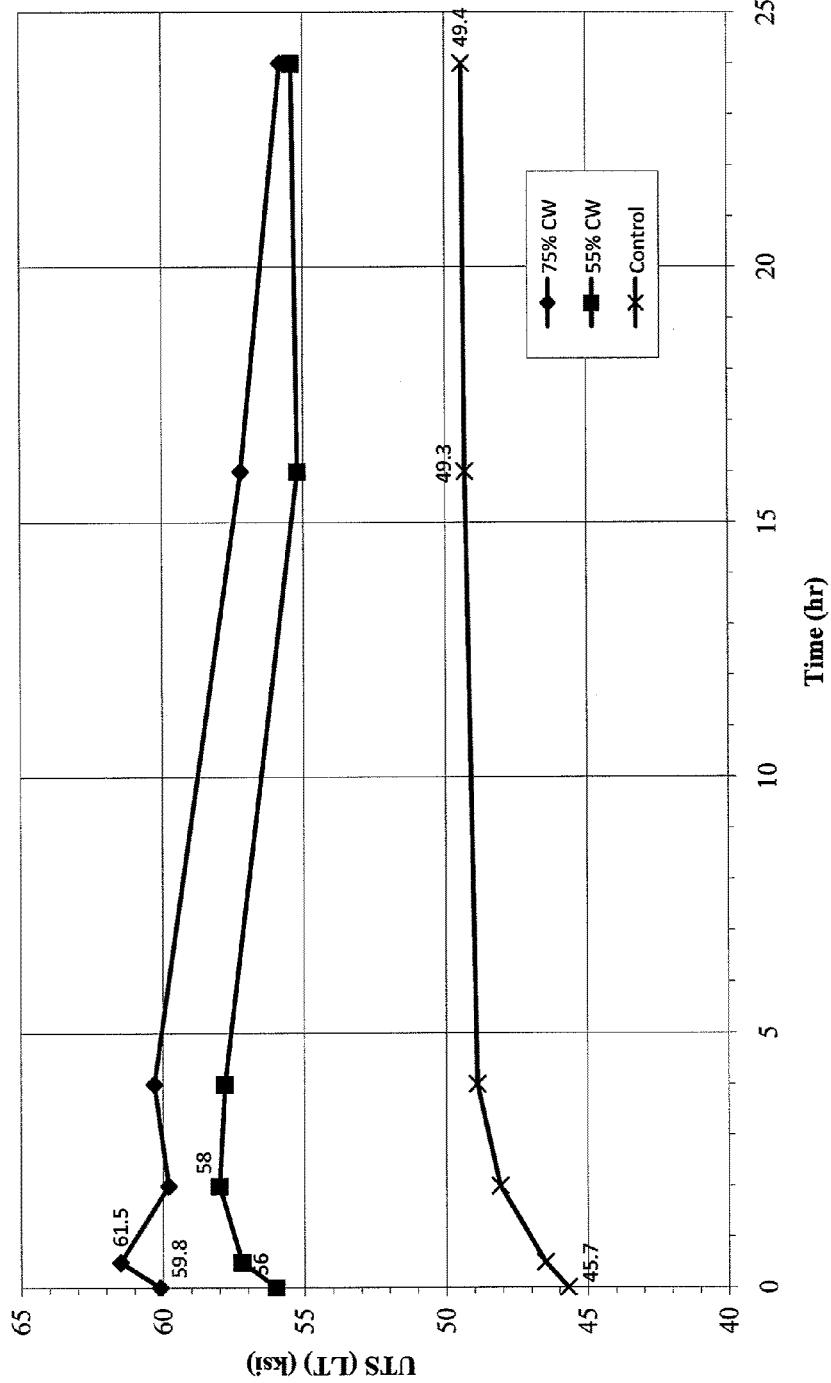
FIG. 49 - UTS of 6xxx-High-Mg alloy treated at 350F (0.375 inch plate)

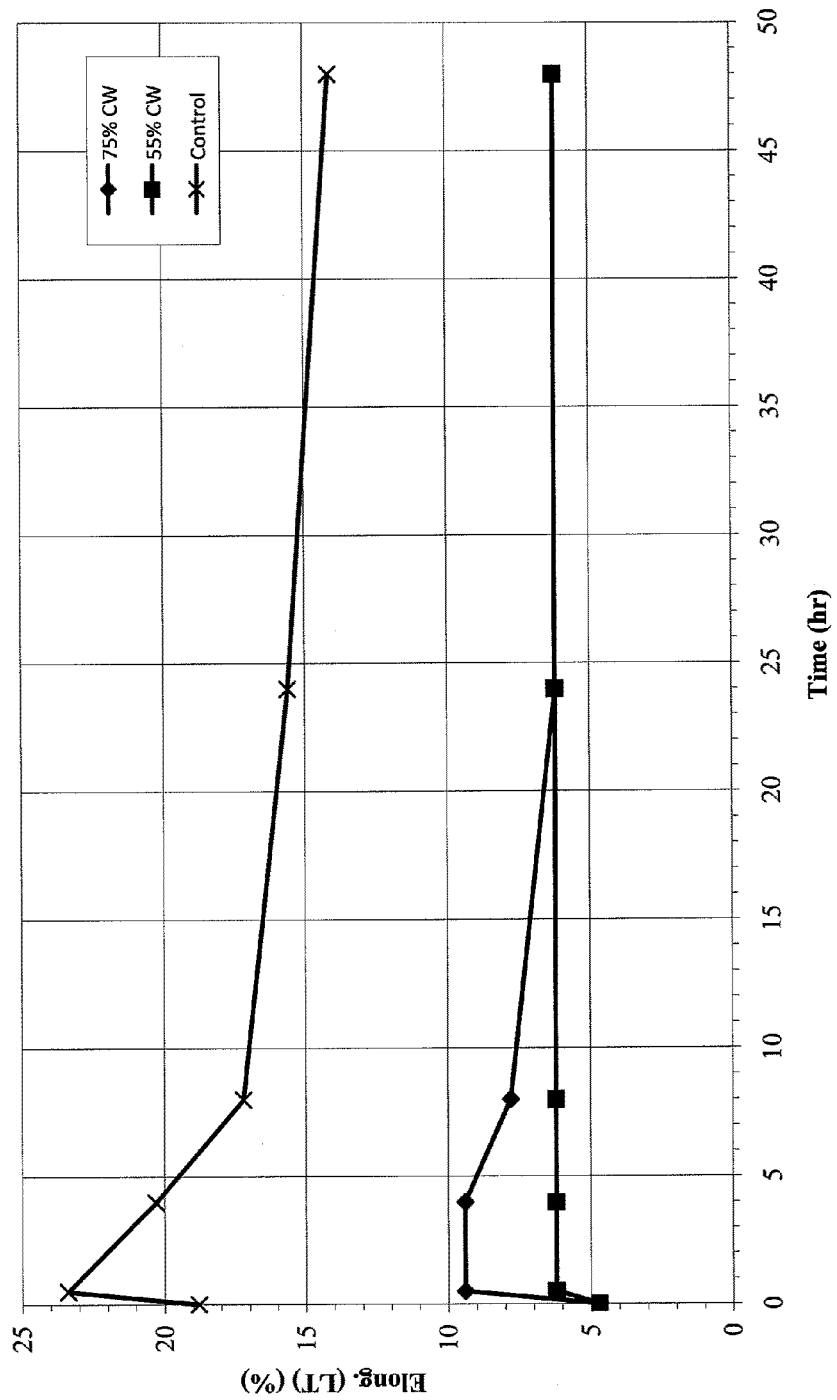
FIG. 50 - Elong. of 6xxx-High-Mg alloy treated at 325F (0.375 inch plate)

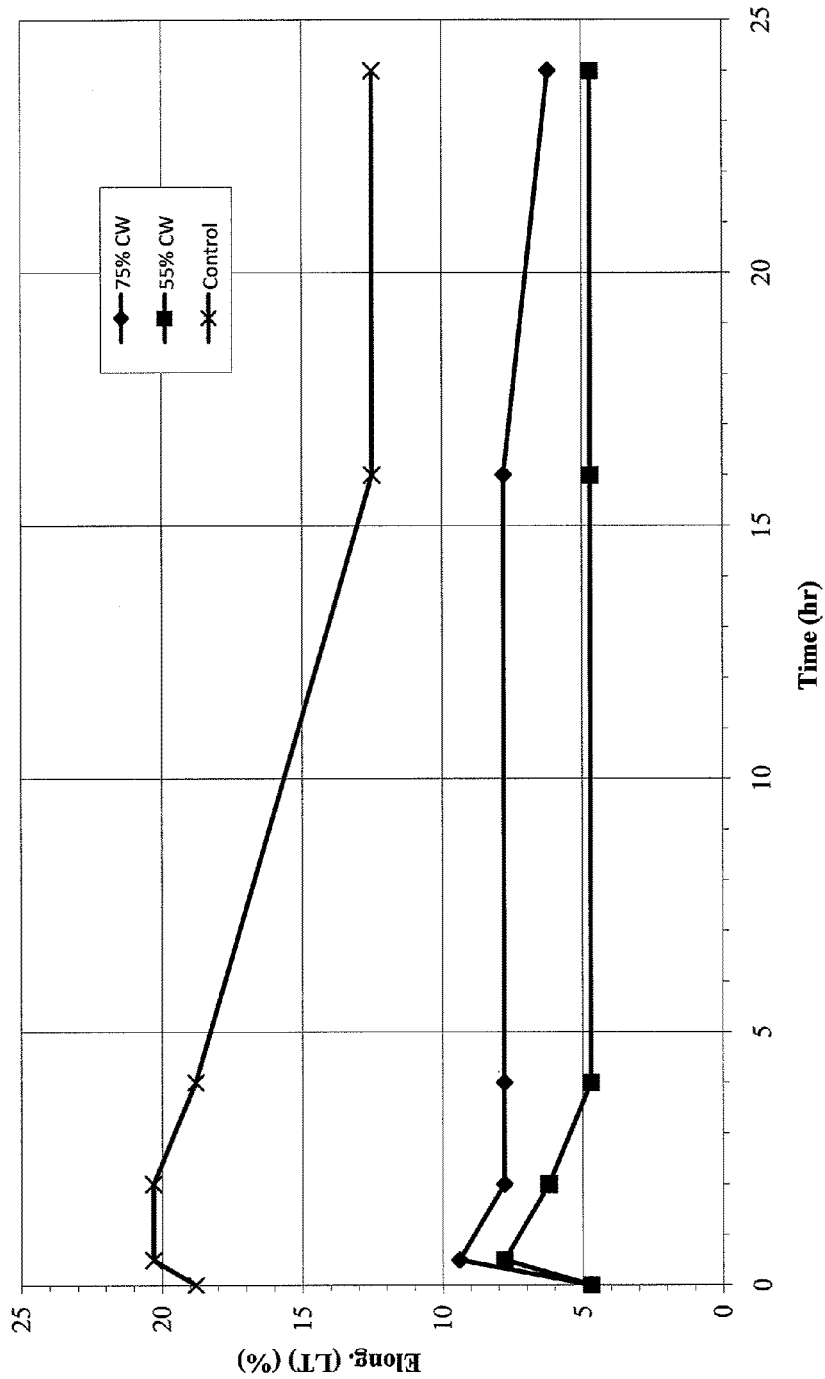
FIG. 51 - Elong. of 6xxx-High-Mg alloy treated at 350F (0.375 inch plate)

6XXX ALUMINUM ALLOYS, AND METHODS FOR PRODUCING THE SAME

CROSS-REFERENCE TO RELATED APPLICATIONS

This patent application is a continuation of U.S. patent application Ser. No. 13/228,420, filed Sep. 8, 2012, which claims priority to each of U.S. Provisional Patent Application No. 61/381,040, filed Sep. 8, 2010, and U.S. Provisional Patent Application No. 61/391,461, filed Oct. 8, 2010, and U.S. Provisional Patent Application No. 61/425,024, filed Dec. 20, 2010, and U.S. Provisional Patent Application No. 61/437,515, filed Jan. 28, 2011. Each of the above-identified patent applications is incorporated herein by reference in its entirety.

This patent application is also related to PCT Patent Application No. PCT/US2011/050876, entitled IMPROVED 2XXX ALUMINUM ALLOYS, AND METHODS FOR PRODUCING THE SAME, filed Sep. 8, 2011, and PCT Patent Application No. PCT/US2011/050868, entitled IMPROVED 7XXX ALUMINUM ALLOYS, AND METHODS FOR PRODUCING THE SAME, filed Sep. 8, 2011, and PCT Patent Application No. PCT/US2011/050884, entitled IMPROVED ALUMINUM LITHIUM ALLOYS, AND METHODS FOR PRODUCING THE SAME, filed Sep. 8, 2011.

BACKGROUND

Aluminum alloys are useful in a variety of applications. However, improving one property of an aluminum alloy without degrading another property is elusive. For example, it is difficult to increase the strength of an alloy without decreasing the toughness of an alloy. Other properties of interest for aluminum alloys include corrosion resistance and fatigue crack growth rate resistance, to name two.

SUMMARY OF THE DISCLOSURE

Broadly, the present patent application relates to improved wrought, heat treatable aluminum alloys, and methods for producing the same. Specifically, the present patent application relates to improved wrought, 6xxx aluminum alloy products, and methods for producing the same. Generally, the 6xxx aluminum alloy products achieve an improved combination of properties due to, for example, the post-solutionizing cold work and post-cold-working thermal treatments, as described in further detail below.

6xxx aluminum alloys are aluminum alloys containing silicon and magnesium, where at least one of the silicon and the magnesium is the predominate alloying element of the aluminum alloy body other than aluminum. For purposes of the present application, 6xxx aluminum alloys are aluminum alloys having 0.1-2.0 wt. % silicon and 0.1-3.0 wt. % magnesium, where at least one of the silicon and the magnesium is the predominate alloying element of the aluminum alloy body other than aluminum.

One conventional process for producing 6xxx aluminum alloy products in rolled form is illustrated in FIG. 1. In the conventional process, a 6xxx aluminum alloy body is cast (10), after which it is homogenized (11) and then hot rolled to an intermediate gauge (12). Next, the 6xxx aluminum alloy body is cold rolled (13) to final gauge, after which it is solution heat treated and quenched (14). "Solution heat treating and quenching" and the like, generally referred to herein as "solutionizing", means heating an aluminum alloy body to a suitable temperature, generally above the solvus temperature, holding at that temperature long enough to allow soluble elements to enter into solid solution, and cooling rapidly enough to hold the elements in solid solution. The solid solution formed at high temperature may be retained in a supersaturated state by cooling with sufficient rapidity to restrict the precipitation of the solute atoms as coarse, incoherent particles. After solutionizing (14), the 6xxx aluminum alloy body may be optionally stretched a small amount (e.g., 1-5%) for flatness (15), thermally treated (16) and optionally subjected to final treatment practices (17). FIG. 1 is consistent with a process path for producing aluminum alloys in a T6 temper (the T6 temper is defined later in this patent application).

One embodiment of a new process for producing new 6xxx aluminum alloy products is illustrated in FIG. 2. In this new process, a 6xxx aluminum alloy body is prepared for post-solutionizing cold work (100), after which it is cold worked (200), and then thermally treated (300). The new process may also include optional final treatment(s) (400), as described in further detail below. "Post-solutionizing cold work" and the like means cold working of an aluminum alloy body after solutionizing. The amount of post-solutionizing cold work applied to the 6xxx aluminum alloy body is generally at least 25%, such as more than 50% cold work. By first solutionizing, and then cold working by at least 25%, and then appropriately thermally treating the 6xxx aluminum alloy body, the 6xxx aluminum alloy body may realize improved properties, as described in further detail below. For example, strength increases of 5-25%, or more, may be realized relative to conventional aluminum alloy products in the T6 temper, and in a fraction of the time required to process those conventional aluminum alloy products to the T6 temper (e.g., 10%-90% faster than T6 temper processed alloys). The new 6xxx aluminum alloy body may also realize good ductility, generally realizing an elongation of more than 4%, such as elongations of 6-15%, or higher. Other properties may also be maintained and/or improved (e.g., fracture toughness, corrosion resistance, fatigue crack growth resistance, appearance).

A. Preparing for Post-Solutionizing Cold Work

As illustrated in FIG. 2, the new process includes preparing an aluminum alloy body for post-solutionizing cold work (100). The aluminum alloy body may be prepared for post-solutionizing cold work (100) in a variety of manners, including the use of conventional semi-continuous casting methods (e.g., direct chill casting of ingot) and continuous casting methods (e.g., twin-roll casting). As illustrated in FIG. 3, the preparing step (100) generally comprises placing the aluminum alloy body in a form suitable for the cold working (120) and solutionizing the aluminum alloy body (140). The placing step (120) and solutionizing step (140) may occur sequentially or concomitant to one another. Some non-limiting examples of various preparing steps (100) are illustrated in FIGS. 4-8, which are described in further detail below. Other methods of preparing an aluminum alloy body for post-solutionizing cold work (100) are known to those skilled in the art, and these other methods are also within the scope of the preparing step (100) present invention, even though not explicitly described herein.

In one approach, the preparing step (100) comprises a semi-continuous casting method. In one embodiment, and with reference now to FIG. 4, the placing step (120) includes casting the aluminum alloy body (122) (e.g., in the form of an ingot or billet), homogenizing the aluminum alloy body (124), hot working the aluminum alloy body (126), and optionally cold working the aluminum alloy body (128). After the placing step (120), the solutionizing step (140) is completed. Similar steps may be completed using continuous casting operations, although the aluminum alloy body would not be in the form of an ingot/billet after casting (120).

In another embodiment, and with reference now to FIG. 5, a preparing step (100) includes casting the aluminum alloy body (122), homogenizing the aluminum alloy body (124) and hot working the aluminum alloy body (126). In this embodiment, the hot working step (126) may be completed to place soluble elements in solid solution, after which the aluminum alloy body is quenched (not illustrated), thereby resulting in the solutionizing step (140). This is one example of the placing step (120) and solutionizing step (140) being completed concomitant to one another. This embodiment may be applicable to press-quenched products (e.g., extrusions) and hot rolled products that are quenched after hot rolling, among others.

In another approach, the preparing step (100) comprises a continuous casting method, such as belt casting, rod casting, twin roll casting, twin belt casting (e.g., Hazelett casting), drag casting, and block casting, among others. One embodiment of a preparing step (100) employing a continuous casting methodology is illustrated in FIG. 6. In this embodiment, the aluminum alloy body is cast and solutionized at about the same time (142), i.e., concomitant to one another. The casting places the aluminum alloy body in a form sufficient to cold work. When the solidification rate during casting is sufficiently rapid, the aluminum alloy body is also solutionized. In this embodiment, the casting/solutionizing step (142) may include quenching of the aluminum alloy body after casting (not illustrated). This embodiment may be applicable to twin-roll casting processes, among other casting processes. Some twin-roll casting processes capable of completing the process of FIG. 6 are described in U.S. Pat. No. 7,182,825 and U.S. Pat. No. 6,672,368.

In another embodiment, and with reference now to FIG. 7, a preparing step (100) includes casting the aluminum alloy body (122) and, after the casting step (122), then solutionizing the aluminum alloy body (140). In this embodiment, the placing step (120) comprises the casting (122). This embodiment is applicable to twin-roll casting processes, among other casting processes.

In another embodiment, and with reference now to FIG. 8, a preparing step (100) includes casting the aluminum alloy body (122), hot working the aluminum alloy body (126), and optionally cold working the aluminum alloy body (128). In this embodiment, the placing step (120) includes the casting (122), the hot working (126), and optional cold working (128) steps. After the placing step (120), the solutionizing step (140) is completed. This embodiment may be applicable to continuous casting processes.

Many of the steps illustrated in FIGS. 2-8 can be completed in batch or continuous modes. In one example, the cold working (200) and thermal treatment step (300) are completed continuously. In this example, a solutionized aluminum alloy body may enter the cold working operation at ambient conditions. Given the relatively short thermal treatment times achievable with the new processes described herein, the cold worked aluminum alloy body could be immediately thermally treated (300) after cold working (e.g., in-line). Conceivably, such thermal treatments could occur proximal the outlet of the cold working apparatus, or in a separate heating apparatus connected to the cold working apparatus. This could increase productivity.

As described above, the preparing step (100) generally comprises solutionizing of the aluminum alloy body. As noted above, "solutionizing" includes quenching (not illustrated) of the aluminum alloy body, which quenching may be accomplished via a liquid (e.g., via an aqueous or organic solution), a gas (e.g., air cooling), or even a solid (e.g., cooled solids on one or more sides of the aluminum alloy body). In one embodiment, the quenching step includes contacting the aluminum alloy body with a liquid or a gas. In some of these embodiments, the quenching occurs in the absence of hot working and/or cold working of the aluminum alloy body. For example, the quenching may occur by immersion, spraying and/or jet drying, among other techniques, and in the absence of deformation of the aluminum alloy body.

Those skilled in the art recognize that other preparing steps (100) can be used to prepare an aluminum alloy body for post-solutionizing cold work (e.g., powder metallurgy methods), and that such other preparing steps fall within the scope of the preparing step (100) so long as they place the aluminum alloy body in a form suitable for cold working (120) and solutionize the aluminum alloy body (140), and irrespective of whether these placing (120) and solutionizing (140) steps occur concomitantly (e.g., contemporaneously) or sequentially, and irrespective of whether the placing step (120) occurs before the solutionizing step (140), or vice-versa.

B. Cold Working

Referring back to FIG. 2, and as noted above, the new process includes cold working (200) the aluminum alloy body a high amount. "Cold working" and the like means deforming an aluminum alloy body in at least one direction and at temperatures below hot working temperatures (e.g., not greater than 400° F.). Cold working may be imparted by one or more of rolling, extruding, forging, drawing, ironing, spinning, flow-forming, and combinations thereof, among other types of cold working methods. These cold working methods may at least partially assist in producing various 6xxx aluminum alloy products (see, Product Applications, below).

i. Cold Rolling

In one embodiment, and with reference now to FIG. 9, the cold working step (200) comprises cold rolling (220) (and in some instances consists of cold rolling (220), with optional stretching or straightening for flatness (240)). In this embodiment, and as described above, the cold rolling step (220) is completed after the solutionizing step (140). Cold rolling (220) is a fabrication technique where an aluminum alloy body is decreased in thickness, generally via pressure applied by rollers, and where the aluminum alloy body enters the rolling equipment at a temperature below that used for hot rolling (124) (e.g., not greater than 400° F.). In one embodiment, the aluminum alloy body enters the rolling equipment at ambient conditions, i.e., the cold rolling step (220) is initiated at ambient conditions in this embodiment.

The cold rolling step (220) reduces the thickness of a 6xxx aluminum alloy body by at least 25%. The cold rolling step (220) may be completed in one or more rolling passes. In one embodiment, the cold rolling step (220) rolls the aluminum alloy body from an intermediate gauge to a final gauge. The cold rolling step (220) may produce a sheet, plate, or foil product. A foil product is a rolled product having a thickness of less than 0.006 inch. A sheet product is a rolled product having a thickness of from 0.006 inch to 0.249 inch. A plate product is a rolled product having a thickness of 0.250 inch or greater.

"Cold rolled XX %" and the like means $XX_{CR}$ %, where $XX_{CR}$ % is the amount of thickness reduction achieved when the aluminum alloy body is reduced from a first thickness of $T_1$ to a second thickness of $T_2$ by cold rolling, where $T_1$ is the thickness prior to the cold rolling step (200) (e.g., after solutionizing) and $T_2$ is the thickness after the cold rolling step (200). In other words, $XX_{CR}$ % is equal to:

$$XX_{CR}\% = (1 - T_2/T_1) * 100\%$$

For example, when an aluminum alloy body is cold rolled from a first thickness ($T_1$) of 15.0 mm to a second thickness of 3.0 mm ($T_2$), $XX_{CR}$ % is 80%. Phrases such as "cold rolling 80%" and "cold rolled 80%" are equivalent to the expression $XX_{CR}\% = 80\%$.

In one embodiment, the aluminum alloy body is cold rolled (220) at least 30% ($XX_{CR}\% \geq 30\%$), i.e., is reduced in thickness by at least 30%. In other embodiments, the aluminum alloy body is cold rolled (220) at least 35% ($XX_{CR}\% \geq 35\%$), or at least 40% ($XX_{CR}\% \geq 40\%$), or at least 45% ($XX_{CR}\% \geq 45\%$), or at least 50% ($XX_{CR}\% \geq 50\%$), or at least 55% ($XX_{CR}\% \geq 55\%$), or at least 60% ($XX_{CR}\% \geq 60\%$), or at least 65% ($XX_{CR}\% \geq 65\%$), or at least 70% ($XX_{CR}\% \geq 70\%$), or at least 75% ($XX_{CR}\% \geq 75\%$), or at least 80% ($XX_{CR}\% \geq 80\%$), or at least 85% ($XX_{CR}\% \geq 85\%$), or at least 90% ($XX_{CR}\% \geq 90\%$), or more.

In some embodiments, it may be impractical or non-ideal to cold roll (220) by more than 90% ($XX_{CR}\% \leq 90\%$). In these embodiments, the aluminum alloy body may be cold rolled (220) by not greater than 87% ($XX_{CR}\% \leq 87\%$), such as cold rolled (220) not more than 85% ($XX_{CR}\% \leq 85\%$), or not greater than 83% ($XX_{CR}\% \leq 83\%$), or not greater than 80% ($XX_{CR}\% \leq 80\%$).

In one embodiment, the aluminum alloy body is cold rolled in the range of from more than 50% to not greater than 85% ($50\% < XX_{CR}\% \leq 85\%$). This amount of cold rolling may produce an aluminum alloy body having preferred properties. In a related embodiment, the aluminum alloy body may be cold rolled in the range of from 55% to 85% ($55\% \leq XX_{CR}\% \leq 85\%$). In yet another embodiment, the aluminum alloy body may be cold rolled in the range of from 60% to 85% ($60\% \leq XX_{CR}\% \leq 85\%$). In yet another embodiment, the aluminum alloy body may be cold rolled in the range of from 65% to 85% ($65\% \leq XX_{CR}\% \leq 85\%$). In yet another embodiment, the aluminum alloy body may be cold rolled in the range of from 70% to 80% ($70\% \leq XX_{CR}\% \leq 80\%$).

Still referring to FIG. 9, in this embodiment of the process, optional pre-cold rolling (128) may be completed. This pre-cold rolling step (128) may further reduce the intermediate gauge of the aluminum alloy body (due to the hot rolling 126) to a secondary intermediate gauge before solutionizing (140). As an example, the optional cold rolling step (128) may be used to produce a secondary intermediate gauge that facilitates production of a final cold rolled gauge during the cold rolling step (220).

ii. Other Cold Working Techniques

Aside from cold rolling, and referring back to FIG. 2, cold working may be imparted by one or more of extruding, forging, drawing, ironing, spinning, flow-forming, and combinations thereof, among other types of cold working methods, alone or in combination with cold rolling. As noted above, the aluminum alloy body is generally cold worked by at least 25% after solutionizing. In one embodiment, the cold working works the aluminum alloy body to its substantially final form (i.e., no additional hot working and/or cold working steps are required to achieve the final product form).

"Cold working by XX %" ("$XX_{CW}\%$") and the like means cold working the aluminum alloy body an amount sufficient to achieve an equivalent plastic strain (described below) that is at least as large as the amount of equivalent plastic strain that would have been achieved if the aluminum alloy body had been cold rolled XX % ($XX_{CR}$ %). For example, the phrase "cold working 68.2%" means cold working the aluminum alloy body an amount sufficient to achieve an equivalent plastic strain that is at least as large as the amount of equivalent plastic strain that would have been achieved if the aluminum alloy body had been cold rolled 68.2%. Since $XX_{CW}\%$ and $XX_{CR}\%$ both refer to the amount of equivalent plastic strain induced in an aluminum alloy body as if the aluminum alloy body was cold rolled XX % (or actually is cold rolled XX % in the case of actual cold rolling), those terms are used interchangeably herein to refer to this amount of equivalent plastic strain.

Equivalent plastic strain is related to true strain. For example, cold rolling XX %, i.e., $XX_{CR}$ %, may be represented by true strain values, where true strain ($\epsilon_{true}$) is given by the formula:

$$\epsilon_{true} = -\ln(1 - \%CR/100) \qquad (1)$$

Where % CR is $XX_{CR}$ %, true strain values may be converted to equivalent plastic strain values. In the case where biaxial strain is achieved during cold rolling, the estimated equivalent plastic strain will be 1.155 times greater than the true strain value (2 divided by the √3 equals 1.155). Biaxial strain is representative of the type of plastic strain imparted during cold rolling operations. A table correlating cold rolling XX % to true strain vales and equivalent plastic strain values is provided in Table 1, below.

TABLE 1

| Cold Rolling Thickness Reduction ($XX_{CR}$%) | Cold Rolling True Strain Value | Estimated Equivalent Plastic Strain |
| --- | --- | --- |
| 25% | 0.2877 | 0.3322 |
| 30% | 0.3567 | 0.4119 |
| 35% | 0.4308 | 0.4974 |
| 40% | 0.5108 | 0.5899 |
| 45% | 0.5978 | 0.6903 |
| 50% | 0.6931 | 0.8004 |
| 55% | 0.7985 | 0.9220 |
| 60% | 0.9163 | 1.0583 |
| 65% | 1.0498 | 1.2120 |
| 70% | 1.2040 | 1.3902 |
| 75% | 1.3863 | 1.6008 |
| 80% | 1.6094 | 1.8584 |
| 85% | 1.8971 | 2.1906 |
| 90% | 2.3026 | 2.6588 |

These equivalent plastic strain values assume:
A. no elastic strain;
B. the true plastic strains preserve volume constancy; and
C. the loading is proportional.

For proportional loading, the above and/or other principles may be used to determine an equivalent plastic strain for various cold working operations. For non-proportional loading, the equivalent plastic strain due to cold working may be determined using the formula:

$$d\varepsilon_p = \frac{\sqrt{2}}{3}\left[\sqrt{(d\varepsilon_1^p - d\varepsilon_2^p)^2 + (d\varepsilon_1^p - d\varepsilon_3^p)^2 + (d\varepsilon_3^p - d\varepsilon_2^p)^2}\right] \qquad (2)$$

where $d\varepsilon_p$ is the equivalent plastic strain increment and $d\varepsilon_i^p$ (i=1, 2, 3) represent the increment in the principal plastic strain components. See, Plasticity, A. Mendelson, Krieger Pub Co; 2nd edition (August 1983), ISBN-10: 0898745829.

Those skilled in the art appreciate that the cold working step (200) may include deforming the aluminum alloy body in a first manner (e.g., compressing) and then deforming the aluminum alloy body in a second manner (e.g., stretching), and that the equivalent plastic strain described herein refers to the accumulated strain due to all deformation operations completed as a part of the cold working step (200). Furthermore, those skilled in the art appreciate that the cold working step (200) will result in inducement of strain, but not necessarily a change in the final dimensions of the aluminum alloy body. For example, an aluminum alloy body may be cold deformed in a first manner (e.g., compressing) after which it is cold deformed in a second manner (e.g., stretching), the accumulated results of which provide an aluminum alloy body having about the same final dimensions as the aluminum alloy body before the cold working step (200), but with an increased strain due to the various cold deformation operations of the cold working step (200). Similarly, high accumulated strains can be achieved through sequential bending and reverse bending operations.

The accumulated equivalent plastic strain, and thus $XX_{CR}$%, may be determined for any given cold working operation, or series of cold working operations, by computing the equivalent plastic strain imparted by those cold working operations and then determining its corresponding $XX_{CR}$% value, via the methodologies shown above, and other methodologies known to those skilled in the art. For example, an aluminum alloy body may be cold drawn, and those skilled in the art may compute the amount of equivalent plastic strain imparted to the aluminum alloy body based on the operation parameters of the cold drawing. If the cold drawing induced, for example, an equivalent plastic strain of about 0.9552, then this cold drawing operation would be equivalent to an $XX_{CR}$% of about 56.3% (0.9552/1.155 equals a true strain value of 0.8270 ($\epsilon_{true}$); in turn, the corresponding $XX_{CR}$% is 56.3% using equation (1), above). Thus, in this example, $XX_{CR}$%=56.3, even though the cold working was cold drawing and not cold rolling. Furthermore, since "cold working by XX %" ("$XX_{CW}$%") is defined (above) as cold working the aluminum alloy body an amount sufficient to achieve an equivalent plastic strain that is at least as large as the amount of equivalent plastic strain that would be achieved if the aluminum alloy body had been reduced in thickness XX % solely by cold rolling ("$XX_{CR}$%"), then $XX_{CW}$ is also 56.3%. Similar calculations may be completed when a series of cold working operations are employed, and in those situations the accumulated equivalent plastic strain due to the series of cold working operations would be used to determine the $XX_{CR}$%.

As described earlier, the cold working (200) is accomplished such that the aluminum alloy body realizes an $XX_{CW}$% or $XX_{CR}$% ≥25%, i.e., ≥0.3322 equivalent plastic strain. "Cold working XX %" and the like means $XX_{CW}$%. Phrases such as "cold working 80%" and "cold worked 80%" are equivalent to the expression $XX_{CW}$%=80. For tailored non-uniform cold working operations, the amount of equivalent plastic strain, and thus the amount of $XX_{CW}$ or $XX_{CR}$, is determined on the portion(s) of the aluminum alloy body receiving the cold work (200).

In one embodiment, the aluminum alloy body is cold worked (200) sufficiently to achieve, and realizes, an equivalent plastic strain ("EPS") of at least 0.4119 (i.e., $XX_{CW}$%≥30%). In other embodiments, the aluminum alloy body is cold worked (200) sufficiently to achieve, and realizes, an EPS of at least 0.4974 ($XX_{CW}$%≥35%), or at least 0.5899 ($XX_{CW}$%≥40%), or at least 0.6903 ($XX_{CW}$%≥45%), or at least 0.8004, ($XX_{CW}$%≥50%), or at least 0.9220 ($XX_{CW}$%≥55%), or at least 1.0583 ($XX_{CW}$%≥60%), or at least 1.2120 ($XX_{CW}$%≥65%), or at least 1.3902 ($XX_{CW}$%≥70%), or at least 1.6008 ($XX_{CW}$%≥75%), or at least 1.8584 ($XX_{CW}$%≥80%), or at least 2.1906 ($XX_{CW}$%≥85%), or at least 2.6588 ($XX_{CW}$%≥90%), or more.

In some embodiments, it may be impractical or non-ideal to cold work (200) by more than 90% ($XX_{CW}$%≤90% and EPS≤2.6588). In these embodiments, the aluminum alloy body may be cold worked (200) not more than 87% ($XX_{CW}$%≤87% and EPS≤2.3564), such as cold worked (200) not more than 85% ($XX_{CW}$%≤85% and EPS≤2.1906), or not more than 83% ($XX_{CW}$%≤83% and EPS≤2.0466), or not more than 80% ($XX_{CW}$%≤80% and EPS≤1.8584).

In one embodiment, the aluminum alloy body is cold worked (200) in the range of from more than 50% to not greater than 85% (50%≤$XX_{CW}$%≤85%). This amount of cold working (200) may produce an aluminum alloy body having preferred properties. In a related embodiment, the aluminum alloy body is cold worked (200) in the range of from 55% to 85% (55%≤$XX_{CW}$%≤85%). In yet another embodiment, the aluminum alloy body is cold worked (200) in the range of from 60% to 85% (60%≤$XX_{CW}$%≤85%). In yet another embodiment, the aluminum alloy body is cold worked (200) in the range of from 65% to 85% (65%≤$XX_{CW}$%≤85%). In yet another embodiment, the aluminum alloy body is cold worked (200) in the range of from 70% to 80% (70%≤$XX_{CW}$%≤80%).

iii. Gradients

The cold working step (200) may be tailored to deform the aluminum alloy body in a generally uniform manner, such as via rolling, described above, or conventional extruding processes, among others. In other embodiments, the cold working step may be tailored to deform the aluminum alloy body in a generally non-uniform manner. Thus, in some embodiments, the process may produce an aluminum alloy body having tailored cold working gradients, i.e., a first portion of the aluminum alloy body receives a first tailored amount of cold work and a second portion of the aluminum alloy body receives a second tailored amount of cold work, where the first tailored amount is different than the second tailored amount. Examples of cold working operations (200) that may be completed, alone or in combination, to achieve tailored non-uniform cold work include forging, burnishing, shot peening, flow forming, and spin-forming, among others. Such cold working operations may also be utilized in combination with generally uniform cold working operations, such as cold rolling and/or extruding, among others. As mentioned above, for tailored non-uniform cold working operations, the amount of equivalent plastic strain is determined on the portion(s) of the aluminum alloy body receiving the cold work (200).

iv. Cold Working Temperature

The cold working step (200) may be initiated at temperatures below hot working temperatures (e.g., not greater than 400° F.). In one approach, the cold working step (200) is initiated when the aluminum alloy body reaches a sufficiently low temperature after solutionizing (140). In one embodiment, the cold working step (200) may be initiated when the temperature of the aluminum alloy body is not greater than 250° F. In other embodiments, the cold working step (200) may be initiated when the temperature of the aluminum alloy body is not greater than 200° F., or not greater than 175° F., or not greater than 150° F., or not greater than 125° F., or less. In one embodiment, a cold working step (200) may be initiated when the temperature of the aluminum alloy body is around ambient. In other embodiments, a cold working step (200) may be initiated at higher temperatures, such as when the temperature of the aluminum alloy body is in the range of from 250° F. to less than hot working temperatures (e.g., less than 400° F.).

In one embodiment, the cold working step (200) is initiated and/or completed in the absence of any purposeful/meaningful heating (e.g., purposeful heating that produces a material change in the microstructure and/or properties of the aluminum alloy body). Those skilled in the art appreciate that an aluminum alloy body may realize an increase in temperature due to the cold working step (200), but that such cold working steps (200) are still considered cold working (200) because the working operation began at temperatures below those considered to be hot working temperatures. When a plurality of cold working operations are used to complete the cold working step (200), each one of these operations may employ any of the above-described temperature(s), which may be the same as or different from the temperatures employed by a prior or later cold working operation.

As noted above, the cold working (200) is generally initiated when the aluminum alloy body reaches a sufficiently low temperature after solutionizing (140). Generally, no purposeful/meaningful thermal treatments are applied to the aluminum alloy body between the end of the solutionizing step (140) and the beginning of the cold working step (200), i.e., the process may be absent of thermal treatments between the completion of the solutionizing step (140) and the initiation of the cold working step (200). In some instances, the cold working step (200) is initiated soon after the end of the solutionizing step (140) (e.g., to facilitate cold working). In one embodiment, the cold working step (200) is initiated not more than 72 hours after the completion of the solutionizing step (140). In other embodiments, the cold working step (200) is initiated in not greater than 60 hours, or not greater than 48 hours, or not greater than 36 hours, or not greater than 24 hours, or not greater than 20 hours, or not greater than 16 hours, or not greater than 12 hours, or less, after the completion of the solutionizing step (140). In one embodiment, the cold working step (200) is initiated within a few minutes, or less, of completion of the solutionizing step (140) (e.g., for continuous casting processes). In another embodiment, the cold working step (200) is initiated concomitant to completion of the solutionizing step (140) (e.g., for continuous casting processes).

In other instances, it may be sufficient to begin the cold working (200) after a longer elapse of time relative to the completion of the solutionizing step (140). In these instances, the cold working step (200) may be completed one or more weeks or months after the completion of the solutionizing step (140).

C. Thermally Treating

Referring still to FIG. 2, a thermally treating step (300) is completed after the cold working step (200). "Thermally treating" and the like means purposeful heating of an aluminum alloy body such that the aluminum alloy body reaches an elevated temperature. The thermal treatment step (300) may include heating the aluminum alloy body for a time and at a temperature sufficient to achieve a condition or property (e.g., a selected strength, a selected ductility, among others).

After solutionizing, most heat treatable alloys, such as 6xxx aluminum alloys, exhibit property changes at room temperature. This is called "natural aging" and may start immediately after solutionizing, or after an incubation period. The rate of property changes during natural aging varies from one alloy to another over a wide range, so that the approach to a stable condition may require only a few days or several years. Since natural aging occurs in the absence of purposeful heating, natural aging is not a thermal treatment step (300). However, natural aging may occur before and/or after the thermal treatment step (300). Natural aging may occur for a predetermined period of time prior to the thermal treatment step (300) (e.g., from a few minutes or hours to a few weeks, or more). Natural aging may occur between or after any of the solutionizing (140), the cold working (200) and the thermal treatment steps (300).

The thermally treating step (300) heats the aluminum alloy body to a temperature within a selected temperature range. For the purposes of the thermally treating step (300), this temperature refers to the average temperature of the aluminum alloy body during the thermally treating step (300). The thermally treating step (300) may include a plurality of treatment steps, such as treating at a first temperature for a first period of time, and treating at a second temperature for a second period of time. The first temperature may be higher or lower than the second temperature, and the first period of time may be shorter or longer than the second period of time.

The thermally treating step (300) is generally completed such that the aluminum alloy body achieves/maintains a predominately unrecrystallized microstructure, as defined below. As described in further detail below, a predominately unrecrystallized microstructure may achieve improved properties. In this regard, the thermally treating step (300) generally comprises heating the aluminum alloy body to an elevated temperature, but below the recrystallization temperature of the aluminum alloy body, i.e., the temperature at which the aluminum alloy body would not achieve a predominately unrecrystallized microstructure. For example, the thermally treating step (300) may comprise heating the 6xxx aluminum alloy body to a temperature in the range of from 150° F. to 425° F. (or higher), but below the recrystallization temperature of the aluminum alloy body.

The thermally treating step (300) may be completed in any suitable manner that maintains the aluminum alloy body at one or more selected temperature(s) for one or more selected period(s) of time (e.g., in order to achieve a desired/selected property or combination of properties). In one embodiment, the thermally treating step (300) is completed in an aging furnace, or the like. In another embodiment, the thermally treating step (300) is completed during a paint-bake cycle. Paint-bake cycles are used in the automotive and other industries to cure an applied paint by baking it for a short period of time (e.g., 5-30 minutes). Given the ability for the presently described processes to produce aluminum alloy bodies having high strength within a short period of time, as described below, paint-bake cycles, and the like, may be used to complete the thermally treating step (300), thereby obviating the need for separate thermal treatment and paint-bake steps. Similarly, in another embodiment, the thermally treating step (300) may be completed during a coating cure step, or the like.

D. Cold Working and Thermally-Treating Combination

The combination of the cold working step (200) and the thermally treating step (300) are capable of producing aluminum alloy bodies having improved properties. It is believed that the combination of the high deformation of the cold working step (200) in combination with the appropriate thermally treatment conditions (300) produce a unique microstructure (see, Microstructure, below) capable of achieving combinations of strength and ductility that have been heretofore unrealized. The cold working step (200) facilitates production of a severely deformed microstructure while the thermally treating step (300) facilitates precipitation hardening. When the cold working (200) is at least 25%, and preferably more than 50%, and when an appropriate thermal treatment step (300) is applied, improved properties may be realized.

In one approach, the cold working (200) and thermally treating (300) steps are accomplished such that the aluminum alloy body achieves an increase in strength (e.g., tensile yield strength ($R_{0.2}$) or ultimate tensile strength ($R_m$)). The strength increase may be realized in one or more of the L, LT or ST directions.

In one embodiment, the cold working (200) and thermally treating (300) steps are accomplished such that the aluminum alloy body achieves an increase in strength as compared to a reference-version of the aluminum alloy body in the "as-cold worked condition". In another embodiment, the cold working (200) and thermally treating (300) steps are accomplished such that the aluminum alloy body achieves an increase in strength as compared to a reference-version of the aluminum alloy body in the T6 temper. In another embodiment, the cold working (200) and thermally treating (300) steps are accomplished such that the aluminum alloy body achieves an increase a higher R-value as compared to a reference-version of the aluminum alloy body in the T4 temper. These and other properties are described in the Properties section, below.

The "as-cold worked condition" (ACWC) means: (i) the aluminum alloy body is prepared for post-solutionizing cold work, (ii) the aluminum alloy body is cold worked, (iii) not greater than 4 hours elapse between the completion of the solutionizing step (140) and the initiation of the cold working step (200), and (iv) the aluminum alloy body is not thermally treated. The mechanical properties of the aluminum alloy body in the as-cold worked condition should be measured within 4-14 days of completion of the cold working step (200). To produce a reference-version of the aluminum alloy body in the "as-cold worked condition", one would generally prepare an aluminum alloy body for post-solutionizing cold work (100), and then cold work the aluminum alloy body (200) according to the practices described herein, after which a portion of the aluminum alloy body is removed to determine its properties in the as-cold worked condition per the requirements described above. Another portion of the aluminum alloy body would be processed in accordance with the new processes described herein, after which its properties would be measured, thus facilitating a comparison between the properties of the reference-version of the aluminum alloy body in the as-cold worked condition and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body.

The "T6 temper" and the like means an aluminum alloy body that has been solutionized and then thermally treated to a maximum strength condition (within 1 ksi of peak strength); applies to bodies that are not cold worked after solutionizing, or in which the effect of cold work in flattening or straightening may not be recognized in mechanical property limits. As described in further detail below, aluminum alloy bodies produced in accordance with the new processes described herein may achieve superior as compared to the aluminum alloy body in a T6 temper. To produce a reference-version of the aluminum alloy body in a T6 temper, one would prepare an aluminum alloy body for post-solutionizing cold work (100), after which a portion of the aluminum alloy body would be processed to a T6 temper (i.e., a referenced aluminum alloy body in the T6 temper). Another portion of the aluminum alloy body would be processed in accordance with the new processes described herein, thus facilitating a comparison between the properties of the reference-version of the aluminum alloy body in the T6 temper and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body. The reference-version of the aluminum alloy body may require work (hot and/or cold) before the solutionizing step (140) to place the reference-version of the aluminum alloy body in a comparable product form to the new aluminum alloy body (e.g., to achieve the same final thickness for rolled products).

The "T4 temper" and the like means an aluminum alloy body that has been solutionized and then naturally aged to a substantially stable condition; applies to bodies that are not cold worked after solutionizing, or in which the effect of cold work in flattening or straightening may not be recognized in mechanical property limits. To produce a reference-version of the aluminum alloy body in a T4 temper, one would prepare an aluminum alloy body for post-solutionizing cold work (100), after which a portion of the aluminum alloy body would be allowed to naturally age to a T4 temper (i.e., a referenced aluminum alloy body in the T4 temper). Another portion of the aluminum alloy body would be processed in accordance with the new processes described herein, thus facilitating a comparison between the properties of the reference-version of the aluminum alloy body in the T4 temper and the properties of an aluminum alloy body processed in accordance with the new processes described herein (e.g., to compare strength, ductility, fracture toughness). Since the reference-version of the aluminum alloy body is produced from a portion of the aluminum alloy body, it would have the same composition as the aluminum alloy body. The reference-version of the aluminum alloy body may require work (hot and/or cold) before the solutionizing step (140) to place the reference-version of the aluminum alloy body in a comparable product form to the new aluminum alloy body (e.g., to achieve the same thickness for rolled products).

E. Microstructure i. Recrystallization

The cold working (200) and thermally treating (300) steps may be accomplished such that the aluminum alloy body achieves/maintains a predominately unrecrystallized microstructure. A predominately unrecrystallized microstructure means that the aluminum alloy body contains less than 50% of first type grains (by volume fraction), as defined below.

An aluminum alloy body has a crystalline microstructure. A "crystalline microstructure" is the structure of a polycrystalline material. A crystalline microstructure has crystals, referred to herein as grains. "Grains" are crystals of a polycrystalline material.

"First type grains" means those grains of a crystalline microstructure that meet the "first grain criteria", defined below, and as measured using the OIM (Orientation Imaging Microscopy) sampling procedure, described below. Due to the unique microstructure of the aluminum alloy body, the present application is not using the traditional terms "recrystallized grains" or "unrecrystallized grains", which can be ambiguous and the subject of debate, in certain circumstances. Instead, the terms "first type grains" and "second type grains" are being used where the amount of these types of grains is accurately and precisely determined by the use of computerized methods detailed in the OIM sampling procedure. Thus, the term "first type grains" includes any grains that meet the first grain criteria, and irrespective of whether those skilled in the art would consider such grains to be unrecrystallized or recrystallized.

The OIM analysis is to be completed from the T/4 (quarter-plane) location to surface of the L-ST plane. The size of the sample to be analyzed will generally vary by gauge. Prior to measurement, the OIM samples are prepared by standard metallographic sample preparation methods. For example, the OIM samples are generally polished with Buehler Si—C paper by hand for 3 minutes, followed by polishing by hand with a Buehler diamond liquid polish having an average particle size of about 3 microns. The samples are anodized in an aqueous fluoric-boric solution for 30-45 seconds. The samples are then stripped using an aqueous phosphoric acid solution containing chromium trioxide, and then rinsed and dried.

The "OIM sample procedure" is as follows:

The software used is TexSEM Lab OIM Data Collection Software version 5.31 (EDAX Inc., New Jersey, U.S.A.), which is connected via FIREWIRE (Apple, Inc., California, U.S.A.) to a DigiView 1612 CCD camera (TSL/EDAX, Utah, U.S.A.). The SEM is a JEOL JSM6510 (JEOL Ltd. Tokyo, Japan).

OIM run conditions are 70° tilt with a 18 mm working distance and an accelerating voltage of 20 kV with dynamic focusing and spot size of 1 times $10^{-7}$ amp. The mode of collection is a square grid. A selection is made such that orientations are collected in the analysis (i.e., Hough peaks information is not collected). The area size per scan (i.e., the frame) is 2.0 mm by 0.5 mm for 2 mm gauge samples and 2.0 mm by 1.2 mm for 5 mm gauge samples at 3 micron steps at 80×. Different frame sizes can be used depending upon gauge. The collected data is output in an *.osc file. This data may be used to calculate the volume fraction of first type grains, as described below.

Calculation of Volume Fraction of First Type Grains:

The volume fraction of first type grains is calculated using the data of the *.osc file and the TexSEM Lab OIM Analysis Software version 5.31. Prior to calculation, data cleanup may be performed with a 15° tolerance angle, a minimum grain size=3 data points, and a single iteration cleanup. Then, the amount of first type grains is calculated by the software using the first grain criteria (below).

First Grain Criteria: Calculated via grain orientation spread (GOS) with a grain tolerance angle of 5°, minimum grain size is three (3) data points, and confidence index is zero (0). All of "apply partition before calculation", "include edge grains", and "ignore twin boundary definitions" should be required, and the calculation should be completed using "grain average orientation". Any grain whose GOS is ≤3° is a first type grain. If multiple frames are used, the GOS data are averaged.

"First grain volume" (FGV) means the volume fraction of first type grains of the crystalline material.

"Percent Unrecrystallized" and the like is determined via the formula:

$$U_{RX}\% = (1-FGV)*100\%$$

As mentioned above, the aluminum alloy body generally comprises a predominately unrecrystallized microstructure, i.e., FGV<0.50 and $U_{RX}\% \geq 50\%$. In one embodiment, the aluminum alloy body contains (by volume fraction) not greater than 0.45 first type grains (i.e., the aluminum alloy body is at least 55% unrecrystallized ($U_{RX}\% \geq 55\%$), per the definitions provided above). In other embodiments, the aluminum alloy body may contain (by volume fraction) not greater than 0.40 first type grains ($U_{RX}\% \geq 60\%$), or not greater than 0.35 first type grains ($U_{RX}\% \geq 65\%$), or not greater than 0.30 first type grains ($U_{RX}\% \geq 70\%$), or not greater than 0.25 first type grains ($U_{RX}\% \geq 75\%$), or not greater than 0.20 first type grains ($U_{RX}\% \geq 80\%$), or not greater than 0.15 first type grains ($U_{RX}\% \geq 85\%$), or not greater than 0.10 first type grains ($U_{RX}\% \geq 90\%$), or less.

ii. Texture

The aluminum alloy body may achieve a unique microstructure. This unique microstructure may be illustrated by the R-values of the aluminum alloy body derived from crystallographic texture data. The microstructure of an aluminum alloy body relates to its properties (e.g., strength, ductility, toughness, corrosion resistance, among others).

For purposes of the present application, R-values are generated according to the R-value generation procedure, described below.

R-Value Generation Procedure:

Instrument:

An x-ray generator with a computer-controlled pole figure unit (e.g., Rigaku Ultima III diffractometer (Rigaku USA, The Woodlands, Tex.) and data collection software and ODF software for processing pole figure data (e.g., Rigaku software included with the Rigaku diffractometer) is used. The reflection pole figures are captured in accordance with "Elements of X-ray Diffraction" by B. D. Cullity, $2^{nd}$ edition 1978 (Addison-Wesley Series in Metallurgy and Materials) and the Rigaku User Manual for the Ultima III Diffractometer and Multipurpose Attachment (or other suitable manual of other comparable diffractometer equipment).

Sample Preparation:

The pole figures are to be measured from the T/4 location to surface. Thus, the sample used for R-value generation is (preferably) ⅞ inch (LT) by 1¼ inches (L). Sample size may vary based on measurement equipment. Prior to measurement of the R-value, the sample may be prepared by:

1. machine the rolling plane from one side to 0.01" thicker than the T/4 plane (if thickness justifies); and
2. chemically etching to the T/4 location.

X-Ray Measurement of Pole Figures:

Reflection of Pole Figure (Based on Schulz Reflection Method)

1. Mount a sample on the sample ring holder with an indication of the rolling direction of the sample
2. Insert the sample holder unit into the pole figure unit
3. Orient the direction of the sample to the same horizontal plane of the pole figure unit (β=0°)
4. Use a normal divergence slit (DS), standard pole figure receiving slit (RS) with Ni $K_\beta$ filter, and standard scatter slit (SS) (slit determination will depend on radiation used, the 2θ of the peaks, and the breadth of the peaks). The Rigaku Ultima III diffractometer uses ⅔ deg DS, 5 mm RS, and 6 mm SS.
5. Set the power to recommended operating voltage and current (default 40 KV 44 mA for Cu radiation with Ni filter on the Ultima III)
6. Measure the background intensity from α=15°, β=0° to α=90°, β=355° of the $Al_{(111)}$, $Al_{(200)}$, and $Al_{(220)}$ peaks at 5° steps and counting for 1 second at each step (three pole figures are usually sufficient for an accurate ODF)
7. Measure the peak intensity from α=15°, β=0° to α=90°, β=355° of $Al_{(111)}$, $Al_{(200)}$, $Al_{(220)}$, and $Al_{(311)}$ peaks at 5° steps and counting for 1 second at each step
8. During measurements, the sample should be oscillated 2 cm per second to achieve a larger sampling area for improved sampling statistics
9. Subtract the background intensity from the peak intensity (this is usually done by the user-specific software)
10. Correct for absorption (usually done by the user-specific software)

The output data are usually converted to a format for input into ODF software. The ODF software normalizes the data, calculates the ODF, and recalculates normalized pole figures. From this information, R-values are calculated using the Taylor-Bishop-Hill model (see, Kuroda, M. et al., *Texture optimization of rolled aluminum alloy sheets using a genetic algorithm*, Materials Science and Engineering A 385 (2004) 235-244 and Man, Chi-Sing, *On the r-value of textured sheet metals*, International Journal of Plasticity 18 (2002) 1683-1706).

Aluminum alloy bodies produced in accordance with the presently described methods may achieve high normalized R-values as compared to conventionally produced materials. "Normalized R-value" and the like means the R-value as normalized by the R-value of the RV-control sample at an angle of 0° relative to the rolling direction. For example, if the RV-control sample achieves an R-value of 0.300 at an angle of 0° relative to the rolling direction, this and all other R-values would be normalized by dividing by 0.300.

"RV-control sample" and the like means a control sample taken from a reference-version aluminum alloy body in a T4 temper (defined above).

"Rolling direction" and the like means the L-direction for rolled products (see, FIG. 13). For non-rolled products, and in the context of R-values "rolling direction" and the like means the principle direction of extension (e.g., the extrusion direction). For purposes of the present application, the various R-values of a material are calculated from an angle of 0° to an angle of 90° relative to the rolling direction, and in increments of 5°. For purposes of simplicity, "orientation angle" is sometimes used to refer to the phrase "angle relative to the rolling direction".

"Maximum normalized R-value" and the like means the maximum normalized R-value achieved at any angle relative to the rolling direction.

"Max RV angle" and the like means the angle at which the maximum normalized R-value is achieved.

As a non-limiting example, a chart containing R-values (both non-normalized and normalized) of an RV-control sample and an aluminum alloy body processed in accordance with the new processes described herein is provided in Table 2, below.

TABLE 2

| Rolling Angle | R-value (Control) | Normalized R-value (Control) | R-value (New Process) (85% CW) | Normalized R-value (New Process) (85% CW) |
|---|---|---|---|---|
| 0 | 0.5009 | 1.000 | 0.7780 | 1.553 |
| 5 | 0.5157 | 1.030 | 0.7449 | 1.487 |
| 10 | 0.5065 | 1.011 | 0.7241 | 1.446 |
| 15 | 0.4948 | 0.988 | 0.7802 | 1.558 |
| 20 | 0.4650 | 0.928 | 0.9111 | 1.819 |
| 25 | 0.4372 | 0.873 | 1.0866 | 2.169 |
| 30 | 0.4145 | 0.827 | 1.3999 | 2.795 |
| 35 | 0.3858 | 0.770 | 1.7234 | 3.441 |
| 40 | 0.3717 | 0.742 | 2.1556 | 4.304 |
| 45 | 0.3495 | 0.698 | 2.4868 | 4.965 |
| 50 | 0.3631 | 0.725 | 2.6023 | 5.196 |
| 55 | 0.3755 | 0.750 | 2.3778 | 4.747 |
| 60 | 0.3861 | 0.771 | 2.1577 | 4.308 |
| 65 | 0.4159 | 0.830 | 1.7318 | 3.458 |
| 70 | 0.4392 | 0.877 | 1.4117 | 2.818 |
| 75 | 0.4592 | 0.917 | 1.2048 | 2.406 |
| 80 | 0.4789 | 0.956 | 1.1133 | 2.223 |
| 85 | 0.4753 | 0.949 | 1.0214 | 2.039 |
| 90 | 0.4714 | 0.941 | 1.0508 | 2.098 |

The normalized R-values for the Control and the 85% Cold Work samples are plotted as function of orientation angle in FIG. 10. FIG. 10 also contains the normalized R-values for aluminum alloy bodies with 11%, 35% and 60% cold work.

As illustrated in FIG. 10, the high cold worked aluminum alloy bodies achieve higher R-values than the RV-control sample, especially between orientation angles of 20° and 70° relative to the rolling direction. For the 85% cold worked body, a maximum normalized R-value of 5.196 is achieved at a max RV angle of 50°. The RV-control sample achieves a maximum normalized R-value of 1.030 at a max RV angle of 5°. These R-values may be indicative of the texture (and hence microstructure) of the new aluminum alloy bodies as compared to conventionally produced aluminum alloy bodies.

In one approach, an aluminum alloy body processed in accordance with the new methods described herein may achieve a maximum normalized R-value of at least 2.0. In one embodiment, the new aluminum alloy body may achieve a maximum normalized R-value of at least 2.5. In other embodiments, the new aluminum alloy body may achieve a maximum normalized R-value of at least 3.0, or at least 3.5, or at least 4.0, or at least 4.5, or at least 5.0, or higher. The maximum normalized R-value may be achieved at an orientation angle of from 20° to 70°. In some embodiments, the maximum normalized R-value may be achieved at an orientation angle of from 30° to 70°. In other embodiments, the maximum normalized R-value may be achieved at an orientation angle of from 35° to 65°. In yet other embodiments, the maximum normalized R-value may be achieved at an orientation angle of from 40° to 65°. In yet other embodiments, the maximum normalized R-value may be achieved at an orientation angle of from 45° to 60°. In other embodiments, the maximum normalized R-value may be achieved at an orientation angle of from 45° to 55°.

In another approach, an aluminum alloy body processed in accordance with the new methods described herein may achieve a maximum normalized R-value that is at least 200% higher than the RV-control sample at the max RV angle of the new aluminum alloy body. In this approach, the normalized R-value of the new aluminum alloy body is compared to the normalized R-value of the RV-control sample at the angle where the max RV angle of the new aluminum alloy body occurs. For example, as shown in FIG. 10 and Table 2, above, the 85% cold worked aluminum alloy body realizes a 717% increase in normalized R-value at its max RV angle of 50° as compared to the normalized R-value of the RV-control sample at the same angle of 50° (5.196/0.725*100%=717%). In one embodiment, an aluminum alloy body may achieve a maximum normalized R-value that is at least 250% higher than the RV-control sample at the max RV angle of the new aluminum alloy body. In other embodiments, the aluminum alloy body may achieve a maximum normalized R-value that is at least 300% higher, or at least 350% higher, or at least 400% higher, or at least 450% higher, or at least 500% higher, or at least 550% higher, or at least 600% higher, or at least 650% higher, or at least 700% higher, or more, than the RV-control sample at the max RV angle of the aluminum alloy body.

In another approach, an aluminum alloy body processed in accordance with the new methods described herein may achieve a maximum normalized R-value that is at least 200% higher than the maximum normalized R-value of the RV-control sample. In this approach, the maximum normalized R-value of the new aluminum alloy body is compared to the maximum normalized R-value of the RV-control sample, irrespective of the angle at which the maximum normalized R-values occur. For example, as shown in FIG. 10 and Table 2, above, the 85% cold worked aluminum alloy body alloy realizes a maximum normalized R-value of 5.196 at an orientation angle of 50°. The maximum normalized R-value of the RV-control sample is 1.030 at an orientation angle of 5°. Thus, the 85% cold worked aluminum alloy body realizes a 505% increase in maximum normalized R-value over the RV-control sample (5.196/1.030*100%=505%). In one embodiment, an aluminum alloy body may achieve a maximum normalized R-value that is at least 250% higher than the maximum normalized R-value of the RV-control sample. In other embodiments, the aluminum alloy body may achieve a maximum normalized R-value that is at least 300% higher, or at least 350% higher, or at least 400% higher, or at least 450% higher, or at least 500% higher, or more, than the maximum normalized R-value of the RV-control sample.

iii. Micrographs

Optical micrographs of some 6xxx aluminum alloys bodies produced in accordance with the new processes described herein are illustrated in FIGS. 11b-11e. FIG. 11a is a microstructure of a reference-version of the aluminum alloy body in the T6 temper. FIGS. 11b-11e are microstructures of new aluminum alloy bodies having 11%, 35%, 60% and 85% cold work, respectively. These micrographs illustrate some aspects of the unique microstructures that may be attained using the new processes described herein. As illustrated, the grains of the new aluminum alloy bodies appear to be non-equiaxed (elongated) grains. For the 60% and 85% cold-worked bodies, the grain structure appears fibrous/rope-like, and with a plurality of shear bands. These unique microstructures may contribute to the improved properties of the new aluminum alloy bodies.

F. Optional Post-Thermal Treatments

After the thermal treatment step (300), the 6xxx aluminum alloy body may be subjected to various optional final treatment(s) (400). For example, concomitant to or after the thermal treatments step (300), the 6xxx aluminum alloy body may be subjected to various additional working or finishing operations (e.g., forming operations, flattening or straightening operations that do not substantially affect mechanical properties, such as stretching, and/or other operations, such as machining, anodizing, painting, polishing, buffing). The optional final treatment(s) step (400) may be absent of any purposeful/meaningful thermal treatment(s) that would materially affect the microstructure of the aluminum alloy body (e.g., absent of any anneal steps). Thus, the microstructure achieved by the combination of the cold working (200) and thermally treating (300) steps may be retained.

In one approach, one or more of the optional final treatment(s) (400) may be completed concomitant to the thermal treatment step (300). In one embodiment, the optional final treatment(s) step (400) may include forming, and this forming step may be completed concomitant to (e.g., contemporaneous to) the thermal treatment step (300). In one embodiment, the aluminum alloy body may be in a substantially final form due to concomitant forming and thermal treatment operations (e.g., forming automotive door outer and/or inner panels during the thermal treatment step).

G. Composition

As noted above, the 6xxx aluminum alloy body is made from a 6xxx aluminum alloy. 6xxx aluminum alloys are aluminum alloys containing both silicon and magnesium, with at least one of silicon and magnesium being the predominate alloying ingredient. For purposes of the present application, 6xxx aluminum alloys are aluminum alloys having 0.1-2.0 wt. % silicon and 0.1-3.0 wt. % magnesium, where at least one of the silicon and the magnesium is the predominate alloying element of the aluminum alloy body other than aluminum. In one embodiment, the 6xxx aluminum alloy includes at least 0.25 wt. % Mg. In one embodiment, the 6xxx aluminum alloy includes not greater than 2.0 wt. % Mg. In one embodiment, the 6xxx aluminum alloy includes at least about 0.25 wt. % Si. In one embodiment, the 6xxx aluminum alloy includes not greater than about 1.5 wt. % Si. The 6xxx aluminum alloy may also include secondary elements, tertiary elements and/or other elements, as defined below.

The 6xxx aluminum alloy may include secondary elements. The secondary elements are selected from the group consisting of copper, zinc and combinations thereof. In one embodiment, the 6xxx aluminum alloy includes copper. In another embodiment, the 6xxx aluminum alloy includes zinc. In yet another embodiment, the 6xxx aluminum alloy includes both copper and zinc. When present in sufficient amounts, these secondary elements, in combination with the primary elements of silicon and magnesium, may promote one or both of a strain hardening response and a precipitation hardening response. Thus, when used in combination with the new processes described herein, the 6xxx aluminum alloy may realize an improved combination of properties, such as improved strength (e.g., as compared to the 6xxx aluminum alloy body in the T6 temper).

When copper is used, the 6xxx aluminum alloy generally includes at least 0.35 wt. % Cu. In one embodiment, the 6xxx aluminum alloy includes at least 0.5 wt. % Cu. The 6xxx aluminum alloy generally includes not greater than 2.0 wt. % Cu, such as not greater than 1.5 wt. % Cu. In other embodiments, copper may be present at low levels, and in these embodiments is present at levels of from 0.01 wt. % to 0.34 wt. %. In other embodiments, copper is included in the alloy as an impurity, and in these embodiments is present at levels of less than 0.01 wt. % Cu.

When zinc is used, the 6xxx aluminum alloy generally includes at least 0.35 wt. % Zn. In one embodiment, the 6xxx aluminum alloy includes at least 0.5 wt. % Zn. The 6xxx aluminum alloy generally includes not greater than 2.5 wt. % Zn. In one embodiment, the 6xxx aluminum alloy includes not greater than 2.0 wt. % Zn. In another embodiment, the 6xxx aluminum alloy includes not greater than 1.5 wt. % Zn. In other embodiments, zinc may be present at low levels, and in these embodiments is present at levels of from 0.05 wt. % to 0.34 wt. % Zn. In other embodiments, zinc is included in the alloy as an impurity, and in these embodiments is present at levels of 0.04 wt. % Zn, or less.

The 6xxx aluminum alloy may include a variety of tertiary elements for various purposes, such as to enhance mechanical, physical or corrosion properties (i.e. strength, toughness, fatigue resistance, corrosion resistance), to enhance properties at elevated temperatures, to facilitate casting, to control cast or wrought grain structure, and/or to enhance machinability, among other purposes. When present, these tertiary elements may include one or more of: (i) up to 3.0 wt. % Ag, (ii) up to 2.0 wt. % each of one or more of Li, Mn, Sn, Bi, and Pb, (iii) up to 1.0 wt. % each of one or more of Fe, Sr, Sb, and Cr and (iv) up to 0.5 wt. % each of one or more of Ni, V, Zr, Sc, Ti, Hf, Mo, Co, and rare earth elements. When present, a tertiary element is usually contained in the alloy by an amount of at least 0.01 wt. %.

The 6xxx aluminum alloy may include iron as a tertiary element or as an impurity. When iron is are not included in the alloy as a tertiary element, iron may be included in the 6xxx aluminum alloy as an impurity. In these embodiments, the 6xxx aluminum alloy generally includes not greater than 0.50 wt. % iron. In one embodiment, the 6xxx aluminum alloy includes not greater than 0.25 wt. % iron. In another embodiment, the 6xxx aluminum alloy includes not greater than 0.15 wt. % iron. In yet another embodiment, the 6xxx aluminum alloy includes not greater than 0.10 wt. % iron. In another embodiment, the 6xxx aluminum alloy includes not greater than 0.05 wt. % iron.

The 6xxx aluminum alloy generally contains low amounts of "other elements" (e.g., casting aids and non-Fe impurities). Other elements means any other element of the periodic table that may be included in the 6xxx aluminum alloy, except for the aluminum, the magnesium, the silicon, the secondary elements (when included), the tertiary elements (when included), and iron (when included). When any element of the secondary and/or tertiary elements is contained within the alloy only as an impurity, such elements fall within the scope of "other elements", except for iron. For example, if a 6xxx alloy includes copper as an impurity (i.e., below 0.01 wt. % Cu for purposes of this patent application), and not as an alloying addition, the copper would fall within the scope of "other elements". Likewise, if a 6xxx alloy includes zinc as an impurity (i.e., at or below 0.04 wt. % Zn for purposes of this patent application), and not as an alloying addition, the zinc would fall within the scope of "other elements". As another example, if Mn, Ag, and Zr are included in the 6xxx alloy as alloying additions, those tertiary elements would not fall within the scope of "other elements", but the other tertiary elements would be included within the scope of other elements since they would be included in the alloy only as an impurity. However, if iron is contained in the 6xxx alloy as an impurity, it would not fall within the scope of "other elements" since it has its own defined impurity limits, as described above.

Generally, the aluminum alloy body contains not more than 0.25 wt. % each of any element of the other elements, with the total combined amount of these other elements not exceeding 0.50 wt. %. In one embodiment, each one of these other elements, individually, does not exceed 0.10 wt. % in the 6xxx aluminum alloy, and the total combined amount of these other elements does not exceed 0.35 wt. %, in the 6xxx aluminum alloy. In another embodiment, each one of these other elements, individually, does not exceed 0.05 wt. % in the 6xxx aluminum alloy, and the total combined amount of these other elements does not exceed 0.15 wt. % in the 6xxx aluminum alloy. In another embodiment, each one of these other elements, individually, does not exceed 0.03 wt. % in the 6xxx aluminum alloy, and the total combined amount of these other elements does not exceed 0.1 wt. % in the 6xxx aluminum alloy.

In one approach, a 6xxx aluminum alloy includes:
0.1-2.0 wt. % silicon;
0.1-3.0 wt. magnesium;
wherein at least one of the silicon and the magnesium is the predominate alloying element of the aluminum alloy body other than aluminum;
optionally one or more of the secondary elements of:
0.35 to 2.0 wt. % Cu,
0.35 to 2.5 wt. % Zn,
optionally with one or more of the tertiary elements of:
(i) up to 3.0 wt. % Ag,
(ii) up to 2.0 wt. % each of one or more of Li, Mn, Sn, Bi, and Pb;
(iii) up to 1.0 wt. % each of one or more of Fe, Sr, Sb and Cr; and
(iv) up to 0.5 wt. % each of one or more of Ni, V, Zr, Sc, Ti, Hf, Mo, Co, and rare earth elements,
if not included in the 6xxx aluminum alloy as a tertiary element:
up to 0.5 wt. % Fe as an impurity;
the balance being aluminum and other elements, wherein the other elements are limited to not more than 0.25 wt. % each, and not more than 0.5 wt. % in total.

The total amount of the primary, secondary, and tertiary alloying elements should be chosen so that the aluminum alloy body can be appropriately solutionized (e.g., to promote hardening while restricting the amount of constituent particles).

In one approach, the 6xxx aluminum alloy contains sufficient solute to promote at least one of a strain hardening response and a precipitation hardening response to achieve a long-transverse tensile yield strength of at least 60 ksi. In some of these embodiments, copper and/or zinc is used to at least partially promote the strain hardening response and/or precipitation hardening response, and thus may be included in the alloy in the amounts described above.

In another approach, the 6xxx aluminum alloy contains sufficient magnesium to promote a hardening response. In this approach, the 6xxx aluminum alloy generally contains at least 1.1 wt. % Mg, such as at least 1.2 wt. % Mg, or at least 1.3 wt. % Mg, or at least 1.4 wt. % Mg, or more. In some of these embodiments, the 6xxx aluminum alloy also contains at least one of 0.35-2.0 wt. % copper and/or 0.35-2.5 wt. % zinc to at least partially promote the strain hardening response and/or precipitation hardening response. In others of these embodiments, the 6xxx aluminum alloy includes low-levels and/or impurity levels of copper and/or zinc, as defined above. In some of these embodiments, the 6xxx aluminum alloy achieves a high tensile yield strength, such as any of the strength levels described below. In a particular embodiment, the 6xxx contains at least 1.1 wt. % Mg, less than 0.35 wt. % Cu, less than 0.35 wt. % Zn, and achieves a tensile yield strength of at least about 35 ksi, such as at least about 45 ksi, or even at least about 55 ksi.

In one embodiment, the 6xxx aluminum alloy is one of the following wrought 6xxx aluminum alloys, as defined by the Aluminum Association: 6101, 6101A, 6101B, 6201, 6201A, 6401, 6501, 6002, 6003, 6103, 6005, 6005A, 6005B, 6005C, 6105, 6205, 6006, 6106, 6206, 6306, 6008, 6009, 6010, 6110, 6110A, 6011, 6111, 6012, 6012A, 6013, 6113, 6014, 6015, 6016, 6016A, 6116, 6018, 6019, 6020, 6021, 6022, 6023, 6024, 6025, 6026, 6028, 6033, 6040, 6041, 6042, 6043, 6151, 6351, 6351A, 6451, 6951, 6053, 6056, 6156, 6060, 6160, 6260, 6360, 6460, 6560, 6061, 6061A, 6261, 6162, 6262, 6262A, 6063, 6063A, 6463, 6463A, 6763, 6963, 6064, 6064A, 6065, 6066, 6069, 6070, 6081, 6181, 6181A, 6082, 6182, 6082A, 6091, and 6092, or as modified to contain sufficient solute to promote at least one of a strain-hardening and precipitation hardening response, as described above.

In one embodiment, the 6xxx aluminum alloy includes an amount of alloying elements that leaves the 6xxx aluminum alloy free of, or substantially free of, soluble constituent particles after solutionizing. In one embodiment, the 6xxx aluminum alloy includes an amount of alloying elements that leaves the aluminum alloy with low amounts of (e.g., restricted/minimized) insoluble constituent particles after solutionizing. In other embodiments, the 6xxx aluminum alloy may benefit from controlled amounts of insoluble constituent particles.

H. Properties

The new 6xxx aluminum alloy bodies produced by the new processes described herein may achieve (realize) an improved combination of properties.

i. Strength

As mentioned above, the cold working (200) and the thermally treating (300) steps may be accomplished to achieve an increase in strength as compared to a reference-version of the aluminum alloy body in the as cold-worked condition and/or the T6 temper (as defined above). Strength properties are generally measured in accordance with ASTM E8 and B557.

In one approach, the aluminum alloy body achieves at least a 5% increase in strength (TYS and/or UTS) relative to a reference-version of the aluminum alloy body in the T6 condition. In one embodiment, the aluminum alloy body achieves at least a 6% increase in tensile yield strength relative to a reference-version of the aluminum alloy body in the T6 condition. In other embodiments, the aluminum alloy body achieves at least a 7% increase in tensile yield strength, or at least a 8% increase in tensile yield strength, or at least a 9% increase in tensile yield strength, or at least a 10% increase in tensile yield strength, or at least a 11% increase in tensile yield strength, or at least a 12% increase in tensile yield strength, or at least a 13% increase in tensile yield strength, or at least a 14% increase in tensile yield strength, or at least a 15% increase in tensile yield strength, or at least a 16% increase in tensile yield strength, or at least a 17% increase in tensile yield strength, or at least an 18% increase in tensile yield strength, or at least a 19% increase in tensile yield strength, or at least a 20% increase in tensile yield strength, or at least a 21% increase in tensile yield strength, or at least a 22% increase in tensile yield strength, or at least a 23% increase in tensile yield strength, or at least a 24% increase in tensile yield strength, or at least a 25% increase in tensile yield strength, or at least a 26% increase in tensile yield strength, or more, relative to a reference-version of the aluminum alloy body in the T6 condition. These increases may be realized in the L and/or LT directions.

In a related embodiment, the aluminum alloy body may achieve at least a 6% increase in ultimate tensile strength relative to the aluminum alloy body in the T6 condition. In other embodiments, the aluminum alloy body may achieve at least a 7% increase in ultimate tensile strength, or at least an 8% increase in ultimate tensile strength, or at least a 9% increase in ultimate tensile strength, or at least a 10% increase in ultimate tensile strength, or at least an 11% increase in ultimate tensile strength, or at least a 12% increase in ultimate tensile strength, or at least a 13% increase in ultimate tensile strength, or at least a 14% increase in ultimate tensile strength, or at least a 15% increase in ultimate tensile strength, or at least a 16% increase in ultimate tensile strength, or at least a 17% increase in ultimate tensile strength, or at least an 18% increase in ultimate tensile strength, or at least a 19% increase in ultimate tensile strength, or at least a 20% increase in ultimate tensile strength, or at least a 21% increase in ultimate tensile strength, or at least a 22% increase in ultimate tensile strength, or at least a 23% increase in ultimate tensile strength, or at least a 24% increase in ultimate tensile strength, or at least a 25% increase in ultimate tensile strength, or more, relative to a reference-version of the aluminum alloy body in the T6 condition. These increases may be realized in the L and/or LT directions.

In one approach, the aluminum alloy body achieves at least equivalent tensile yield strength as compared to a reference-version of the aluminum alloy body in the as-cold worked condition. In one embodiment, the aluminum alloy body achieves at least a 2% increase in tensile yield strength as compared to a reference-version of the aluminum alloy body in the as-cold worked condition. In other embodiments, the aluminum alloy body achieves at least a 4% increase in tensile yield strength, or at least a 6% increase in tensile yield strength, or at least a 8% increase in tensile yield strength, or at least a 10% increase in tensile yield strength, or at least a 12% increase in tensile yield strength, or at least a 14% increase in tensile yield strength, or at least an 16% increase in tensile yield strength, or more, as compared to a reference-version of the aluminum alloy body in the as-cold worked condition. Similar results may be obtained relative to ultimate tensile strength. These increases may be realized in the L or LT directions.

In one embodiment, a new 6xxx aluminum alloy body realizes a typical tensile yield strength in the LT direction of at least 35 ksi. In other embodiments, a new 6xxx aluminum alloy body realizes a typical tensile yield strength in the LT direction of at least 40 ksi, or at least 45 ksi, or at least 50 ksi, or at least 51 ksi, or at least 52 ksi, or at least 53 ksi, or at least 54 ksi, or at least 55 ksi, or at least 56 ksi, or at least 57 ksi, or at least 58 ksi, or at least 59 ksi, or at least 60 ksi, or at least 61 ksi, or at least 62 ksi, or at least 63 ksi, or at least 64 ksi, or at least 65 ksi, or at least 66 ksi, or at least 67 ksi, or at least 68 ksi, or at least 69 ksi, or at least 70 ksi, or at least 71 ksi, or at least 72 ksi, or at least 73 ksi, or at least 74 ksi, or at least 75 ksi, or more. Similar results may be achieved in the longitudinal (L) direction.

In a related embodiment, a new 6xxx aluminum alloy body realizes a typical ultimate tensile strength in the LT direction of at least 40 ksi. In other embodiments, a new 6xxx aluminum alloy body realizes a typical ultimate tensile strength in the LT direction of at least 45 ksi, or at least 50 ksi, 51 ksi, or at least 52 ksi, or at least 53 ksi, or at least 54 ksi, or at least 55 ksi, or at least 56 ksi, or at least 57 ksi, or at least 58 ksi, or at least 59 ksi, or at least 60 ksi, or at least 61 ksi, or at least 62 ksi, or at least 63 ksi, or at least 64 ksi, or at least 65 ksi, or at least 66 ksi, or at least 67 ksi, or at least 68 ksi, or at least 69 ksi, or at least 70 ksi, or at least 71 ksi, or at least 72 ksi, or at least 73 ksi, or at least 74 ksi, or at least 75 ksi, or more. Similar results may be achieved in the longitudinal (L) direction. Similar results may be achieved in the longitudinal (L) direction.

The new 6xxx aluminum alloy bodies may achieve a high strength and in a short time period relative to a reference-version of the 6xxx aluminum alloy body in the T6 temper. In one embodiment, a new 6xxx aluminum alloy body realizes its peak strength at least 10% faster than a reference-version of the aluminum alloy body in the T6 temper. As an example of 10% faster processing, if the T6-version of the 6xxx aluminum alloy body realizes its peak strength in 35 hours of processing, the new 6xxx aluminum alloy body would realize its peak strength in 31.5 hours or less. In other embodiments, the new 6xxx aluminum alloy body realizes it peak strength at least 20% faster, or at least 25% faster, or at least 30% faster, or at least 35% faster, or at least 40% faster, or at least 45% faster, or at least 50% faster, or at least 55% faster, or at least 60% faster, or at least 65% faster, or at least 70% faster, or at least 75% faster, or at least 80% faster, or at least 85% faster, or at least 90% faster, or more, as compared to a reference-version of the aluminum 6xxx aluminum alloy body in the T6 temper.

In one embodiment, a new 6xxx aluminum alloy body realizes its peak strength in less than 10 hours of thermal treatment time. In other embodiments, a new 6xxx aluminum alloy body realizes its peak strength in less than 9 hours, or less than 8 hours, or less than 7 hours, or less than 6 hours, or less than 5 hours, or less than 4 hours, or less than 3 hours, or less than 2 hours, or less than 1 hour, or less than 50 minutes, or less than 40 minutes, or less than 30 minutes, or less than 20 minutes, or less than 15 minutes, or less than 10 minutes of thermal treatment time, or less. Due to the short thermal treatment times, it is possible that paint baking cycles or coating cures could be used to thermally treat the new 6xxx aluminum alloy bodies.

ii. Ductility

The aluminum alloy body may realize good ductility and in combination with the above-described strengths. In one approach, the aluminum alloy body achieves an elongation (L and/or LT) of more than 4%. In one embodiment, the aluminum alloy body achieves an elongation (L and/or LT) of at least 5%. In other embodiments, the aluminum alloy body may achieve an elongation (L and/or LT) of at least 6%, or at least 7%, or at least 8%, or at least 9%, or at least 10%, or at least 11%, or at least 12%, or at least 13%, or at least 14%, or at least 15%, or at least 16%, or more.

iii. Fracture Toughness

The new 6xxx aluminum alloy bodies may realize good fracture toughness properties. Toughness properties are generally measured in accordance with ASTM E399 and ASTM B645 for plane-strain fracture toughness (e.g., $K_{IC}$ and $K_Q$) and in accordance with ASTM E561 and B646 for plane-stress fracture toughness (e.g., $K_{app}$ and $K_{R25}$).

In one embodiment, the new 6xxx aluminum alloy body realizes a toughness decrease of not greater than 10% relative to a reference-version of the aluminum alloy body in the T6 temper. In other embodiments, the new 6xxx aluminum alloy body realizes a toughness decrease of not greater than 9%, or not greater than 8%, or not greater than 7%, or not greater than 6%, or not greater than 5%, or not greater than 4%, or not greater than 3%, or not greater than 2%, or not greater than 1% relative to a reference-version of the 6xxx aluminum alloy body in the T6 temper. In one embodiment, the new 6xxx aluminum alloy body realizes a toughness at least equivalent to that of a reference-version of the 6xxx aluminum alloy body in the T6 temper.

iv. Stress Corrosion Cracking

The new 6xxx aluminum alloy bodies may realize good stress corrosion cracking resistance. Stress corrosion cracking (SCC) resistance is generally measured in accordance with ASTM G47. For example, a new 6xxx aluminum alloy body may achieve a good strength and/or toughness, and with good SCC corrosion resistance. In one embodiment, a new 6xxx aluminum alloy body realizes a Level 1 corrosion resistance. In another embodiment, a new 6xxx aluminum alloy body realizes a Level 2 corrosion resistance. In yet another embodiment, a new 6xxx aluminum alloy body realizes a Level 3 corrosion resistance. In yet another embodiment, a new 6xxx aluminum alloy body realizes a Level 4 corrosion resistance.

| Corrosion Resistance Level | Short-transverse stress (ksi) for 20 days (minimum) without failure |
|---|---|
| 1 | ≥15 |
| 2 | ≥25 |
| 3 | ≥35 |
| 4 | ≥45 | v. Exfoliation Resistance

The new 6xxx aluminum alloy bodies may be exfoliation resistant. Exfoliation resistance is generally measured in accordance with ASTM G34. In one embodiment, an aluminum alloy body realizes an EXCO rating of EB or better. In another embodiment, an aluminum alloy body realizes an EXCO rating of EA or better. In yet another embodiment, an aluminum alloy body realizes an EXCO rating of P, or better.

vi. Appearance

Aluminum alloy bodies processed in accordance with the new processes disclosed herein may realize improved appearance. The below appearance standards may be measured with a Hunterlab Dorigon II (Hunter Associates Laboratory INC, Reston, Va.), or comparable instrument.

Aluminum alloy bodies processed in accordance with the new processes disclosed herein may realize at least 5% higher specular reflectance as compared to the referenced aluminum alloy body in the T6 temper. In one embodiment, the new aluminum alloy bodies realize at least 6% higher specular reflectance as compared to the referenced aluminum alloy body in the T6 temper. In other embodiments, the new aluminum alloy bodies realize at least 7% higher specular reflectance, or at least 8% higher specular reflectance, or at least 9% higher specular reflectance, or at least 10% higher specular reflectance, or at least 11% higher specular reflectance, or at least 12% higher specular reflectance, or at least 13% higher specular reflectance, or more, as compared to the referenced aluminum alloy body in the T6 temper.

Aluminum alloy bodies processed in accordance with the new processes disclosed herein may realize at least 10% higher 2 degree diffuseness as compared to the referenced aluminum alloy body in the T6 temper. In one embodiment, the new aluminum alloy bodies realize at least 12% higher 2 degree diffuseness as compared to the referenced aluminum alloy body in the T6 temper. In other embodiments, the new aluminum alloy bodies realize at least 14% higher 2 degree diffuseness, or at least 16% higher 2 degree diffuseness, or at least 18% higher 2 degree diffuseness, or at least 20% higher 2 degree diffuseness, or at least 22% higher 2 degree diffuseness, or more, as compared to the referenced aluminum alloy body in the T6 temper.

Aluminum alloy bodies processed in accordance with the new processes disclosed herein may realize at least 15% higher 2 image clarity as compared to the referenced aluminum alloy body in the T6 temper. In one embodiment, the new aluminum alloy bodies realize at least 18% higher 2 image clarity as compared to the referenced aluminum alloy body in the T6 temper. In other embodiments, the new aluminum alloy bodies realize at least 21% higher 2 image clarity, or at least 24% higher 2 image clarity, or at least 27% higher 2 image clarity, or at least 30% higher 2 image clarity, or more, as compared to the referenced aluminum alloy body in the T6 temper.

I. Product Applications

The new processes described herein may have applicability in a variety of product applications. In one embodiment, a product made by the new processes described herein is used in an aerospace application, such as wing skins (upper and lower) or stringers/stiffeners, fuselage skin or stringers, ribs, frames, spars, seat tracks, bulkheads, circumferential frames, empennage (such as horizontal and vertical stabilizers), floor beams, seat tracks, doors, and control surface components (e.g., rudders, ailerons) among others. Many potential benefits could be realized in such components through use of the products including higher strength, superior corrosion resistance, improved resistance to the initiation and growth of fatigue cracks, and enhanced toughness to name a few. Improved combinations of such properties can result in weight savings or reduced inspection intervals or both.

In another embodiment, a product made by the new processes described herein is used in a munitions/ballistics/military application, such as in ammunition cartridges and armor, among others. Ammunition cartridges may include those used in small arms and cannons or for artillery or tank rounds. Other possible ammunition components would include sabots and fins. Artillery, fuse components are another possible application as are fins and control surfaces for precision guided bombs and missiles. Armor components could include armor plates or structural components for military vehicles. In such applications, the products could offer weight savings or improved reliability or accuracy.

In another embodiment, a product made by the new processes described herein is used in a fastener application, such as bolts, rivets, screws, studs, inserts, nuts, and lock-bolts, which may be used in the industrial engineering and/or aerospace industries, among others. In these applications, the products could be used in place of other heavier materials, like titanium alloys or steels, for weight reduction. In other cases, the products could provide superior durability.

In another embodiment, a product made by the new processes described herein is used in an automotive application, such as closure panels (e.g., hoods, fenders, doors, roofs, and trunk lids, among others), wheels, and critical strength applications, such as in body-in-white (e.g., pillars, reinforcements) applications, among others. In some of these applications the products may allow down-gauging of the components and weight savings.

In another embodiment, a product made by the new processes described herein is used in a marine application, such as for ships and boats (e.g., hulls, decks, masts, and superstructures, among others). In some of these applications the products could be used to enable down-gauging and weight reductions. In some other cases, the products could be used to replace products with inferior corrosion resistance resulting in enhanced reliability and lifetimes.

In another embodiment, a product made by the new processes described herein is used in a rail application, such as for hopper tank and box cars, among others. In the case of hopper or tank cars, the products could be used for the hoppers and tanks themselves or for the supporting structures. In these cases, the products could provide weight reductions (through down-gauging) or enhanced compatibility with the products being transported.

In another embodiment, a product made by the new processes described herein is used in a ground transportation application, such as for truck tractors, box trailers, flatbed trailers, buses, package vans, recreational vehicles (RVs), all-terrain vehicles (ATVs), and the like. For truck tractors, buses, package vans and RV's, the products could be used for closure panels or frames, bumpers or fuel tanks allowing down-gauging and reduced weight. Correspondingly, the bodies could also be used in wheels to provided enhanced durability or weight savings or improved appearance.

In another embodiment, a product made by the new processes described herein is used in an oil and gas application, such as for risers, auxiliary lines, drill pipe, choke-and-kill lines, production piping, and fall pipe, among others. In these applications the product could allow reduced wall thicknesses and lower weight. Other uses could include replacing alternate materials to improve corrosion performance or replacing alternate materials to improve compatibility with drilling or production fluids. The products could also be used for auxiliary equipment employed in exploration like habitation modules and helipads, among others.

In another embodiment, a product made by the new processes described herein is used in a packaging application, such as for lids and tabs, food cans, bottles, trays, and caps, among others. In these applications, benefits could include the opportunity for down-gauging and reduced package weight or cost. In other cases, the product would have enhanced compatibility with the package contents or improved corrosion resistance.

In another embodiment, a product made by the new processes described herein is used in a reflector, such as for lighting, mirrors, and concentrated solar power, among others. In these applications the products could provide better reflective qualities in the bare, coated or anodized condition at a given strength level.

In another embodiment, a product made by the new processes described herein is used in an architecture application, such as for building panels/facades, entrances, framing systems, and curtain wall systems, among others. In such applications, the product could provide superior appearance or durability or reduced weight associated with down-gauging.

In another embodiment, a product made by the new processes described herein is used in an electrical application, such as for connectors, terminals, cables, bus bars, and wires, among others. In some cases the product could offer reduced tendency for sag for a given current carrying capability. Connectors made from the product could have enhanced capability to maintain high integrity connections over time. In other wires or cables, the product could provide improved fatigue performance at a given level of current carrying capability.

In another embodiment, a product made by the new processes described herein is used in a fiber metal laminate application, such as for producing high-strength sheet products used in the laminate, among others which could result in down-gauging and weight reduction.

In another embodiment, a product made by the new processes described herein is used in an industrial engineering application, such as for tread-plate, tool boxes, bolting decks, bridge decks, and ramps, among others where enhanced properties could allow down-gauging and reduced weight or material usage.

In another embodiment, a product made by the new processes described herein is used in a fluid container (tank), such as for rings, domes, and barrels, among others. In some cases the tanks could be used for static storage. In others, the tanks could be parts of launch vehicles or aircraft. Benefits in these applications could include down-gauging or enhanced compatibility with the products to be contained.

In another embodiment, a product made by the new processes described herein is used in consumer product applications, such as laptops, cell phones, cameras, mobile music players, handheld devices, computers, televisions, microwaves, cookware, washer/dryer, refrigerators, sporting goods, or any other consumer electronic products requiring durability or desirable appearance. In another embodiment, a product made by the new processes described herein is used in a medical device, security systems, and office supplies, among others.

In another embodiment, the new process is applied to a cold hole expansion process, such as for treating holes to improve fatigue resistance, among others, which may result in a cold work gradient and tailored properties, as described above. This cold hole expansion process may be applicable to forged wheels and aircraft structures, among others.

In another embodiment, the new process is applied to cold indirect extrusion processes, such as for producing cans, bottles, aerosol cans, and gas cylinders, among others. In these cases the product could provide higher strength which could provide reduced material usage. In other cases, improved compatibility with the contents could result in greater shelf life.

In another embodiment, a product made by the new processes described herein is used in a heat-exchanger application, such as for tubing and fins, among others where higher strength can be translated into reduced material usage. Improved durability and longer life could also be realized.

In another embodiment, the new process is applied to a conforming processes, such as for producing heat-exchanger components, e.g., tubing where higher strength can be translated into reduced material usage. Improved durability and longer life could also be realized.

The new 6xxx aluminum alloy products may find use in multi-layer applications. For example it is possible that a multi-layer product may be formed using a 6xxx aluminum alloy body as a first layer and any of the 1xxx-8xxx alloys being used as a second layer. FIG. 12 illustrates one embodiment of a method for producing multi-layered products. In the illustrated embodiment, a multi-layered product may be produced (107), after which it is homogenized (122), hot rolled (126), solutionized (140) and then cold rolled (220), as described above relative to FIG. 9. The multi-layered products may be produced via multi-alloy casting, roll bonding, and metallurgical bonding, among others. Multi-alloy casting techniques include those described in U.S. Patent Application Publication No. 20030079856 to Kilmer et al., U.S. Patent Application No. 20050011630 to Anderson et al., U.S. Patent Application No. 20080182122 to Chu et al., and WO2007/098583 to Novelis (the so-called FUSION™ casting process).

These and other aspects, advantages, and novel features of this new technology are set forth in part in the description that follows and will become apparent to those skilled in the art upon examination of the description and figures, or may be learned by practicing one or more embodiments of the technology provided for by the patent application.

BRIEF DESCRIPTION OF THE DRAWINGS

FIG. 10 is a graph illustrating R-values as a function of orientation angle for various aluminum alloy bodies.

FIGS. 11a-11e are optical micrographs illustrating aluminum alloy body microstructures; the optical micrographs were obtained by anodizing the samples and viewing them in polarized light.

FIGS. 14-22 are graphs illustrating the thermal treatment response of various 6xxx aluminum alloy bodies.

FIG. 23 is a graph illustrating the ductility of various 6xxx aluminum alloy bodies as a function of time when thermally treated at 350° F.

FIG. 24 is a graph illustrating the fatigue response of various 6xxx aluminum alloy bodies.

FIG. 25 is a graph illustrating trendlines of the fatigue response of various 6xxx aluminum alloy bodies based on the data of FIG. 24.

FIG. 26 is a graph illustrating the strength and fracture toughness properties of various 6xxx aluminum alloy bodies.

FIGS. 27-35 are graphs illustrating various properties of various 6013 alloy bodies, both conventionally processed and as processed in accordance with the new processes described herein.

FIG. 36 is a graph illustrating various properties of various 6061 alloy bodies, both conventionally processed and as processed in accordance with the new processes described herein.

FIG. 37 is a graph illustrating various properties of various 6022 alloy bodies, both conventionally processed and as processed in accordance with the new processes described herein.

FIGS. 38-39 are graphs illustrating R-values as a function of orientation angle for various 6022 and 6061 aluminum alloy bodies.

FIGS. 40-51 are graphs illustrating various properties of high magnesium 6xxx aluminum alloy bodies, both conventionally processed and as processed in accordance with the new processes described herein.

DETAILED DESCRIPTION

Example 1

Figure 1:
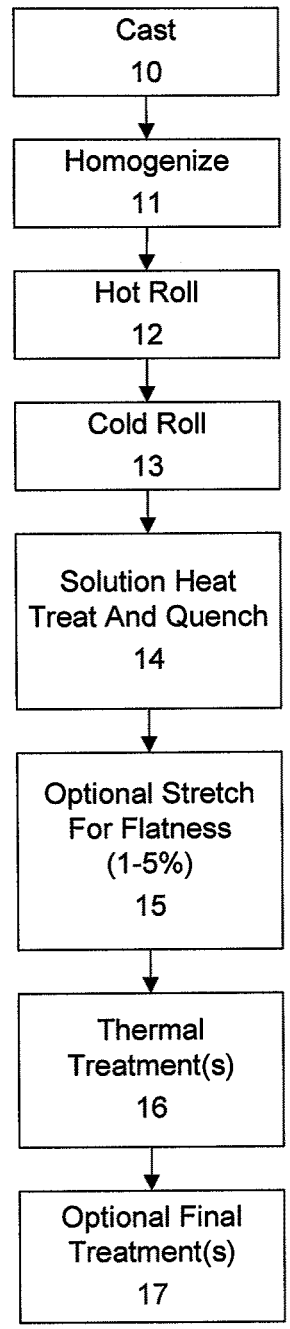
FIG. 1 is a flow chart illustrating a conventional process for producing aluminum alloy products.
Figure 2:
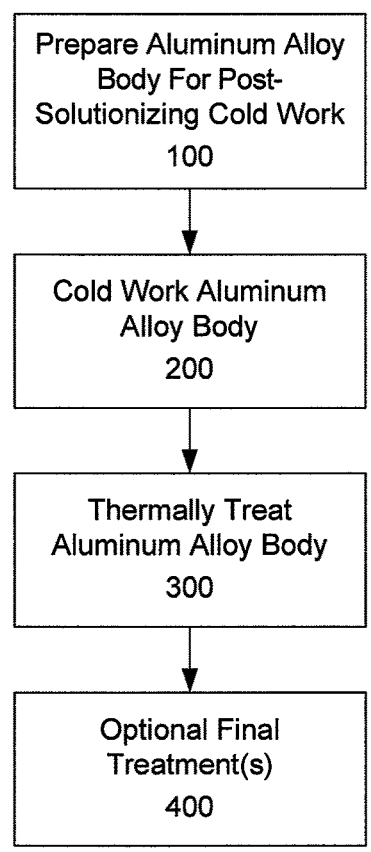
FIG. 2 is a flow chart illustrating a new process for producing aluminum alloy products.
Figure 3:
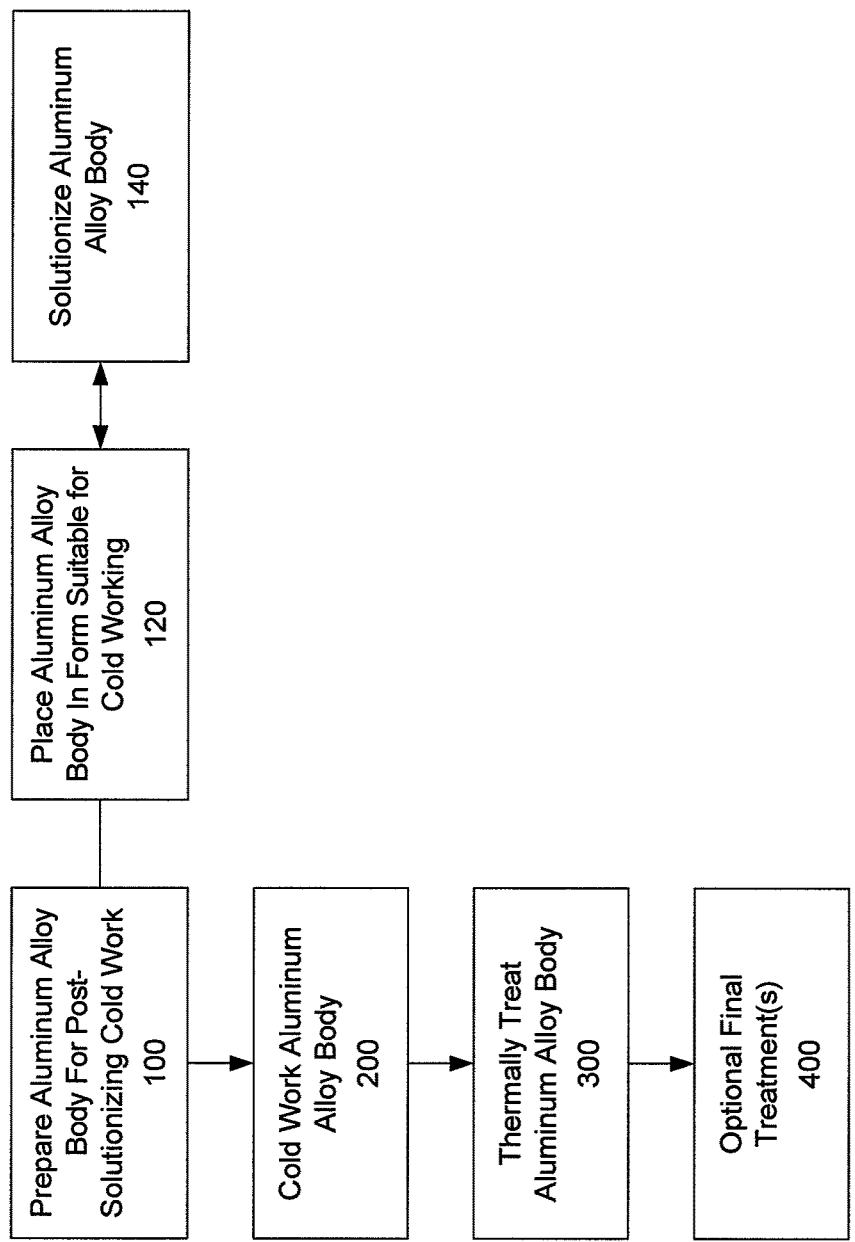
FIGS. 3-8 are flow charts illustrating various embodiments of preparing an aluminum alloy body for post-solutionizing cold work.
Figure 4:
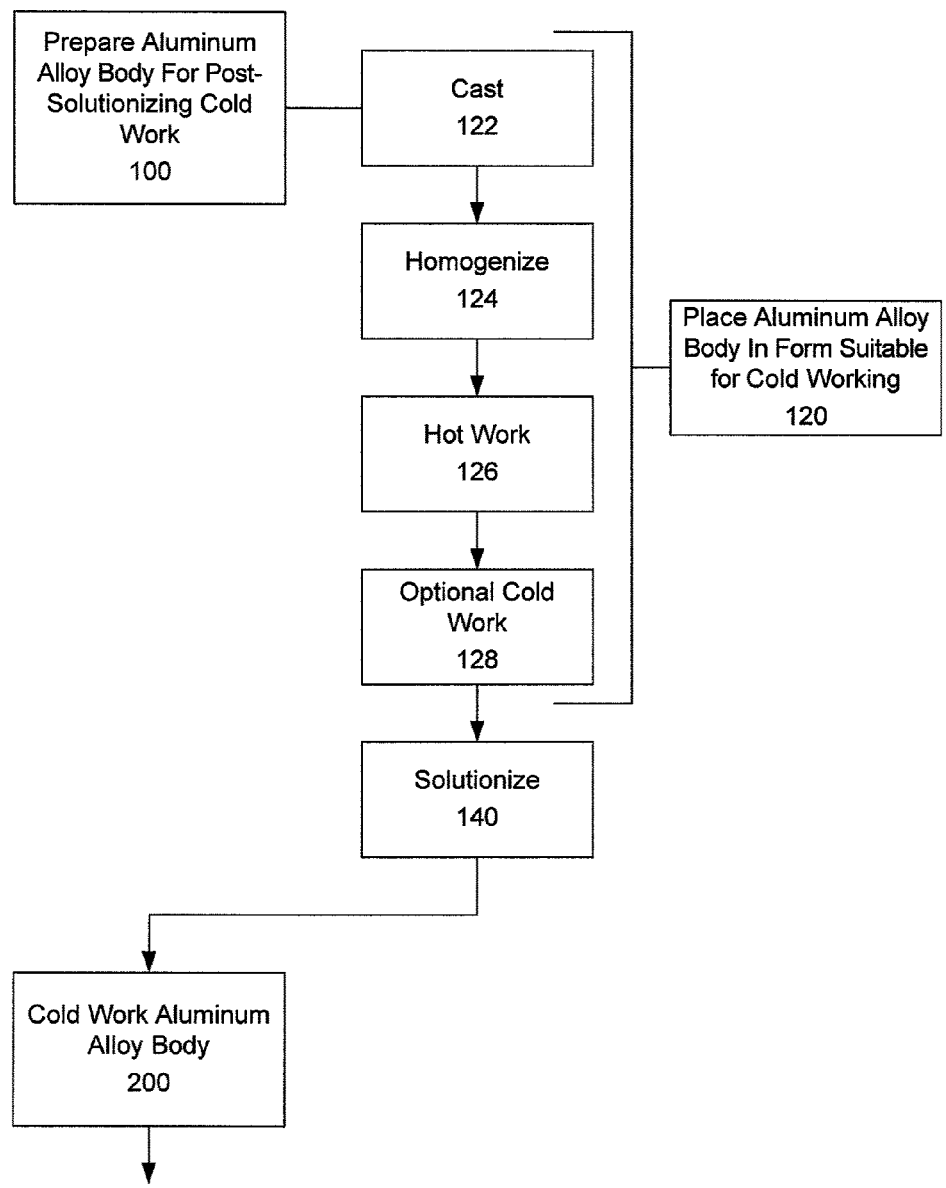
Figure 5:
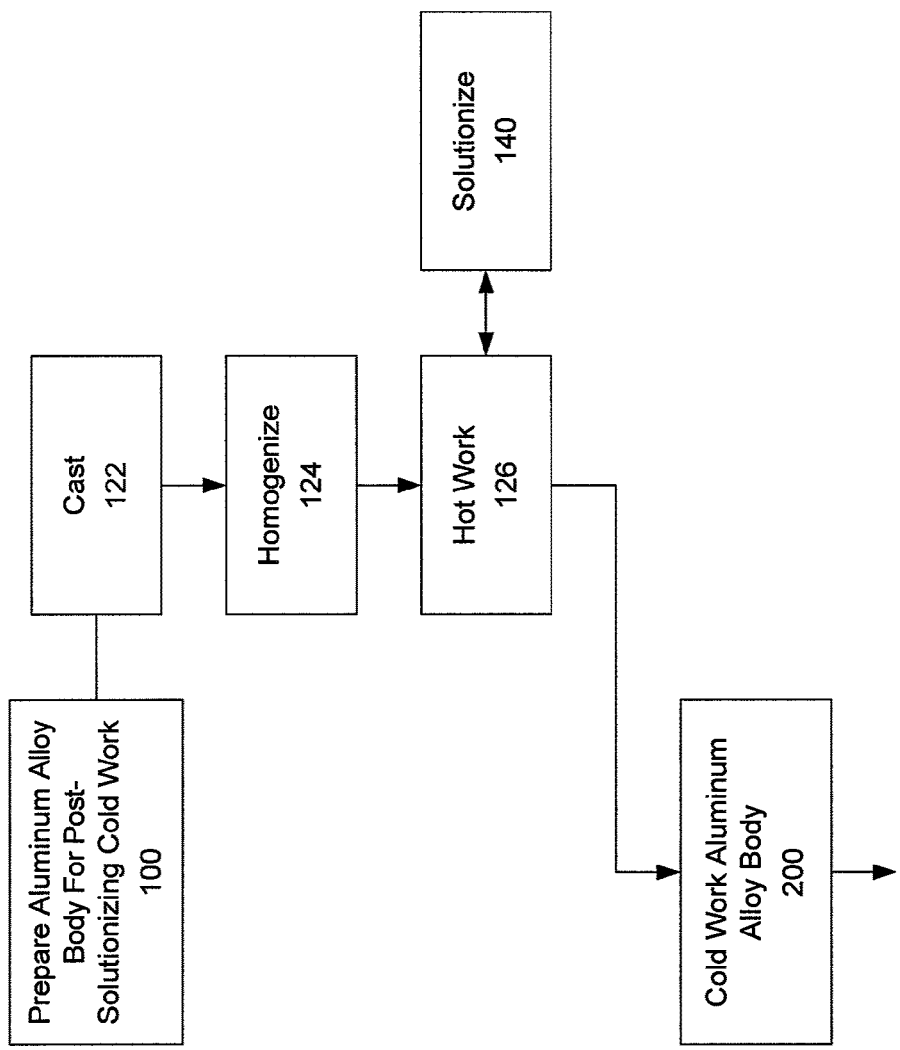
Figure 6:
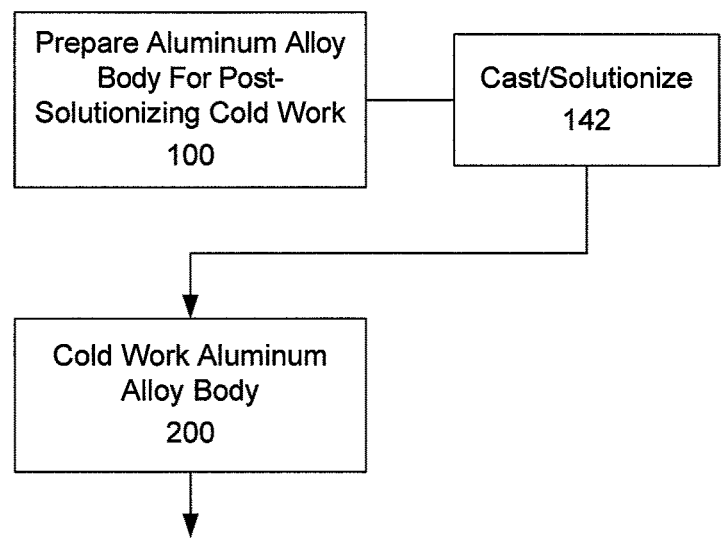
Figure 7:
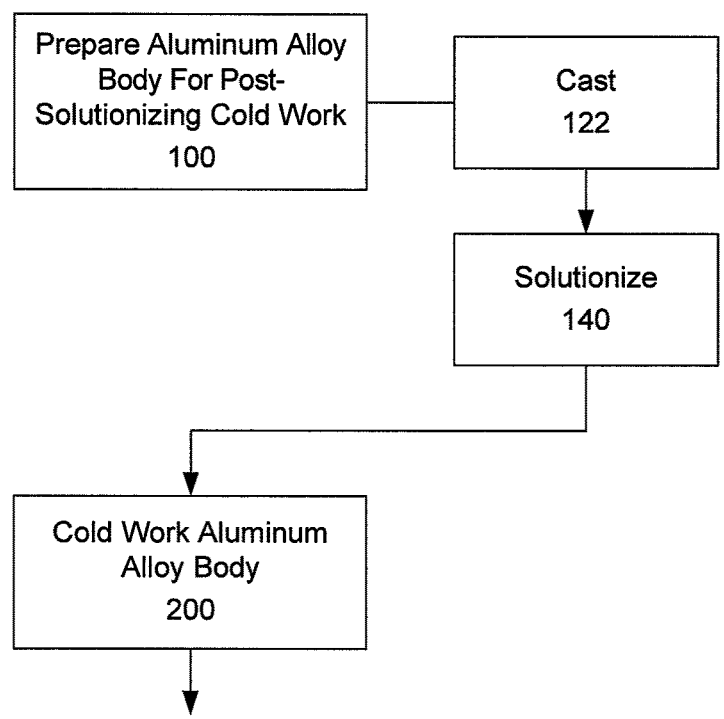
Figure 8:
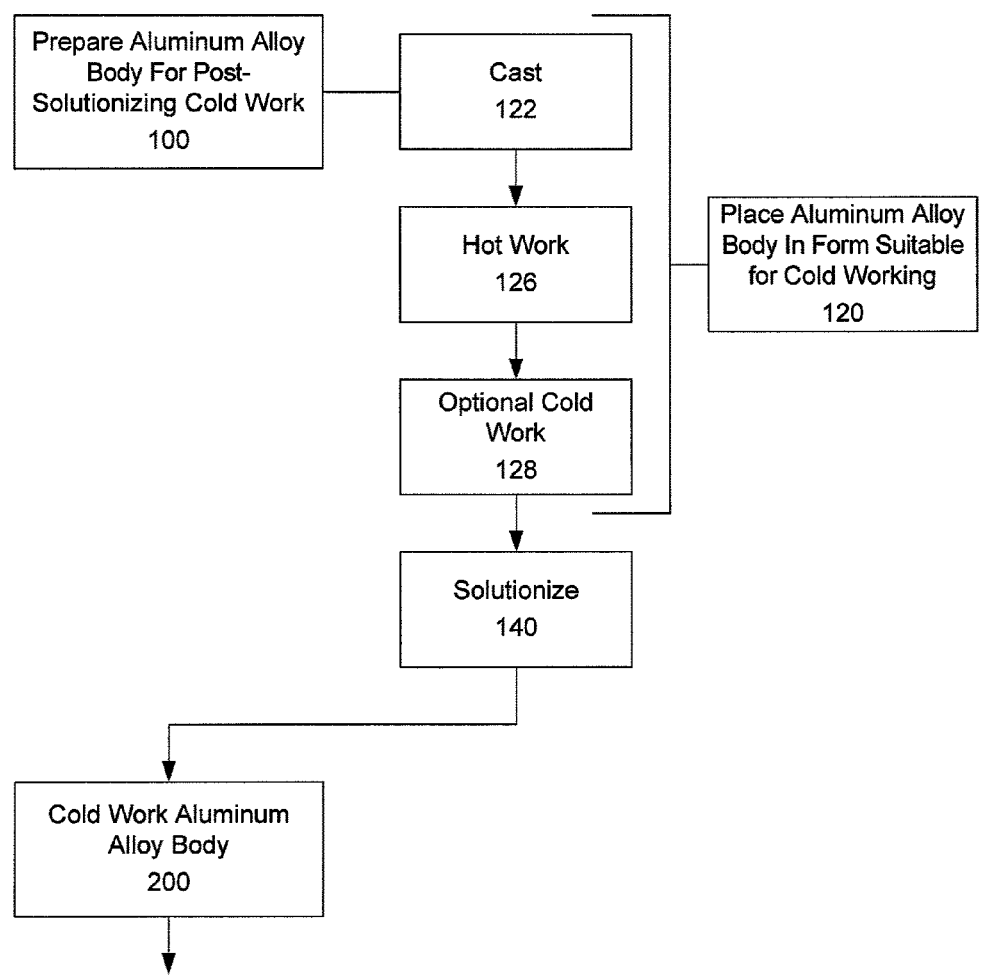
Figure 9:
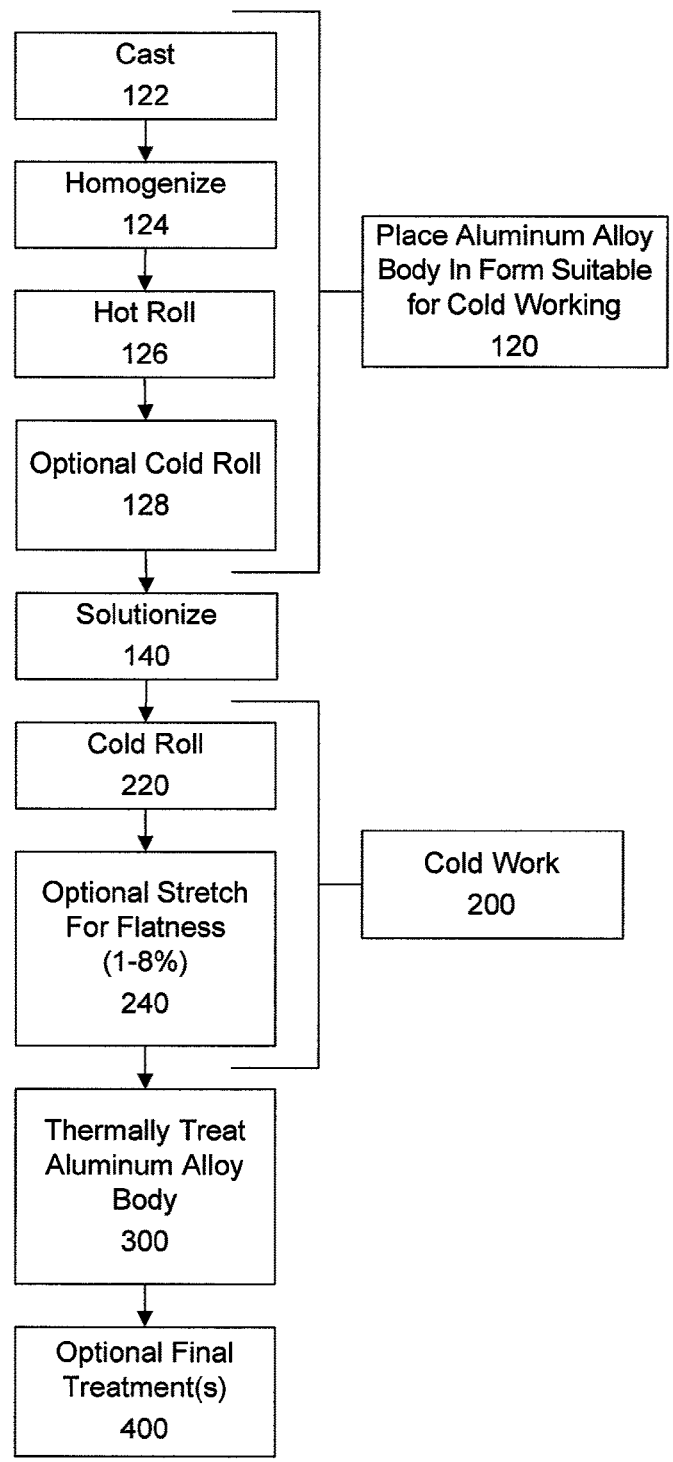
FIG. 9 is a flow chart illustrating one embodiment of a method for producing a rolled aluminum alloy body.
Figure 11A:
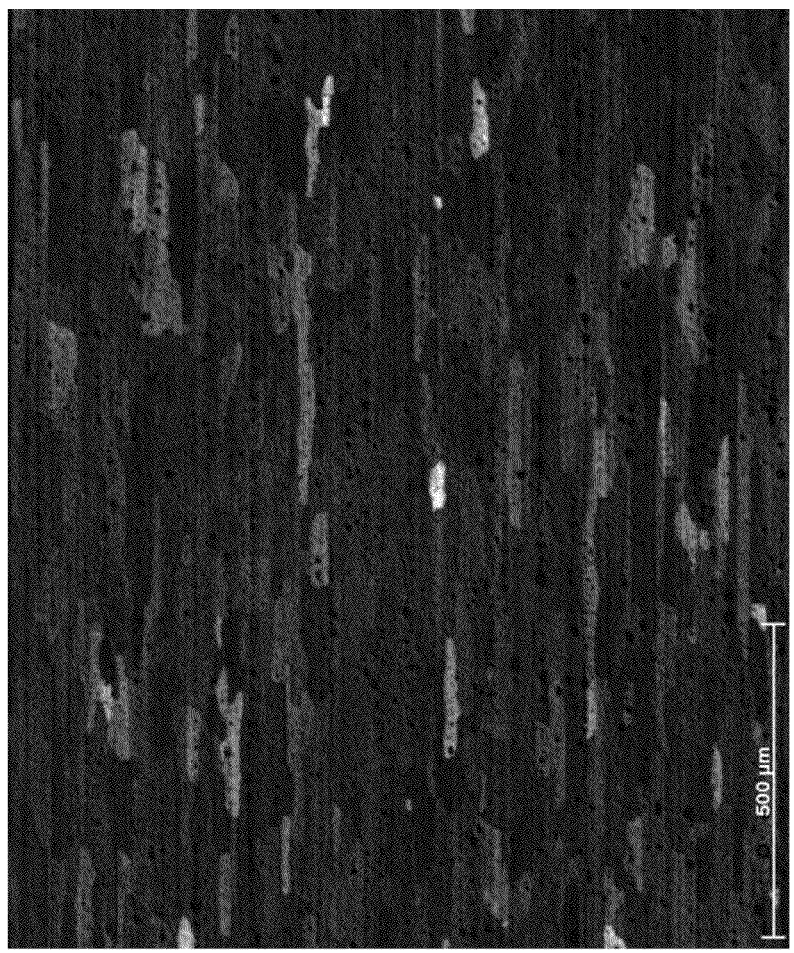
Figure 11B:
Figure 11D:
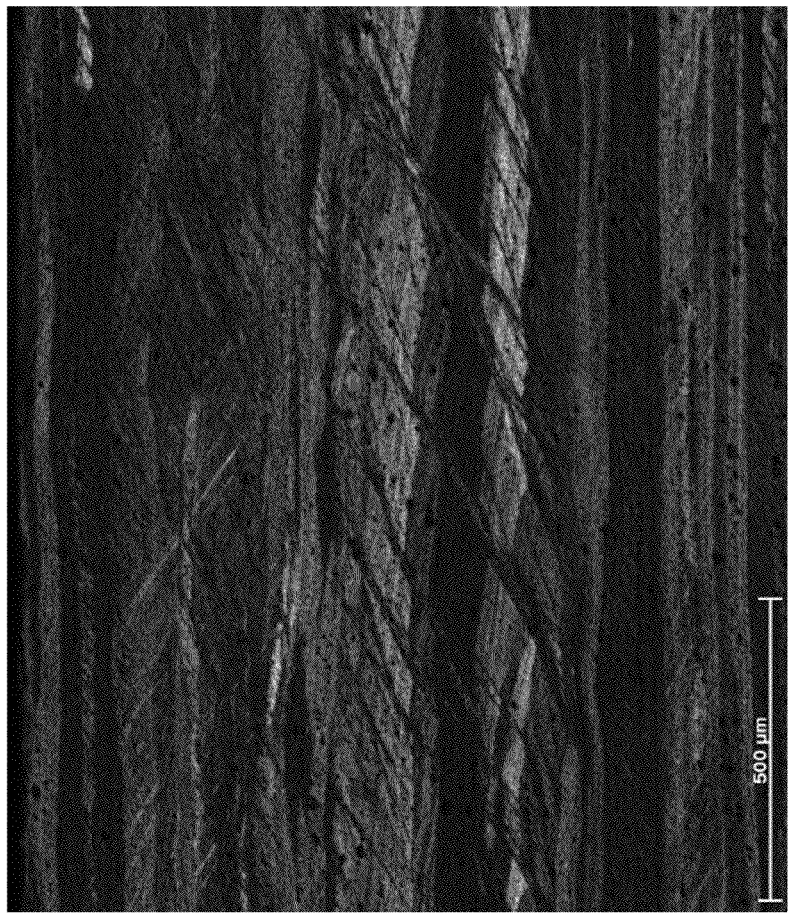
Figure 11E:
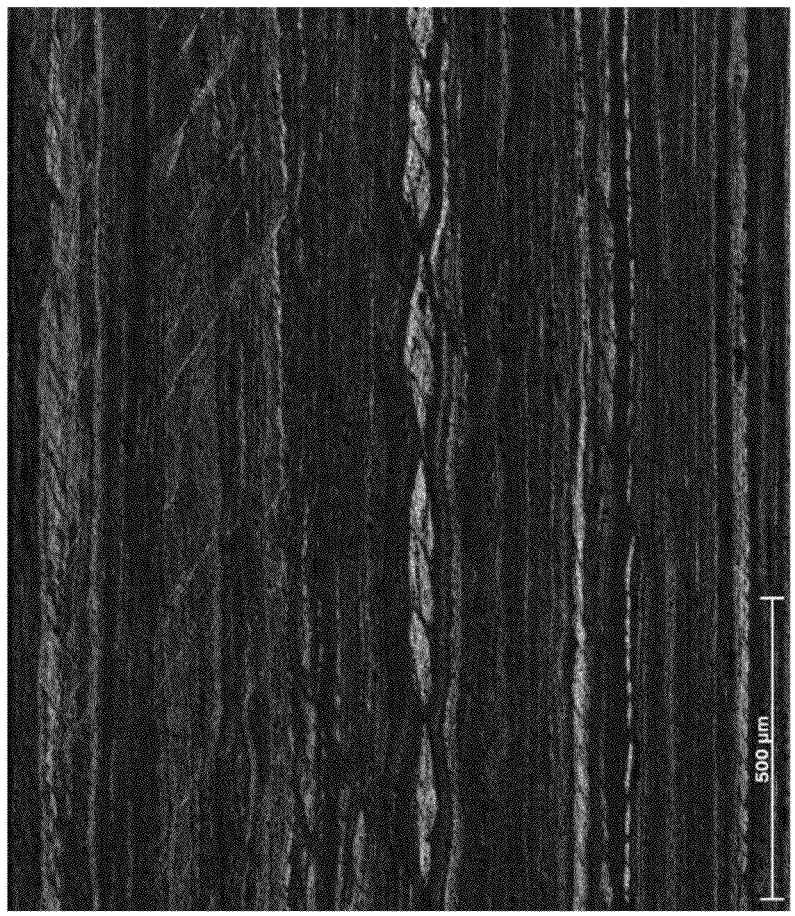

Testing of 6xxx Aluminum Alloy Having Copper and Zinc

A 6xxx aluminum alloy having both copper and zinc (the "6xxx+Cu+Zn alloy") is direct chill cast as an ingot. This alloy is similar to that disclosed in U.S. Pat. No. 6,537,392. The 6xxx+Cu+Zn alloy has the composition provided for in Table 3, below.

TABLE 3

| Composition of 6xxx + Cu + Zn aluminum alloy (all values in wt. %) | | | | | | | | | | |
|---|---|---|---|---|---|---|---|---|---|---|
| Si | Fe | Mn | Cu | Mg | Zn | Cr | Ti | Others each | Others Total | Bal. |
| 0.86 | 0.12 | 0.01 | 0.73 | 0.89 | 0.69 | 0.22 | 0.02 | ≤0.05 | ≤0.15 | Al |

After casting, the ingot is homogenized and then hot rolled to an intermediate gauge of 2.0 inches. The 2.0 inch body is split into five sections, bodies A-E.

Body A is conventionally processed into sheet by hot rolling the 2.0 inch plate to a second intermediate gauge of 0.505 inch, then cold rolling into sheet having a final gauge of 0.194 inch, after which it is solutionized (Sheet A), stretched about 1% for flatness.

Bodies B-E are processed into sheet using the new process by hot rolling to second intermediate gauges of 1.270 inches (Body E), 0.499 inch (Body D), 0.315 inch (Body C), and 0.225 inch (Body B), and then solutionizing, and then cold rolling these bodies to a final sheet gauge of about 0.200 inch. Sheet B receives about 11% CW, Sheet C receives about 35% CW, Sheet D receives 60% CW and Sheet E receives about 85% CW.

Test 1 Samples

A sample of Sheet A is thermally treated at 350° F. Since Sheet A was solutionized and then thermally treated, i.e., no cold work was applied between the solutionizing and thermal treatment step, Sheet A is considered to be treated to a T6 temper. The mechanical properties of the sample from Sheet A are measured as a function of time at various intervals.

Various samples from Sheets B-E are thermally treated. A first set is thermally treated at 300° F., a second set is thermally treated at 325° F., a third set is thermally treated at 350° F., a fourth set is thermally treated at 375° F., and a fifth set is thermally treated at 400° F. The mechanical properties of each the samples from of Sheets B-E are measured as a function of time at various intervals.

FIGS. 14-23 illustrate the thermal treatment response of Sheets A-E. The sheets made by the new process (Sheets B-E) achieve higher strength and in a shorter period of time relative to the conventional sheet product (Sheet A). Table 4, below illustrates some of the tensile properties using the 350° F. thermal treatment condition, all values in ksi and in the LT (long transverse) direction.

TABLE 4

Strength of the 6xxx + Cu + Zn alloy at various thermal treatment times 350° F.)

| Time (hr) | Sheet A (T6) (old) | | Sheet E 85% CW (new) | | Sheet D 60% CW (new) | | Sheet C 35% CW (new) | | Sheet B 11% CW (new) | |
|---|---|---|---|---|---|---|---|---|---|---|
| | TYS | UTS | TYS | UTS | TYS | UTS | TYS | UTS | TYS | UTS |
| 2 | 41.7 | 53.7 | 70.9 | 72.9 | 65.6 | 68.9 | 59.3 | 63.4 | 52.2 | 57.9 |
| 4 | 49.7 | 56.9 | 67.8 | 70.2 | 65.0 | 68.1 | 60.6 | 64.0 | 54.8 | 59.3 |
| 8 | 54.2 | 58.5 | 64.9 | 66.8 | 63.0 | 65.3 | 60.0 | 63.2 | 55.6 | 59.1 |
| 16 | 55.3 | 58.5 | 61.2 | 63.1 | 60.6 | 62.7 | 58.7 | 61.4 | 54.4 | 57.7 |
| 24 | 54.8 | 58.3 | 60.3 | 62.1 | 59.5 | 61.5 | 57.5 | 60.0 | 53.9 | 56.9 |

As illustrated in Table 4, above, and FIG. 16, Sheets C-E made by the new process and having at least 25% cold work realize an increase in strength over Sheet A. Indeed, Sheet E with 85% CW and thermally treated at 350° F. realizes about a strength of 70.9 ksi and with only 2 hours of thermal treatment (its peak strength may be higher since it achieved high strength so quickly). The conventionally processed sheet (Sheet A) in the T6 temper reaches its measured highest strength around 16 hours of thermal treatment, and then only realizes a strength of about 55.3 ksi. In other words, new Sheet E achieves about a 28% increase in tensile yield strength over the strength of the conventionally prepared material, and with only 2 hours of thermal treatment (i.e., 87.5% faster, (1−2/16)*100%=87.5%). Stated differently, new Sheet E achieves about a 28% increase in strength over conventional Sheet A and in about $1/10^{th}$ of the time required for Sheet A to its peak strength of 55.3 ksi.

Sheets C, D and E with more than 25% cold work realize tensile yield strengths in excess of 60 ksi. Sheets D and E with 60% and 85% cold work, respectively, realize tensile yield strengths in excess of 65 ksi, indicating that more than 35% cold work, such as more than 50% cold work, may be required to regularly achieve tensile yield strengths in excess of 60 ksi for this particular alloy.

FIGS. 19-21 illustrate the yield strengths for Sheets B-E at various thermal treatment temperatures. As illustrated, at higher thermal treatment temperatures the time required to attain a given yield strength gets progressively shorter. Due to this short thermal treatment time, it is possible that paint baking cycles or coating cures could be used to thermally treat new 6xxx aluminum alloy bodies, making them particularly useful for automotive applications and rigid container packaging applications, among others.

Given these significant strength increases, a significant drop in ductility would be expected for Sheets B-E. However, as shown in Table 5, below and FIG. 23, the 6xxx+Cu+Zn aluminum alloy bodies realize good elongation values. All elongation values are in percent. Similar elongation values are measured for the samples thermally treated at 300° F., 325° F., 375° F., and 400° F.

TABLE 5

Elongation (%) of the 6xxx + Cu + Zn alloy at various thermal treatment times (350° F.)

| Time | Sheet A (T6) (old) | Sheet E 85% CW (new) | Sheet D 60% CW (new) | Sheet C 35% CW (new) | Sheet B 11% CW (new) |
|---|---|---|---|---|---|
| 2 | 24 | 12.0 | 12.0 | 10.0 | 14.0 |
| 4 | 18.5 | 12.0 | 11.0 | 10.0 | 11.0 |
| 8 | 14 | 11.0 | 11.0 | 8.0 | 10.0 |

TABLE 5-continued

Elongation (%) of the 6xxx + Cu + Zn alloy at various thermal treatment times (350° F.)

| Time | Sheet A (T6) (old) | Sheet E 85% CW (new) | Sheet D 60% CW (new) | Sheet C 35% CW (new) | Sheet B 11% CW (new) |
|---|---|---|---|---|---|
| 16 | 13 | 12.0 | 10.0 | 8.0 | 10.0 |
| 24 | 12 | 11.0 | 12.0 | 7.5 | 6.0 |

Test 2 Samples—Mechanical Properties

Samples from Sheets A-E are thermally treated, the conditions of which are provided in Table 6, below ("the test 2 samples"). Mechanical properties are measured, the averages of which are also provided in Table 6. Sheets C-E of the new process and having more than 25% cold work achieve higher strengths than the Sheet A product of the old process, and in all directions, while Sheet B with less than 25% cold work realizes similar properties to that of Sheet A.

TABLE 6

Mechanical Properties of the 6xxx + Cu + Zn alloy

| Product (thermal treatment temp, duration) | Test Direction | TYS (ksi) | UTS (ksi) | El (%) |
|---|---|---|---|---|
| Sheet E | L* | 71.3 | 73.6 | 10.5 |
| 85% CW | LT | 74.0 | 78.1 | 13.3 |
| (300° F., 8 hours) | 45° | 66.7 | 70.2 | 12.0 |
| Sheet D | L | 67.9 | 70.1 | 9.5 |
| 60% CW | LT | 66.0 | 69.3 | 11.5 |
| (300° F., 24 hours) | 45° | 63.7 | 67.4 | 10.3 |
| Sheet C | L | 62.8 | 65.2 | 12.0 |
| 35% CW | LT | 58.5 | 63.4 | 10.5 |
| (300° F., 24 hours) | 45° | 58.3 | 63.3 | 11.3 |
| Sheet B | L | 56.0 | 59.3 | 14.0 |
| 11% CW | LT | 55.1 | 60.0 | 11.0 |
| (300° F., 48 hours) | 45° | 54.2 | 59.3 | 12.5 |
| Sheet A | L | 56.8 | 58.7 | 14.0 |
| (T6) | LT | 54.1 | 57.9 | 11.5 |
| (350° F., 12 hours) | 45° | 53.4 | 57.1 | 11.5 |

*= single specimen - not average values

Test 2 Samples—Fatigue

The test 2 samples from Sheets A-E are also subjected to strain fatigue testing in accordance with ASTM E606, the results of which are illustrated in FIGS. 24-25. As shown, the sheets made by the new process and with more than 25% cold work realize high cycle fatigue performance over the conventionally processed material, i.e., Sheet A in the T6 temper. In the low cycle (high strain) regime, these sheets are similar or better than Sheet A.

Test 2 Samples—Fracture Toughness

The test 2 samples from Sheets A-E are subjected to fracture toughness testing in accordance with ASTM E561 and B646. The fracture toughness is measured using M(T) specimens with a width of about 6.3 inches and a thickness of about 0.2 inch, with an initial crack length of from about 1.5 to about 1.6 inches ($2a_o$). The measured $K_{app}$ values from the fracture toughness test are provided in Table 7, below. The above-noted strength values are also reproduced for convenience.

TABLE 7

$K_{app}$ values for Sheets A-E ((M)T, T-L, W = 6.3 inches)

| Material (ID) | Sheet A (T6) (old) | Sheet B 11% CW (new) | Sheet C 35% CW (new) | Sheet D 60% CW (new) | Sheet E 85% CW (new) |
| --- | --- | --- | --- | --- | --- |
| $K_{app}$ (ksi√in) | 62.9 | 59.7 | 57.1 | 56.9 | 61.9 |
| Percent decrease over Alloy A | — | 5.1% | 9.2% | 9.5% | 1.6% |
| TYS (LT) | 54.1 | 55.1 | 58.5 | 66.0 | 74.0 |
| Percent increase over alloy A | — | 1.8% | 8.1% | 22% | 37% |
| Ratio of TYS increase:FT decrease | — | 0.35 | 0.88 | 2.32 | 23.13 |

Sheets D-E realize only slightly lower fracture toughness than Sheet A, even though Sheets D-E have much higher strength. All of the results are within a relatively narrow range of ~57 to 63 ksi√in. R-curve data (not shown) indicates that, despite the range in strength of the material, all of Sheets A-E have similar R-curves. FIG. 26 illustrates the strength and fracture toughness values using the $K_{app}$ values of Table 7 and the LT strength values of Table 6. Generally, the new alloy bodies produced by the new process and having more than 25% cold work realize a similar or better combination of strength and fracture toughness relative to the conventionally produce T6 product. For example, Sheet E of the new process with 85% CW realizes about a 37% increase in strength, with only about a 1.6% decrease in fracture toughness over Sheet A in the T6 temper.

Test 2 Samples—Corrosion Resistance

The test 2 samples from Sheets A-E are tested for corrosion resistance in accordance with ASTM G110. The test results are summarized in Table 8, below. The average and maximum depth-of-attack (from 10 readings) for each of Sheets A-E are provided.

TABLE 8

Corrosion Properties of the 6xxx + Cu + Zn alloy

| Sheet | CW % | Ave Depth (μm) | Min. Depth (μm) | Max. Depth (μm) |
| --- | --- | --- | --- | --- |
| Sheet A | N/A - T6 | 64 | 5 | 130 |
| Sheet B | 11 | 97 | 67 | 152 |
| Sheet C | 35 | 92 | 43 | 154 |
| Sheet D | 60 | 56 | 3 | 87 |
| Sheet E | 85 | 39 | 33 | 51 |

Overall, the results indicate that the new processing methodology does not significantly affect the corrosion performance of the alloy. In fact, increasing cold work appears to decrease the average and max depth of attack.

The 6xxx+Cu+Zn alloy bodies are also tested for grain structure as per the OIM procedure, described above. The results are provided in Table 9, below.

TABLE 9

Microstructure (OIM) Properties of the 6xxx + Cu + Zn alloy

| Sample | Measurement Location | First Type Grains per OIM (%) | Percent Unrecrystallized |
| --- | --- | --- | --- |
| Control | T/4 to surface | 98% | 2% |
| 11% CW | T/4 to surface | 95% | 5% |
| 35% CW | T/4 to surface | 12% | 88% |
| 60% CW | T/4 to surface | 8% | 92% |
| 85% CW | T/4 to surface | 5% | 95% |

The new 6xxx+Cu+Zn alloy bodies with more than 25% cold work have a predominately unrecrystallized microstructure, having a volume faction of not greater than 0.12 first type grains (i.e., 88% unrecrystallized) in all instances. Conversely, the control body is nearly fully recrystallized having a volume fraction of 0.98 first type grains (i.e., 2% unrecrystallized).

The R-values of the 6xxx+Cu+Zn alloy bodies are also tested as per the R-value generation procedure, described above. The results are illustrated in FIG. 10 and Table 2, described above. The new 6xxx+Cu+Zn alloy bodies with 60% and 85% cold work have high normalized R-values, both achieving a maximum R-value of more than 3.0, and achieving this maximum normalized R-value at an orientation angle of 50°. These high R-values may be indicative of the unique texture, and thus microstructure, of the new 6xxx+Cu+Zn alloy bodies described herein. The new 6xxx+Cu+Zn alloy bodies with 60% and 85% cold work also realize about 369% to 717% higher maximum R-values as compared to the R-value of the control body (for the purpose of measuring R-values, the control is in the T4 temper, not the T6 temper).

Example 2

Multi-Layered Product Testing in the Form of can Body Stock

Figure 12:
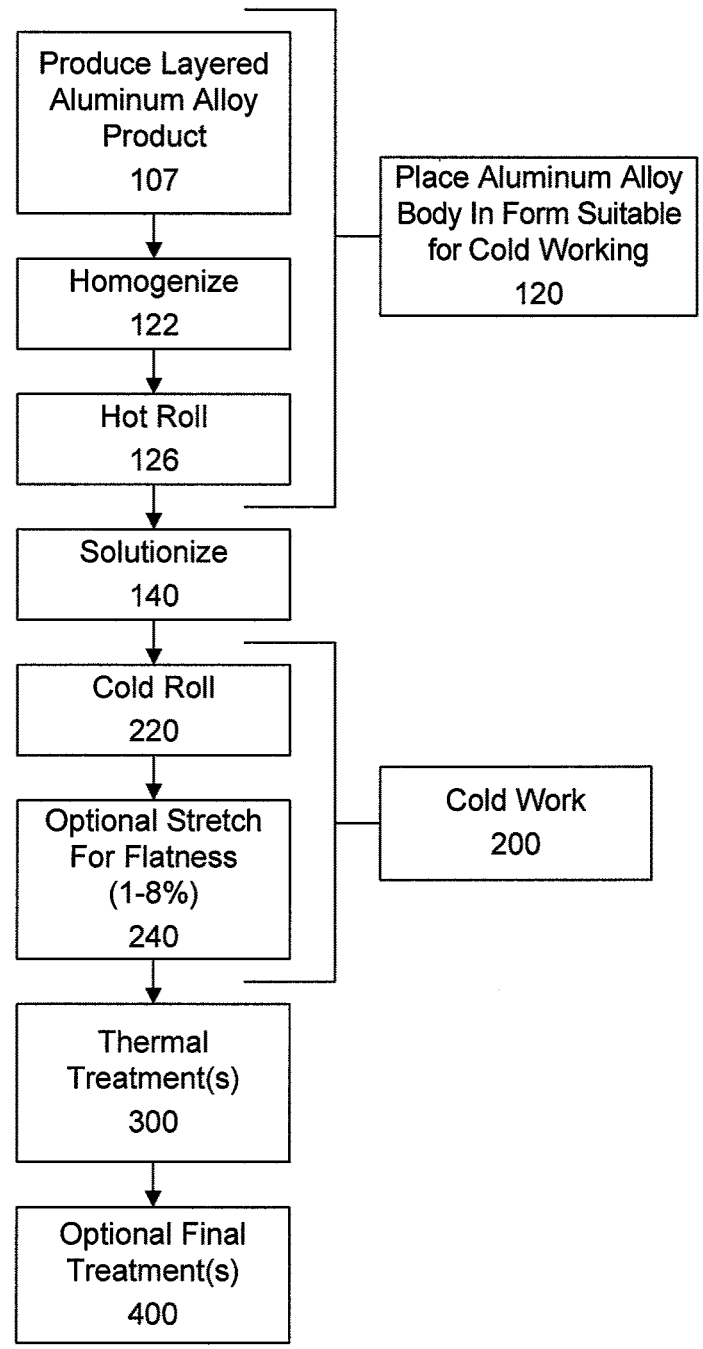
FIG. 12 is a flow chart illustrating one method of producing multi-layered aluminum alloy products.
Figure 13:
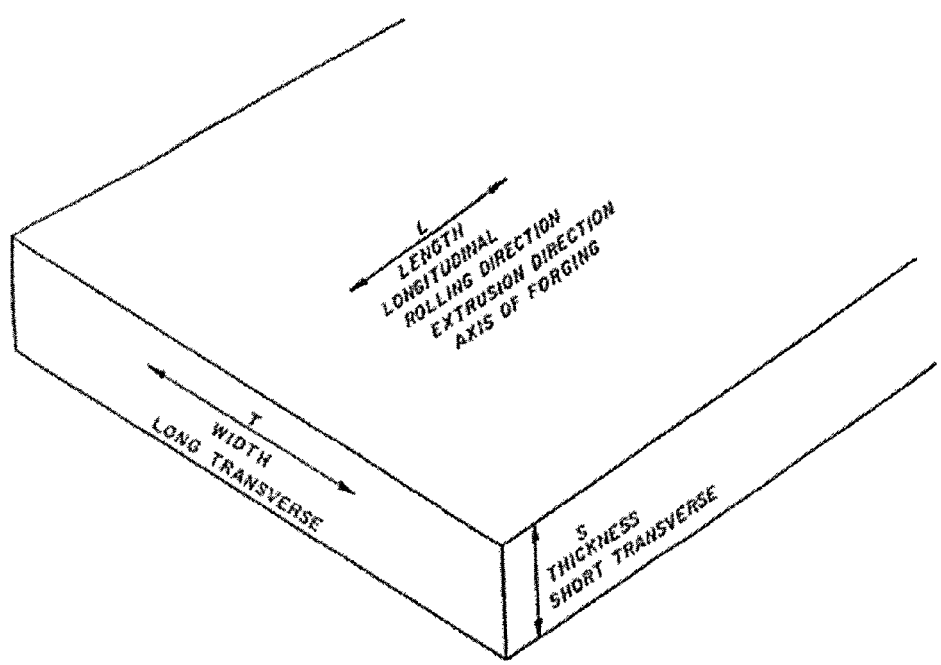
FIG. 13 is a schematic view illustrating the L, LT and ST directions of a rolled product.

Several multi-layered products comprising AA3104 as the cladding and AA6013 as the core is produced similar to the methodology of FIG. 12, described above, and in the H temper. The multi-layered product is produced in both the 2-layer (3014-6013) and the 3-layer (3104-6013-3104) form. The mechanical properties of the multi-layered products are tested in both the H1x temper and after curing of the coating. The results are provided in Table 10, below.

TABLE 10

Mechanical Properties of multi-layered products

| Material | Lot | Finish Thickness (inch) | Cold Work (%) | AS COLD ROLLED H1x TEMPER | | | AFTER COATING CURE (400° F./ 20 minutes) | | |
| --- | --- | --- | --- | --- | --- | --- | --- | --- | --- |
| | | | | TYS (ksi) | UTS (Ksi) | Elong (%) | TYS (ksi) | UTS (ksi) | Elong (%) |
| 3104 (conv.) | A | 0.014 | 86% | 41.1 | 45.0 | 6.0 | 37.9 | 41.9 | 5.0 |
| 3-Layer | B | 0.028 | 72% | 55.2 | 60.4 | 8.0 | 55.1 | 58.5 | 7.0 |
| | C | 0.023 | 77% | 56.6 | 61.3 | 8.0 | 56.0 | 59.2 | 6.5 |
| | D | 0.018 | 82% | 56.8 | 61.2 | 7.5 | 55.6 | 58.9 | 6.0 |
| | E | 0.013 | 87% | 58.7 | 63.1 | 7.0 | 56.1 | 59.1 | 4.5 |
| 2-Layer | F | 0.028 | 72% | 67.6 | 72.2 | 9.5 | 67.8 | 69.4 | 5.5 |
| | G | 0.023 | 77% | 64.9 | 69.2 | 8.0 | 64.0 | 66.1 | 5.5 |
| | H | 0.016 | 84% | 69.8 | 73.5 | 7.0 | 65.8 | 67.4 | 5.0 |
| | I | 0.014 | 86% | 69.3 | 72.6 | 7.0 | 65.6 | 67.1 | 4.5 |

All multi-layered products realize an improved combination of strength and ductility over the standard 3104 alloy product, realizing an increase in TYS (after cure) of from about 17 ksi to 30 ksi, and with similar or better ductility. The clad layer of 3104 may be used to restrict pick-up of aluminum and oxides on the ironing dies during can making. The core layer of 6013 may be thermally treated during the coating cure, which may increase its strength.

Example 3

Testing of Alloy 6013

Aluminum Association alloy 6013 is produced in manner similar to that of Example 1, and its mechanical properties are measured. Alloy 6013 is a zinc-free, copper-containing 6xxx alloy. The composition of the tested 6013 alloy is provided in Table 11, below. The mechanical properties are illustrated in FIG. 27-35.

TABLE 11

Composition of 6013 alloy (all values in wt. %)

| Si | Fe | Mn | Cu | Mg | Cr | Others each | Others Total | Bal. |
|---|---|---|---|---|---|---|---|---|
| 0.70 | 0.25 | 0.32 | 0.89 | 0.94 | 0.03 | ≤0.05 | ≤0.15 | Al |

Alloy 6013 achieves a peak LT tensile yield strength of about 64-65 ksi with 75% cold work and 60-61 ksi with 55% cold work, which is several 8-13 ksi higher than the peak strength of the control alloy (T6). The 75% and 55% cold worked alloys realize these strengths faster than the control (T6) alloy.

The optical properties of the control, 55% cold work and 75% cold work 6013 sheets is evaluated using a Hunterlab Dorigon II (Hunter Associates Laboratory INC, Reston, Va.). The sheets are first mechanical polished to a mirror finish, cleaned, chemically polished, anodized to 0.3 mil oxide thickness and sealed. The specular reflectance, image clarity and 2 degree diffuseness are measured to quantify the appearance of the anodized surface. Higher specular reflectance and image clarity values are indicative of brighter and more uniform appearance. Lower 2 degree diffuseness indicates a reduced level of haze in the reflected image. High specular reflectance and image clarity and low 2 degree diffuseness are valued for applications where the product is used as a reflector (as in lighting applications) and in other consumer electronics applications where a bright, uniform surface may be desired. Having aluminum alloy products with bright surfaces and high strength may be advantageous in these (and other) applications.

The measured optical properties of these 6013 sheets are provided shown in Table 15. As shown in the table, the optical properties for the 55% and 75% cold work 6013 sheets are improved over the control. The 55% and 75% cold work 6013 sheets also have improved strength, as shown above.

TABLE 15

Optical Properties of 6013 alloy

| Optical Properties | Sheet (old) Control | Sheet (new) 55% CW | Sheet (new) 75% CW |
|---|---|---|---|
| Specular Reflectance | 15.2 | 16.4 | 17.3 |
| 2 Degree Diffuseness | 7.66 | 6.52 | 5.86 |

TABLE 15-continued

Optical Properties of 6013 alloy

| Optical Properties | Sheet (old) Control | Sheet (new) 55% CW | Sheet (new) 75% CW |
|---|---|---|---|
| Image Clarity | 29.3 | 35.0 | 38.4 |
| Specular Reflectance % improvement | NA | 7.9 | 13.8 |
| 2 Degree Diffuseness % improvement | NA | 14.9 | 23.5 |
| Image Clarity % improvement | NA | 19.5 | 31. |

Example 4

Testing of Alloys 6022 and 6061

Aluminum Association alloys 6022 and 6061 are produced in manner similar to that of Example 1, and their mechanical properties are measured. Alloy 6022 is a low copper, zinc-free alloy, having 0.05 wt. % Cu. Alloy 6061 is another low-copper, zinc-free alloy, having 0.25 wt. % Cu. The compositions of the tested 6022 and 6061 alloys are provided in Tables 12 and 13, below. The mechanical properties are illustrated in FIG. 36-37.

TABLE 12

Composition of 6022 alloy (all values in wt. %)

| Si | Fe | Mn | Cu | Mg | Cr | Others each | Others Total | Bal. |
|---|---|---|---|---|---|---|---|---|
| 0.86 | 0.16 | 0.07 | 0.05 | 0.61 | 0.02 | ≤0.05 | ≤0.15 | Al |

TABLE 13

Composition of 6061 alloy (all values in wt. %)

| Si | Fe | Mn | Cu | Mg | Cr | Others each | Others Total | Bal. |
|---|---|---|---|---|---|---|---|---|
| 0.65 | 0.46 | 0.06 | 0.25 | 0.95 | 0.19 | ≤0.05 | ≤0.15 | Al |

Neither alloy 6022 nor 6061 is able to achieve an LT tensile yield strength of more than 60 ksi. The results of Examples 1-4 indicate that the strengthening response of an alloy relative to the new process disclosed herein may be dependent upon the type and amount of alloying elements used. It is believed that alloying elements that promote strain hardening and/or precipitation hardening may provide improved properties. It is also believed that the alloys may require sufficient solute to achieve improved properties. It is believed that the 6xxx+Cu+Zn alloy and the 6013 alloy are able to achieve the more than 60 ksi strengths because they contain sufficient solute (e.g. additional copper and/or zinc) to facilitate a high degree of hardening response (strain and/or precipitation). It is believed that alloys 6061 and 6022 do not achieve the 60 ksi strength level because they do not appear to have sufficient solute to facilitate a high degree of hardening response when high cold working and an appropriate thermal treatment are applied.

The R-values of the 6061 and 6022 alloys are also tested as per the R-value generation procedure, described above, the results of which are illustrated in FIGS. 38-39. The results indicate that these alloys have a different microstructure than the higher solute 6xxx+Cu+Zn and 6013 alloys. The 6022 alloy (FIG. 38) does not have a maximum R-value in the orientation angle range of from 20° to 70°, as was realized by the 6xxx+Cu+Zn alloy. Indeed, the shape of the R-curve nearly mirrors the control specimen, realizing its maximum R-value at an orientation angle of 90°. As shown in FIG. 39, the 6061 alloy attains a maximum R-value at an orientation angle of 45°, but achieves an R-value of less than 3.0.

Example 5

Testing of High-Mg 6xxx Alloy

A 6xxx alloy with high magnesium (6xxx-high-Mg alloy) is produced in sheet and plate form in a manner similar to that of Example 1. The final thickness of the sheet is 0.08 inch and the final thickness of the plate is 0.375 inch. The composition of the 6xxx-high-Mg alloy is provided in Table 14, below. The 6xxx-high-Mg alloy has low copper at 0.14 wt. % and is zinc-free (i.e., contains zinc only as an impurity). The mechanical properties of the 6xxx-high-Mg alloy are illustrated in FIGS. 40-51.

TABLE 14

Composition of 6xxx-high-Mg alloy (all values in wt. %)

| Si | Fe | Mn | Cu | Mg | Cr | Others each | Others Total | Bal. |
|---|---|---|---|---|---|---|---|---|
| 0.81 | 0.28 | 0.61 | 0.14 | 1.45 | 0.14 | ≤0.05 | ≤0.15 | Al |

The 6xxx-high-Mg alloy in sheet form achieves an LT tensile yield strength of more than 60 ksi when cold worked and with good elongation. The results of Examples 4 and 5 show that such high-Mg 6xxx alloys may achieve at least 60 ksi LT yield strength, with low levels of copper and without zinc (i.e., zinc as an impurity only). The high magnesium may promote a strain hardening response and/or precipitation hardening response. Other high-magnesium alloy bodies may realize a strength level of less than 60 ksi, but may still find utility in various product applications.

While various embodiments of the present disclosure have been described in detail, it is apparent that modifications and adaptations of those embodiments will occur to those skilled in the art. However, it is to be expressly understood that such modifications and adaptations are within the spirit and scope of the present disclosure.

What is claimed is:

1. A rolled aluminum alloy product comprising 0.25-2.0 wt. % silicon, 0.25-3.0 wt. % magnesium, and 0.35-2.0 wt. % copper, wherein at least one of the silicon and the magnesium is the predominate alloying element of the rolled aluminum alloy product other than aluminum;
   wherein the rolled aluminum alloy product achieves a long-transverse elongation of at least 8%;
   wherein the rolled aluminum alloy product achieves a long-transverse tensile yield strength of at least 65 ksi;
   wherein the rolled aluminum alloy product is predominately unrecrystallized.

2. The rolled aluminum alloy product of claim 1, wherein the rolled aluminum alloy product is at least 75% unrecrystallized.

3. The rolled aluminum alloy product of claim 1, wherein the rolled aluminum alloy product achieves a long-transverse elongation of at least 10%.

4. A forged aluminum alloy wheel comprising 0.25-2.0 wt. % silicon, 0.25-3.0 wt. % magnesium, and 0.35-2.0 wt. % copper, wherein at least one of the silicon and the magnesium is the predominate alloying element of the forged aluminum alloy wheel other than aluminum;
   wherein the forged aluminum alloy wheel achieves a longitudinal (L) elongation of at least 10%;
   wherein the forged aluminum alloy wheel achieves a longitudinal (L) tensile yield strength of at least 65 ksi; and
   wherein the forged aluminum alloy wheel is predominately unrecrystallized.

5. The forged aluminum alloy wheel of claim 4, wherein the forged aluminum alloy wheel is at least 75% unrecrystallized.

6. The rolled aluminum alloy product of claim 1, wherein the rolled aluminum alloy product achieves a long-transverse tensile yield strength of at least 68 ksi.

7. The rolled aluminum alloy product of claim 1, wherein the rolled aluminum alloy product achieves a long-transverse tensile yield strength of at least 70 ksi.

8. The rolled aluminum alloy product of claim 1, wherein the rolled aluminum alloy automotive component achieves a long-transverse elongation of at least 10%.

9. The rolled aluminum alloy product of claim 1, wherein the rolled aluminum alloy automotive component achieves a long-transverse elongation of at least 10%.

10. The rolled aluminum alloy product of claim 6, wherein the rolled aluminum alloy automotive component achieves a long-transverse elongation of at least 11%.

11. The rolled aluminum alloy product of claim 7, wherein the rolled aluminum alloy automotive component achieves a long-transverse elongation of at least 12%.

12. The rolled aluminum alloy product of claim 1, comprising 0.35-2.0 wt. % zinc.

13. The rolled aluminum alloy product of claim 1, wherein the rolled aluminum alloy product realizes a maximum normalized R-value of at least 3.0.

14. The rolled aluminum alloy product of claim 1, wherein the rolled aluminum alloy product is in the form of an automotive component, and wherein the automotive component is selected from the group consisting of hood panels, fender panels, door panels, roof panels, trunk lid panels, body-in-white pillars and body-in-white reinforcements.

15. The rolled aluminum alloy product of claim 1, wherein the rolled aluminum alloy product is a sheet product.

16. The rolled aluminum alloy product of claim 1, wherein the rolled aluminum alloy product includes at least 0.5 wt. % copper.

17. The rolled aluminum alloy product of claim 16, wherein the rolled aluminum alloy product includes at least 0.5 wt. % zinc.

18. The forged aluminum alloy wheel of claim 4, wherein the forged aluminum alloy wheel achieves a longitudinal (L) elongation of at least 11%.

19. The forged aluminum alloy wheel of claim 4, wherein the forged aluminum alloy wheel achieves a longitudinal (L) elongation of at least 12%.

20. The forged aluminum alloy wheel of claim 4, wherein the forged aluminum alloy wheel achieves a longitudinal (L) elongation of at least 12%.

21. The forged aluminum alloy wheel of claim 4, comprising 0.35-2.0 wt. % zinc.

22. The forged aluminum alloy wheel of claim 4, wherein the forged aluminum alloy wheel includes at least 0.5 wt. % copper.

23. The forged aluminum alloy wheel of claim 22, wherein the forged aluminum alloy wheel includes at least 0.5 wt. % zinc.

* * * * *